(12) United States Patent
Apkarian et al.

(10) Patent No.: US 9,579,797 B2
(45) Date of Patent: Feb. 28, 2017

(54) ROBOTIC SYSTEMS AND METHODS OF OPERATING ROBOTIC SYSTEMS

(71) Applicant: Quanser Consulting Inc., Markham (CA)

(72) Inventors: Agop Jean Georges Apkarian, Toronto (CA); Amir Haddadi, Toronto (CA); Gilbert Ming Yeung Lai, Oakville (CA); Hervé Jean-Pierre Lacheray, Markham (CA); Paul Karam, Pickering (CA); David Ryan Erickson, Dunmore (CA)

(73) Assignee: QUANSER CONSULTING INC., Markham (CA)

(*) Notice: Subject to any disclaimer, the term of this patent is extended or adjusted under 35 U.S.C. 154(b) by 326 days.

(21) Appl. No.: 14/683,737

(22) Filed: Apr. 10, 2015

(65) Prior Publication Data
US 2016/0303739 A1    Oct. 20, 2016

Related U.S. Application Data

(60) Provisional application No. 61/977,886, filed on Apr. 10, 2014, provisional application No. 61/989,020, (Continued)

(51) Int. Cl.
*G05B 19/04* (2006.01)
*G05B 19/418* (2006.01)
(Continued)

(52) U.S. Cl.
CPC .......... *B25J 9/1674* (2013.01); *H04L 67/303* (2013.01); *Y10S 901/49* (2013.01)

(58) Field of Classification Search
CPC ........ B25J 9/1674; B25J 9/1689; B25J 13/00; B25J 3/00; B25J 9/00; B25J 9/0084;
(Continued)

(56) References Cited

U.S. PATENT DOCUMENTS 4,826,392 A * 5/1989 Hayati ................... B25J 9/0084
                                                            318/625
6,148,100 A   11/2000 Anderson et al.
(Continued)

FOREIGN PATENT DOCUMENTS

CA    2513202 A1   1/2006
EP    0602657 B1   8/1999
(Continued)

OTHER PUBLICATIONS

International Search Report and Written Opinion for PCT/CA2015/000243. Dated Sep. 2, 2015.

*Primary Examiner* — Jaime Figueroa
(74) *Attorney, Agent, or Firm* — Bereskin & Parr LLP/S.E.N.C.R.L., s.r.l.

(57) ABSTRACT

Methods and systems are provided for operating various robotic systems. The methods and systems involve applications of platforms that enable multiple-input teleoperation and a high degree of immersiveness for the user. The robotic systems may include multiple arms for manipulators and retrieving information from the environment and/or the robotic system. The robotic methods may include control modification modules for detecting that an operation of a robotic device based on the control commands fails to comply with one or more operational parameters; identifying the non-compliant control command; and generating a modifier for the secondary device to adjust the non-compliant control command to comply with the set of operational parameters.

22 Claims, 31 Drawing Sheets

Related U.S. Application Data filed on May 6, 2014, provisional application No. 62/094,138, filed on Dec. 19, 2014.

(51) Int. Cl.
  *B25J 9/16* (2006.01)
  *H04L 29/08* (2006.01)

(58) Field of Classification Search
  CPC ......... B25J 9/1666; B25J 9/1676; B62D 1/24; H04L 67/303; Y10S 901/49
  USPC ....... 700/245, 247, 248, 249, 250, 253, 255, 700/257, 264
  See application file for complete search history.

(56) References Cited

U.S. PATENT DOCUMENTS

| | | | |
|---|---|---|---|
| 7,312,766 B1 | 12/2007 | Edwards | |
| 7,865,266 B2 | 1/2011 | Moll et al. | |
| 8,473,101 B2* | 6/2013 | Summer | B25J 9/162 318/568.11 |
| 8,560,118 B2 | 10/2013 | Greer et al. | |
| 8,918,211 B2 | 12/2014 | Diolaiti et al. | |
| 8,955,229 B2 | 2/2015 | Ferrari | |
| 8,977,391 B2* | 3/2015 | Vavrina | B64G 7/00 244/158.1 |
| 9,195,233 B2* | 11/2015 | Perrone | G05D 1/0088 |
| 9,213,934 B1* | 12/2015 | Versteeg | G06N 3/004 |
| 9,327,397 B1* | 5/2016 | Williams | B25J 3/00 |
| 9,329,587 B2* | 5/2016 | Fudaba | G05B 15/02 |
| 2001/0037163 A1* | 11/2001 | Allard | B25J 9/1689 700/245 |
| 2005/0137735 A1* | 6/2005 | Loy | G05B 19/41865 700/109 |
| 2005/0234433 A1 | 10/2005 | Wang et al. | |
| 2006/0224280 A1 | 10/2006 | Flanigan et al. | |
| 2007/0013336 A1* | 1/2007 | Nowlin | A61B 19/2203 318/568.21 |
| 2011/0046781 A1 | 2/2011 | Summer | |
| 2012/0071752 A1* | 3/2012 | Sewell | A61B 6/12 600/424 |
| 2012/0185098 A1 | 7/2012 | Bosscher et al. | |
| 2012/0185099 A1 | 7/2012 | Bosscher et al. | |
| 2012/0239191 A1* | 9/2012 | Versteeg | G06N 3/004 700/246 |
| 2013/0204465 A1* | 8/2013 | Phillips | G05D 1/0278 701/2 |
| 2013/0325244 A1 | 12/2013 | Wang et al. | |
| 2014/0316430 A1 | 10/2014 | Hourtash | |
| 2014/0365258 A1* | 12/2014 | Vestal | G06Q 10/06311 705/7.15 |
| 2015/0251316 A1* | 9/2015 | Smith | G05B 19/41815 700/248 |
| 2015/0336270 A1* | 11/2015 | Storr | B25J 9/1674 700/245 |
| 2016/0195390 A1* | 7/2016 | Nissen | B25J 9/1676 702/155 |
| 2016/0274553 A1* | 9/2016 | Strohmenger | G05B 19/41885 |
| 2016/0274558 A1* | 9/2016 | Strohmenger | G05B 19/0428 |

FOREIGN PATENT DOCUMENTS

| | | |
|---|---|---|
| WO | 98/51453 A1 | 11/1998 |
| WO | 03001248 A2 | 1/2003 |
| WO | 2008/034257 A1 | 3/2008 |
| WO | 2009045827 A2 | 4/2009 |
| WO | 2009055707 A2 | 4/2009 |
| WO | 2013/152414 A1 | 10/2013 |

* cited by examiner

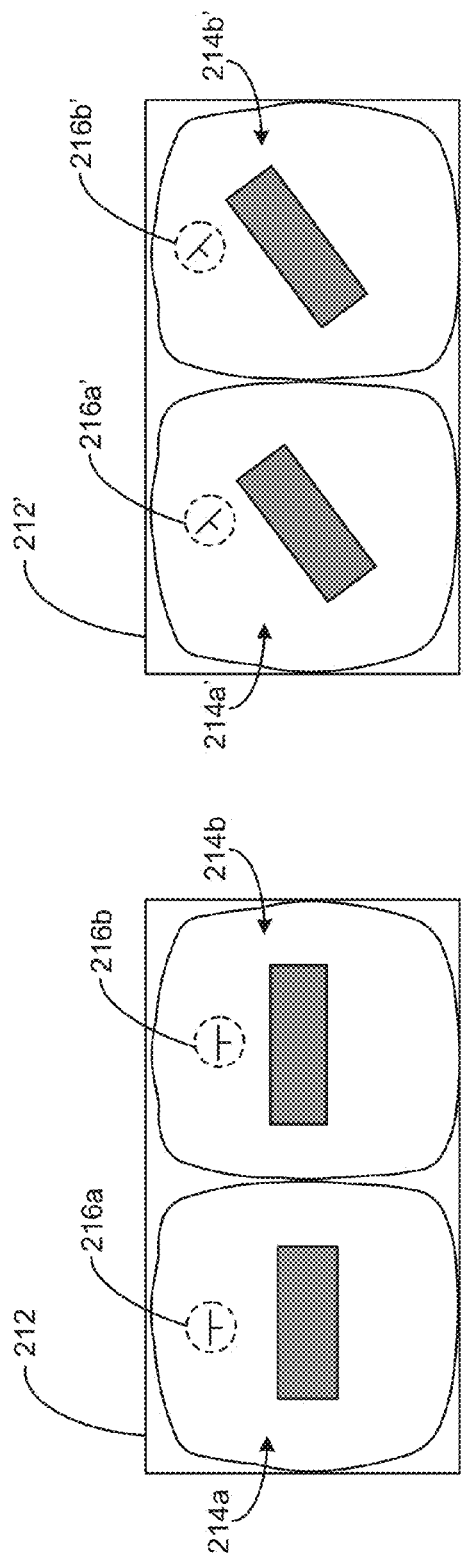

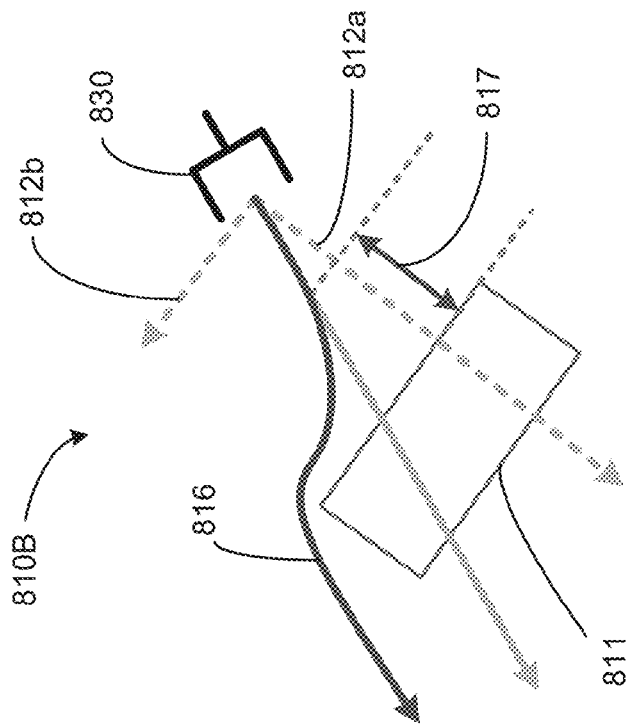
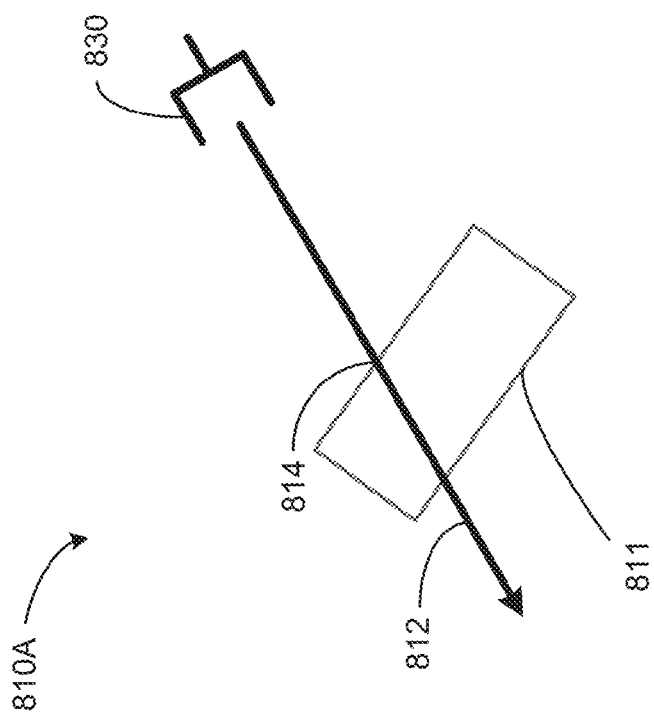
FIG. 9B
FIG. 9A

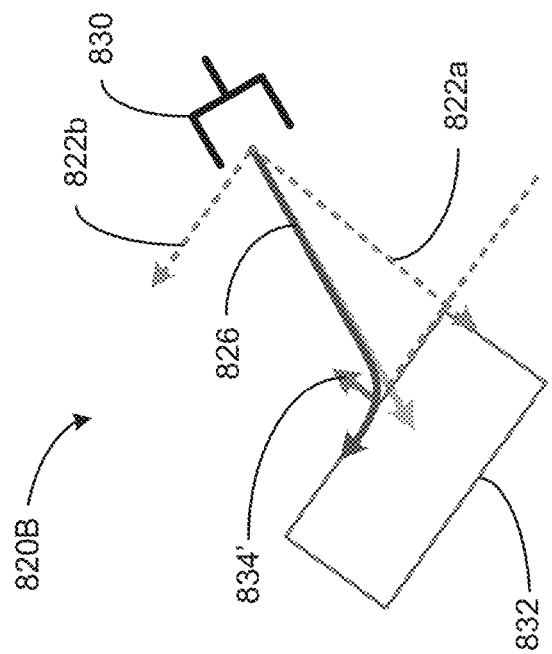
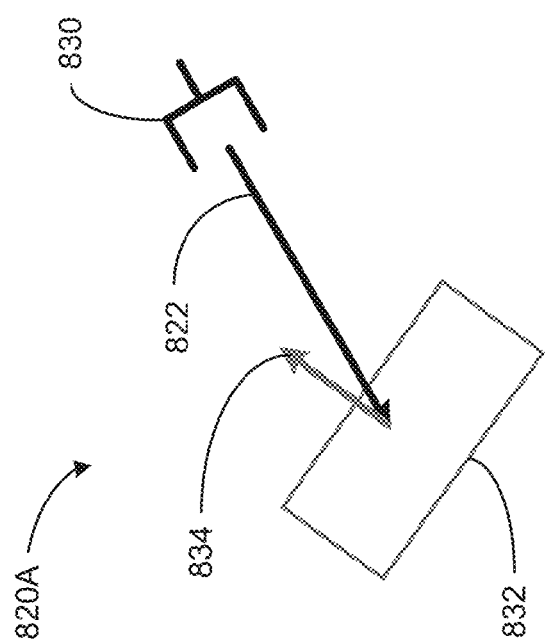

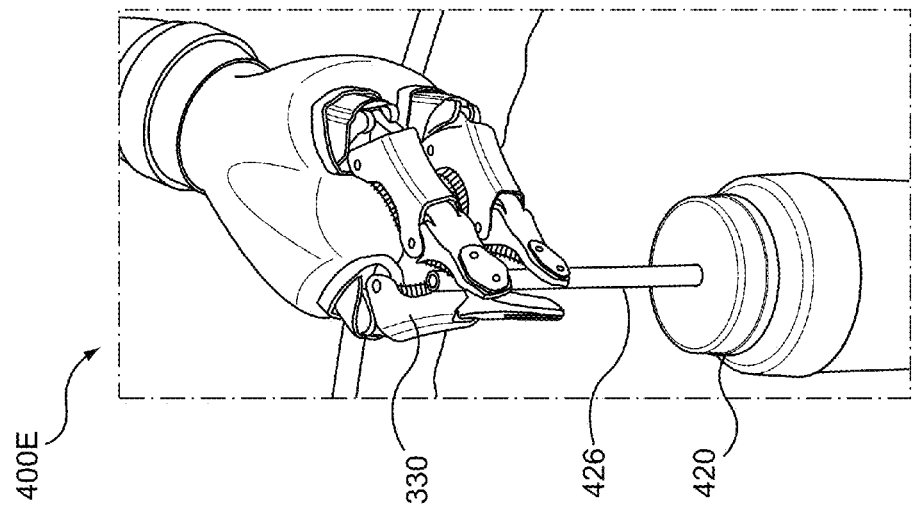
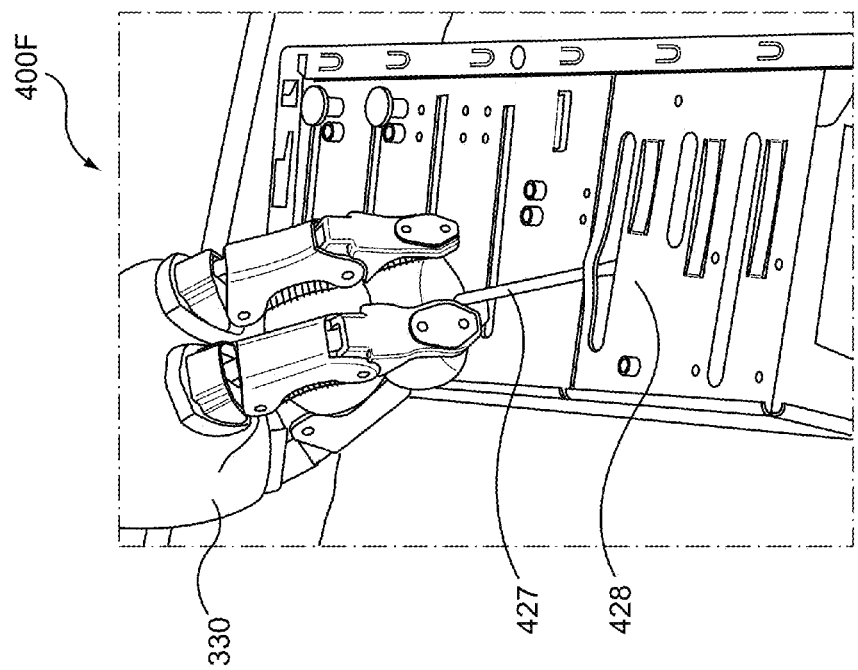

ROBOTIC SYSTEMS AND METHODS OF OPERATING ROBOTIC SYSTEMS

CROSS-REFERENCE TO RELATED PATENT APPLICATIONS

This application claims the benefit of U.S. Provisional Application No. 61/977,886, filed on Apr. 10, 2014; U.S. Provisional Application No. 61/989,020, filed on May 6, 2014; and U.S. Provisional Application No. 62/094,138, filed on Dec. 19, 2014. The complete disclosure of each of U.S. Provisional Application No. 61/977,886, U.S. Provisional Application No. 61/989,020, and U.S. Provisional Application No. 62/094,138 is incorporated herein by reference.

FIELD

The described embodiments relate to robotic systems and methods of operating the robotic systems. Specifically, some embodiments relate to remote-controlled robotic systems and methods of operating thereof.

BACKGROUND

Robotic systems are increasingly used to assist humans in different situations. In particular, robotic systems can be important in situations during which direct human contact can be dangerous, or even life-threatening.

Over the years, robotic technologies have evolved substantially to facilitate robotic systems that can involve multiple master devices (or primary devices) for controlling various different slave devices (or secondary devices). Since the primary devices can receive commands via a user interface, operators can be located at various different locations.

One example application of the robotic systems is for Improvised Explosive Device Disposal (IEDD). IEDD technology has evolved from initial approaches that involve humans directly handling the Improvised Explosive Devices (IEDs) to the more recent remote-controlled robotic systems that involve some direct human interaction with the IEDs. Most existing robotic systems, however, continue to be limited in their applications due to the primitive controls that are provided for operating the robotic system and the limited amount of data that can be retrieved and processed.

SUMMARY

Various embodiments described herein generally relate to robotic systems and methods for operating the robotic systems described herein.

In accordance with some embodiments, there is provided a robotic system including: an input module operable to receive a set of input signals from one or more primary devices, the set of input signals including one or more input signals;

a storage module operable to provide a configuration profile, the configuration profile comprising a set of operational parameters for the robotic system; a processing module configured to generate one or more control commands based on at least the set of input signals and the configuration profile, the one or more control commands being generated for one or more secondary devices, the processing module being in electronic communication with the input module and the storage module, each control command being indicative of an operation to be conducted by at least one secondary device of the one or more secondary devices; and a set of control modification modules for managing an operation of the robotic system, each control modification module managing an operation of a respective secondary device, each control modification module being configured to: detect whether the operation of the respective secondary device fails to comply with the set of operational parameters; in response to detecting the operation of the respective secondary device fails to comply with the set of operational parameters, identify a non-compliant control command from the one or more control commands, the non-compliant control command being a control command causing the operation of the respective secondary device to be non-compliant with the set of operational parameters; and generate a modifier to adjust the non-compliant control command to comply with the set of operational parameters; wherein the robotic system is responsive to the one or more control commands and each modifier generated by the respective control modification modules.

In some embodiments, the robotic system further includes an output module for combining the one or more control commands and the modifier to provide an output signal, the robotic system being responsive to the output signal. The output module can, in some embodiments, be located at the respective one or more secondary devices.

In embodiments when the configuration profile includes a mapped association between each primary device and the at least one secondary device, and each input signal is associated with a primary device identifier corresponding to the primary device providing that input signal, the processing module can be configured to generate the one or more control commands by, for each input signal, identifying, from the configuration profile, the at least one secondary device in mapped association with the primary device corresponding to the respective primary device identifier; and associating that input signal with the identified at least one secondary device.

In some embodiments, the processing module is further configured to, for each secondary device, determine whether that secondary device is associated with two or more input signals; and in response to determining that secondary device is associated with two or more input signals, combine the two or more input signals to generate the respective control command for that secondary device.

In embodiments where the two or more input signals include a first input signal defining a first aspect of the operation to be conducted by the respective secondary device and a second input signal defining a second aspect of the operation to be conducted by the respective secondary device, the second aspect is different from the first aspect.

In some embodiments, the input module is further operable to receive a state change indicator from the at least one secondary device, the state change indicator representing an adjustment of at least one of the primary device and the secondary device; and the robotic system further includes a mapping module for updating the configuration profile in response to the state change indicator.

In some embodiments, the storage module stores a plurality of configuration profiles, each configuration profile comprising a different respective set of operational parameters; and the mapping module is further configured to select one of the plurality of configuration profiles based on the state change indicator.

The adjustment of the at least one of the primary device and the secondary device can include a change to a mapped association between a primary device and a respective secondary device. The adjustment of the at least one of the primary device and the secondary device can include an occurrence of a closed kinematic loop at the secondary device.

In some embodiments, each control modification module is further configured to: generate an operational model based on the one or more control commands; identify, from the operational model, a collision between at least one of the one or more secondary devices and one or more segments of a secondary device; and in response to identifying the collision, generate the modifier for preventing the collision, the modifier including a removal of one or more components of the non-compliant control command causing the collision based on the operational model.

In some embodiments, the configuration profile includes a compliance threshold; and each control modification module is further configured to: receive a sensed value from the secondary device; determine whether the sensed value exceeds the compliance threshold; and in response to determining the sensed value exceeds the compliance threshold, generate the modifier for reducing at least one of a force and a torque exerted by the secondary device, the modifier including a removal of one or more components of the non-compliant control command causing the sensed value to exceed the compliance threshold.

In some embodiments, the configuration profile includes a singularity threshold; and each control modification module is further configured to: receive a pose information associated with the secondary device, the pose information including a position data and an orientation data; determine whether the pose information exceeds the singularity threshold; and in response to determining the pose information exceeds the singularity threshold, generate the modifier for reducing a movement of the secondary device to reduce a change in the pose information, the modifier including a removal of one or more components of the non-compliant control command causing the pose information to exceed the singularity threshold.

In some embodiments, the processing module may be further configured to provide sensory indicators indicating a relative spatial reference frame between the processing module and the one or more secondary device.

In accordance with some embodiments, there is provided a method for operating a robotic system. The method including: receiving, at an input module, a set of input signals from one or more primary devices, the set of input signals including one or more input signals; providing a configuration profile, the configuration profile comprising a set of operational parameters for the robotic system; generating, by a processing module, one or more control commands based on at least the set of input signals and the configuration profile, the one or more control commands being generated for one or more secondary devices, each control command being indicative of an operation to be conducted by at least one secondary device of the one or more secondary devices; managing, by a set of control modification modules, an operation of the robotic system, each control modification module managing an operation of a respective secondary device, the managing including: detecting whether the operation of the respective secondary device fails to comply with the set of operational parameters; in response to detecting the operation of the respective secondary device fails to comply with the set of operational parameters, identifying a non-compliant control command from the one or more control commands, the non-compliant control command being a control command causing the operation of the respective secondary device to be non-compliant with the set of operational parameters; and generating a modifier to adjust the non-compliant control command to comply with the set of operational parameters; wherein the robotic system is responsive to the one or more control commands and each modifier generated by the respective control modification modules.

In some embodiments, the method further includes: combining the one or more control commands and the modifier to provide an output signal, the robotic system being responsive to the output signal.

In some embodiments, the method further includes: receiving, at the input module, a state change indicator from the at least one secondary device, the state change indicator representing an adjustment of at least one of the primary device and the secondary device; and generating the one or more control commands comprises updating, by a mapping module, the configuration profile in response to the state change indicator. Some of the described methods can include operating the mapping module to select one of a plurality of configuration profiles based on the state change indicator, each configuration profile in the plurality of configuration profiles including a different respective set of operational parameters.

In some embodiments, the adjustment of the at least one of the primary device and the secondary device includes a change to a mapped association between a primary device and a respective secondary device. In some embodiments, the adjustment of the at least one of the primary device and the secondary device includes an occurrence of a closed kinematic loop at the secondary device.

In some embodiments, managing the operation of the robotic system includes operating each control modification module to: generate an operational model based on the one or more control commands; identify, from the operational model, a collision between at least one of the one or more secondary devices and one or more segments of a secondary device; and in response to identifying the collision, generate the modifier for preventing the collision, the modifier including a removal of one or more components of the non-compliant control command causing the collision based on the operational model.

In some embodiments, the configuration profile includes a compliance threshold; and managing the operation of the robotic system comprises operating each control modification module to: receive a sensed value from the secondary device; determine whether the sensed value exceeds the compliance threshold; and in response to determining the sensed value exceeds the compliance threshold, generate the modifier for reducing at least one of a force and a torque exerted by the secondary device, the modifier including a removal of one or more components of the non-compliant control command causing the sensed value to exceed the compliance threshold.

In some embodiments, the configuration profile includes a singularity threshold; and managing the operation of the robotic system includes operating each control modification module to: receive a pose information associated with the secondary device, the pose information comprising a position data and an orientation data; determine whether the pose information exceeds the singularity threshold; and in response to determining the pose information exceeds the singularity threshold, generate the modifier for reducing a movement of the secondary device to reduce a change in the pose information, the modifier including a removal of one or more components of the non-compliant control command causing the pose information to exceed the singularity threshold.

In some embodiments, generating the one or more control commands includes providing sensory indicators indicating a relative spatial reference frame between the processing module and the one or more secondary device.

In accordance with some embodiments, there is provided a robotic system including: one or more primary devices for receiving input signals; a processing module for generating one or more control commands based on the input signals and a configuration profile, the configuration profile comprising a set of operational parameters, each control command being indicative of an operation to be conducted by at least one secondary device of the one or more secondary devices; and a set of control modification modules for managing an operation of the robotic system, each control modification module managing an operation of a respective secondary device, each control modification module being configured to: detect whether the operation of the respective secondary device fails to comply with the set of operational parameters; in response to detecting the operation of the respective secondary device fails to comply with the set of operational parameters, identify a non-compliant control command from the one or more control commands, the non-compliant control command being a control command causing the operation of the respective secondary device to be non-compliant with the set of operational parameters; and generate a modifier to adjust the non-compliant control command to comply with the set of operational parameters; wherein the robotic system is responsive to the one or more control commands and each modifier generated by the respective control modification modules.

In accordance with some embodiments, there is provided a method for operating a robotic system. The method including: receiving, at an input module, input signals; generating, by a processing module, one or more control commands based on the input signals and a configuration profile, the configuration profile comprising a set of operational parameters, each control command being indicative of an operation to be conducted by at least one secondary device of the one or more secondary devices; and managing, by a set of control modification modules, an operation of the robotic system, each control modification module managing an operation of a respective secondary device, the managing including: detecting whether the operation of the respective secondary device fails to comply with the set of operational parameters; in response to detecting the operation of the respective secondary device fails to comply with the set of operational parameters, identifying a non-compliant control command from the one or more control commands, the non-compliant control command being a control command causing the operation of the respective secondary device to be non-compliant with the set of operational parameters; and generating a modifier to adjust the non-compliant control command to comply with the set of operational parameters; wherein the robotic system is responsive to the one or more control commands and each modifier generated by the respective control modification modules.

In accordance with some embodiments, there is provided a method, and associated systems configured to implement the methods, for providing relative spatial data for a robotic system. The method including: determining a spatial relationship between an imaging reference frame of an imaging sensor at the robotic system and an operator reference frame of the operator of the robotic system, the imaging sensor being remotely controlled by the operator and the imaging sensor being rotatable; detecting a current imaging orientation of the imaging sensor relative to the operator reference frame; and providing at least one visual cue representing the current imaging orientation relative to the operator reference frame.

In some embodiments, determining the spatial relationship between the imaging reference frame and the operator reference frame includes: comparing the imaging reference frame with the operator reference frame; and in response to determining the imaging reference frame is aligned with the operator reference frame, defining the initial spatial relationship as an aligned relationship, otherwise, determining a reference frame translation for converting spatial data in the imaging reference frame to the operator reference frame, and defining the initial spatial relationship according to the determined reference frame translation.

In some embodiments, providing the at least one visual cue representing the current imaging orientation includes: providing one or more visual cues representing one or more different views of the imaging sensor relative to the operator reference frame.

In some embodiments, the one or more different views of the imaging sensor relative to the operator reference frame includes: one of a side view of the imaging sensor relative to the operator reference frame and a top view of the imaging sensor relative to the operator reference frame.

In some embodiments, providing the at least one visual cue representing the current imaging orientation includes: providing an extension visual cue representing a current degree of extension of an imaging arm on which the imaging sensor is mounted.

In embodiments when the extension visual cue is a side view of the imaging arm, the method further includes: providing a direction visual cue representing a direction from which the side view of the imaging arm is shown relative to a base of a robotic device on which the imaging arm is mounted.

In some embodiments, detecting the current imaging orientation of the imaging sensor relative to the operator reference frame includes: determining an imaging position of the imaging sensor according to the imaging reference frame; and translating the imaging position to the operator reference frame based on the determined spatial relationship between the imaging reference frame and the operator reference frame.

In some embodiments, providing the at least one visual cue representing the current imaging orientation includes: displaying the at least one visual cue at a display viewable by the operator.

Various embodiments and aspects are described below with reference to several example embodiments.

BRIEF DESCRIPTION OF THE DRAWINGS

Several embodiments will now be described in detail with reference to the drawings, in which:

FIGS. 5A and 5B are stereo vision views that correspond to the respective stereo vision views of FIGS. 4A and 4B with visual cues in accordance with an example embodiment;

FIGS. 9A and 9B illustrate an example embodiment of an application of a method of providing collision detection and avoidance as described herein;

FIGS. 10A and 10B illustrate an example embodiment of an application of a method of providing compliance control as described herein;

FIGS. 13A to 13F illustrate example tasks by one manipulator of a robotic device in accordance with various embodiments;

Figure 1A:
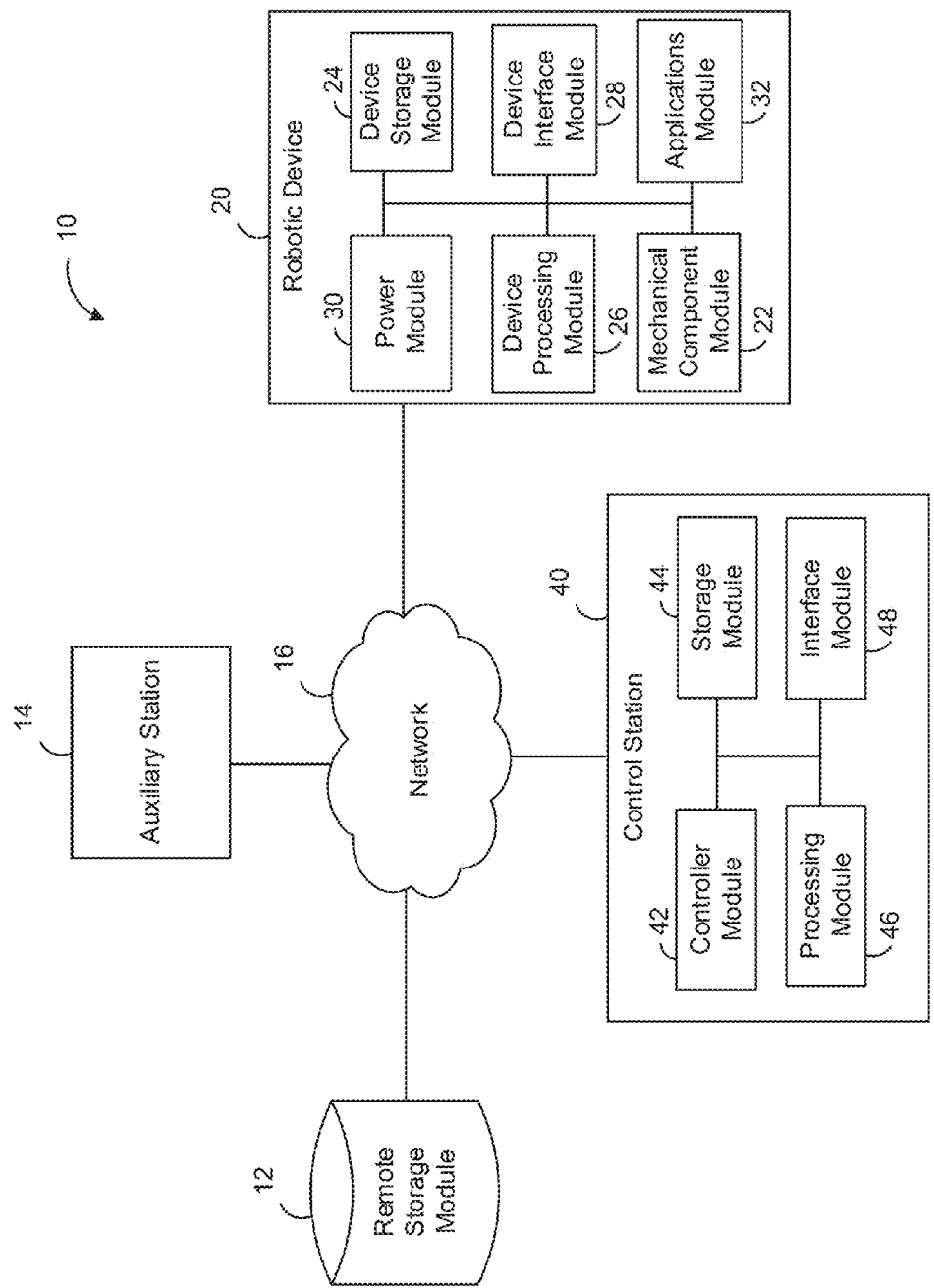
FIG. 1A is a block diagram of a robotic system in accordance with an example embodiment.

The drawings and images, described below, are provided for purposes of illustration, and not of limitation, of the aspects and features of various examples of embodiments described herein. For simplicity and clarity of illustration, elements shown in the drawings and images have not necessarily been drawn to scale. The dimensions of some of the elements may be exaggerated relative to other elements for clarity. It will be appreciated that for simplicity and clarity of illustration, where considered appropriate, reference numerals may be repeated among the drawings and images to indicate corresponding or analogous elements or steps.

DESCRIPTION OF EXAMPLE EMBODIMENTS

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

The various embodiments described herein generally relate to robotic systems, and methods (and associated systems configured to implement the methods) for operating the various robotic systems.

The described robotic systems, and associated methods, are generally directed to augmenting the capabilities of and information available to a remote user of the robotic systems. As a result, direct human involvement or interaction with a field of interest can be substantially minimized. This can be particularly crucial in situations that are possibly life-threatening or associated with an unknown level of risk, such as the disposal of Improvised Explosive Devices (IEDs), operations in certain sites, such as nuclear areas or underground (e.g., for mining, or pipeline assembly or maintenance). The described robotic systems, and associated methods, may also be useful in time-constrained, unconstrained and/or unknown environments situations such that the ability to conduct parallel tasks or operations can be helpful for resolving the situation. The described robotic systems, and associated methods, may also be used for facilitating operations in environments with physical constraints (e.g., dimensions, geometry, weight, etc.) and/or hazards. The ability to involve multiple robotic devices to maneuver those physical constraints can be useful.

In some embodiments, the described robotic systems, and associated methods, can facilitate a certain degree of operator input due to safety reasons.

The described methods involve applications of platforms that enable multiple input teleoperation and a high degree of immersiveness to a user of the robotic system. In some embodiments, the described robotic systems can include multiple manipulators.

The multiple input teleoperation involves various control methods and systems that can facilitate at least some actions, such as constrained motion, collision avoidance and singularity avoidance, and minimize oscillations arising from any impact.

The immersiveness experienced by the user can be provided by sensory feedback generated based on dynamic three-dimensional (3D) information (e.g., 3D stereo vision and 3D model of the environment), haptic and/or auditory feedback.

It should also be noted that the terms "coupled" or "coupling" as used herein can have several different meanings depending on the context in which the term is used. For example, the term coupling can have a mechanical or electrical connotation. For example, as used herein, the terms "coupled" or "coupling" can indicate that two elements or devices can be directly connected to one another or connected to one another through one or more intermediate elements or devices via an electrical element, electrical signal or a mechanical element such as but not limited to, a wire or a cable, for example, depending on the particular context. In another example, the term coupling can also have a software connotation. That is, the terms "coupled" or "coupling" can indicate that certain software components are connected directly or indirectly through the passing or sharing of data or through another software component or algorithm or in another manner that coordinates their operation.

It should be noted that terms of degree such as "substantially", "about" and "approximately" as used herein mean a reasonable amount of deviation of the modified term such that the end result is not significantly changed. These terms of degree should be construed as including a deviation of the modified term if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made if the end result is not significantly changed.

The various embodiments of the devices, systems and methods described herein may be implemented in hardware or software, or a combination of both. These embodiments may be implemented in part using computer programs executing on programmable devices, each programmable device including at least one processor, an operating system, one or more data stores (including volatile memory or non-volatile memory or other data storage elements or a combination thereof), at least one communication interface and any other associated hardware and software that is necessary to implement the functionality of at least one of the embodiments described herein. For example, and without limitation, the computing device may be a server, a network appliance, an embedded device, a computer expansion module, a personal computer, a laptop, a personal data assistant, a cellular telephone, a smart-phone device, a tablet computer, a wireless device or any other computing device capable of being configured to carry out the methods described herein. The particular embodiment depends on the application of the computing device.

In some embodiments, the communication interface may be a network communication interface, a Universal Serial Bus (USB) connection or another suitable connection as is known by those skilled in the art. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information may be applied to one or more output devices, for display or for further processing.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a non-transitory computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer usable instructions may also be in various forms, including compiled and non-compiled code.

Reference is first made to FIG. 1A, which illustrates a block diagram of a robotic system 10.

As shown in FIG. 1A, the example robotic system 10 can include a remote storage module 12, an auxiliary station 14, a robotic device 20 and a control station 40. Each of the remote storage module 12, the auxiliary station 14, the robotic device 20 and the control station 40 can communicate with each other over a network 16.

The robotic device 20 can include various modules, such as a mechanical component module 22, a device storage module 24, a device processing module 26, a device interface module 28, a power module 30, and an applications module 32.

It will be understood that in some embodiments, each of the mechanical component module 22, the device storage module 24, the device processing module 26, the device interface module 28, the power module 30 and the applications module 32 may be combined into fewer number of modules or may be separated into further modules. Furthermore, the mechanical component module 22, the device storage module 24, the device processing module 26, the device interface module 28, the power module 30 and the applications module 32 may be implemented in software or hardware, or a combination of software and hardware. Also, although only one robotic device 20 is shown in FIG. 1A, it will be understood that more than one robotic device 20 can be provided in the robotic system 10.

The mechanical component module 22 can include the various hardware components (e.g., the arms, manipulators, various attachments provided at the arms, imaging sensors, etc.) provided at the robotic device 20 and the applications module 32 can include software components (e.g., applications and programs, etc.) for operating those mechanical components. Examples of the mechanical component module 22 and the applications module 32 will be described with reference to FIGS. 7A, 7B and 13A to 16D.

The device storage module 24 can include RAM, ROM, one or more hard drives, one or more flash drives or some other suitable data storage elements such as disk drives, etc.

The device processing module 26 may be configured to control the operation of the robotic device 20. The device processing module 26 can include one or more suitable processor, controller or digital signal processor that can provide sufficient processing power depending on the configuration, purposes and requirements of the robotic device 20. For example, the device processing module 26 may include multiple high performance general processors. In alternative embodiments, the device processing module 26 can include more than one processor with each processor being configured to perform different dedicated tasks. In alternative embodiments, it may be possible to use specialized hardware to provide some of the functions provided by the device processing module 26.

The device interface module 28 may be any interface that enables the robotic device 20 to communicate with other devices and systems. In some embodiments, the device interface module 28 can include at least one of a serial port, a parallel port or a USB port. The device interface module 28 may also include at least one of an Internet, Local Area Network (LAN), Ethernet, Firewire, modem or digital subscriber line connection. Various combinations of these elements may be incorporated within the device interface module 28.

The power module 30 can include any suitable power source that provides power to the robotic device 20 such as a power adaptor or a rechargeable battery pack depending on the implementation of the robotic device 20 as is known by those skilled in the art.

The control station 40 can include various modules, such as a controller module 42, a storage module 44, a processing module 46 and an interface module 48.

Similar to the robotic device 20, it will be understood that in some embodiments, each of the controller module 42, the storage module 44, the processing module 46 and the interface module 48 may be combined into fewer number of modules or may be separated into further modules. Furthermore, the controller module 42, the storage module 44, the processing module 46 and the interface module 48 may be implemented in software or hardware, or a combination of software and hardware.

The controller module 42 can include various applications and programs for implementing some of the methods described herein. For example, the controller module 42 can include applications for further processing information received from the robotic device 20, such as generation of 3D models of the environment of the robotic device 20. The controller module 42 can include applications for interpreting control inputs, or input signals, received via the interface module 48 and generating corresponding actions at the robotic device 20. For example, as will be described, the applications can enable various control methods, including stable and scaled motion, singularity avoidance, hybrid control of the various arms at the robotic device 20, collision detection and avoidance, compliance control and constrained motion.

The storage module 44 can include RAM, ROM, one or more hard drives, one or more flash drives or some other suitable data storage elements such as disk drives, etc. The storage module 44 can be used to store an operating system and programs as is commonly known by those skilled in the art. For instance, the operating system provides various basic operational processes for the control station 40. The programs include various user programs so that a user can interact with the control station 40 to perform various functions such as, but not limited to, viewing and manipulating data.

The storage module 44 may further include one or more databases (not shown) for storing information relating to, for example, the robotic device 20 or the auxiliary station 14.

The processing module 46 may be configured to control the operation of the control station 40. The processing module 46 can include one or more suitable processor, controller or digital signal processor that can provide sufficient processing power depending on the configuration, purposes and requirements of the control station 40. For example, the processing module 46 may include multiple high performance general processors. In alternative embodiments, the processing module 46 can include more than one processor with each processor being configured to perform different dedicated tasks. In alternative embodiments, it may be possible to use specialized hardware to provide some of the functions provided by the processing module 46.

The processing module 46 can initiate and manage the operations of each of the other modules in the control station 40, such as the controller module 42. The processing module 46 may also determine, based on received data, stored data and/or user preferences, how the control station 40 may operate.

Similar to the device interface module 28, the interface module 48 at the control station 40 may be any interface that enables the control station 40 to communicate with other devices and systems. As will be described, the devices and systems may include various input devices, such as haptic devices. In some embodiments, the interface module 48 can include at least one of a serial port, a parallel port or a USB port. The interface module 48 may also include at least one of an Internet, Local Area Network (LAN), Ethernet, Firewire, modem or digital subscriber line connection. Various combinations of these elements may be incorporated within the interface module 48.

The interface module 48 may also include one or more suitable displays operable to provide information depending on the configuration of the control station 40. For instance, the displays can be a cathode ray tube, a flat-screen monitor, a Liquid-Crystal Display (LCD) and the like if the control station 40 is provided as a desktop computer. In other cases, the displays can be a display suitable for a laptop, tablet or handheld device such as an LCD-based display and the like.

The displays can show various views and models of the target of interest. Also, the displays can operate to receive control inputs from various input devices, such as, but not limited to, a mouse, a keyboard, a touch screen, a thumb-wheel, a track-pad, a track-ball, a joystick controller, a card-reader, voice and/or audio recognition software installed at input devices (e.g., microphones, etc.), haptic devices, and the like depending on the requirements and implementation of the control station 40. Other example input devices can include neural and brain implant controls, and motion and/or gesture-tracking systems.

Figure 1B:
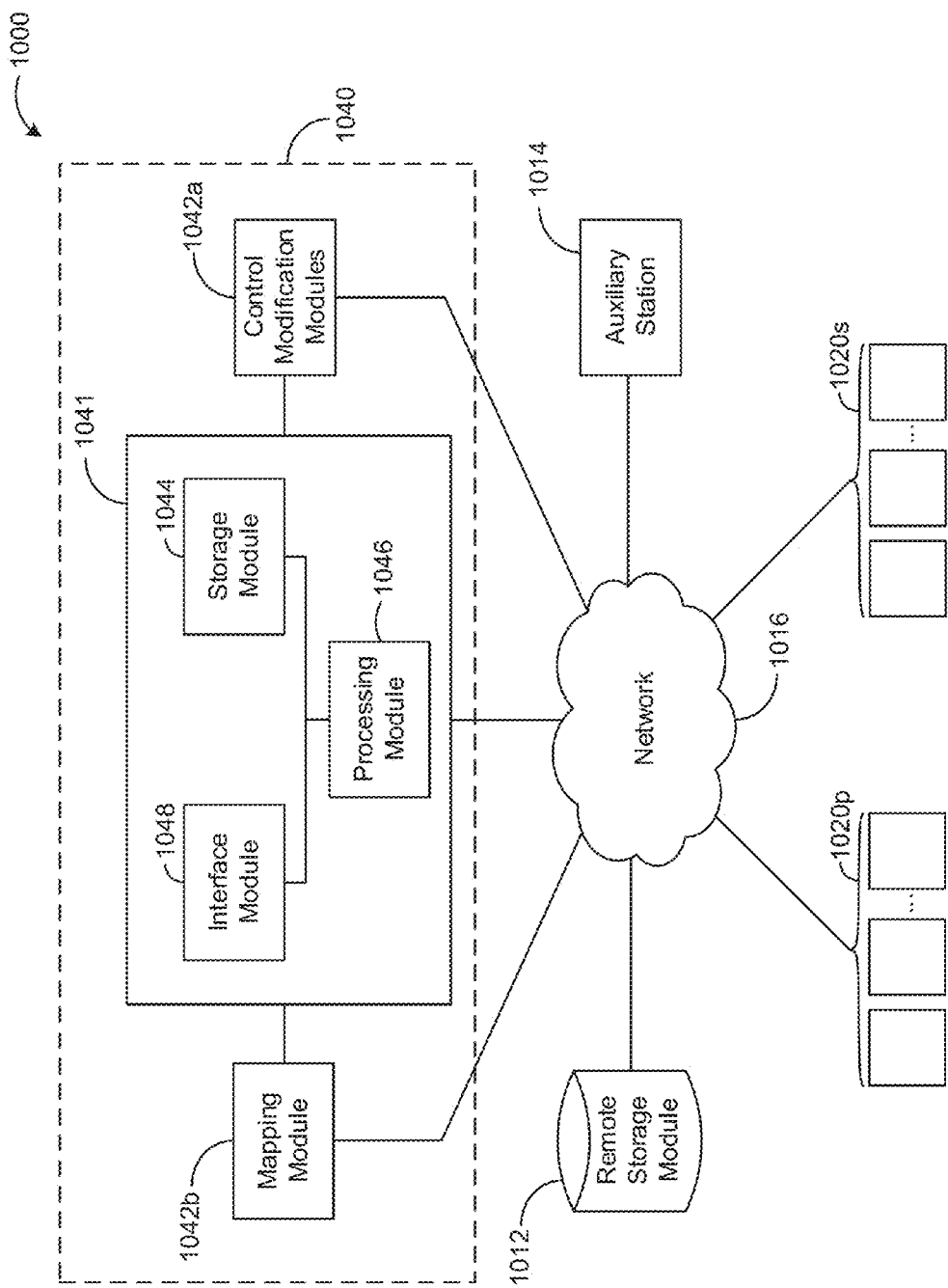
FIG. 1B is a block diagram of a robotic system in accordance with another example embodiment.

FIG. 1B is a block diagram of a robotic system 1000 in accordance with another example embodiment. Similar to the robotic system 10, the robotic system 1000 can also include a control station 1040, a remote storage module 1012 and an auxiliary station 1014. The robotic system 1000 can also include various robotic devices 1020, such as master devices, or primary devices, 1020*p* and slave devices, or secondary devices, 1020*s*. The various components of the robotic system 1000 can communicate via a network 1016.

The primary devices 1020*p* can include any robotic devices 20 and controllers that can provide input signals to the control station 1040. The secondary devices 1020*s* can include any robotic devices 20 and controllers that can operate based on signals provided by the robotic system 1000, such as the control commands and modifiers provided by the control station 1040.

Figure 2:
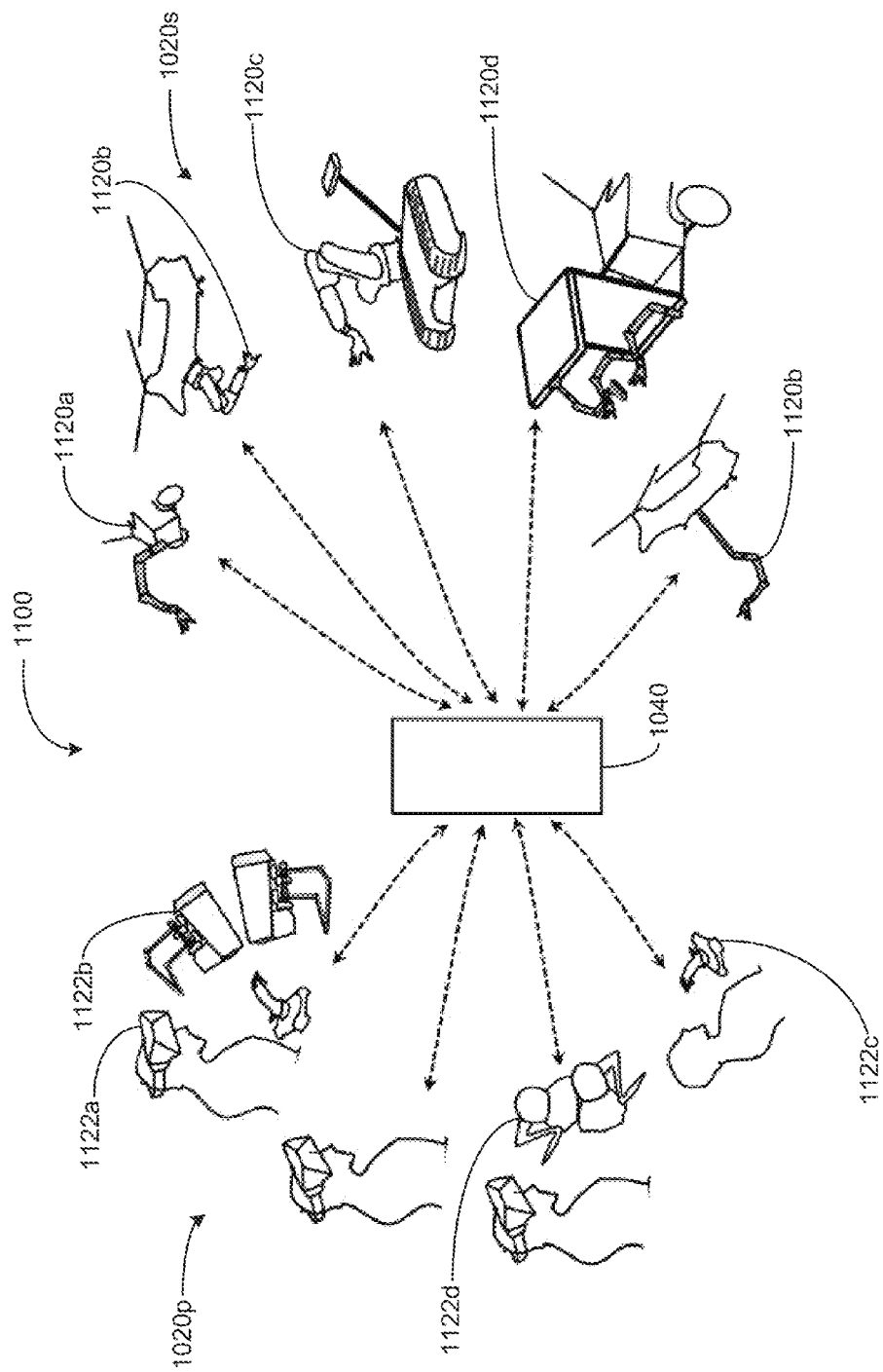
FIG. 2 is a graphical representation of an example embodiment of the robotic system of FIG. 1B.

FIG. 2 illustrates a graphical representation 1100 of an example embodiment of the robotic system 1000. As shown in FIG. 2, the primary devices 1020*p* can include various different controllers, such as a joystick controller 1122*c*, a head-mounted display controller with head-tracking ability 1122*a*, haptic controllers 1122*b* and 1122*d*, and other similar controllers (E.g., any tracking system based on the operator's body or certain body parts). It will be understood that although only certain combinations of the primary devices 1020p are shown in FIG. 2, other different combinations can be provided.

The secondary devices 1020s can also include various robotic devices, such as robotic arms located on different machines, such as a helicopter 1120b, different types of vehicles 1120b, 1120c and 1120d) and for various different purposes (e.g., industrial, military, medical, etc.), as illustrated in FIG. 2. It will be understood that other secondary devices 1020s may similarly be used and that these are provided merely as examples and are not intended to be limiting.

It will be further understood that certain primary devices 1020p can also be secondary devices 1020s, and certain secondary devices 1020s can also be primary devices 1020p. For example, a controller device with haptic feedback capabilities, such as 1122b and 1122d, can act as a primary device 1020p when actuated by a user at the control station 1040, but act as a secondary device 1020s when receiving a haptic signal from the control station 1040.

Similar to the control station 40, the control station 1040 can include an interface module 1048, a storage module 1044, a controller module 1042 and a processing module 1046. In the example shown in FIG. 1B, certain example controller modules 1042, such as a mapping module 1042b and one or more control modification modules 1042a, are shown to be located remotely from a control sub-station 1041. It will be understood that one or more of the controller modules 1042 can be located at the control sub-station 1041 and/or remotely away from the control sub-station 1041 but in electronic communication with the control sub-station 1041.

Similar to the interface module 48, the interface module 1048 may include any interface that enables the control station 1040 to communicate with other devices and systems. The interface module 1048 can include an input module for receiving input signals from the primary devices 1020p and other types of signals, such as a state change indicator from one or more secondary devices 1020s. The state change indicator can represent an adjustment or change at the primary device 1020p or the secondary device 1020s. The various different adjustments identifiable by the robotic system 1000 will be described with reference to the mapping module 1042b.

The interface module 1048 can also be operable for providing the one or more control commands to the respective one or more secondary devices 1020s. The interface module 1048 may, in some embodiments, also provide modifiers generated by the control modification modules 1042a to the respective secondary devices 1020s.

The storage module 1044 can store information related to the operation of the robotic system 1000, such as information associated with the various robotic devices 1020s, 1020p and the auxiliary station 1014. For example, the storage module 1044 can store or be operable to provide (e.g., from the remote storage module 1012 via the network 1016) one or more different configuration profiles for the robotic system 1000. Each configuration profile can include various definitions or operational parameters associated with the operation of the robotic system 1000. For example, the configuration profile can provide the mapped associations between each primary device 1020p and the secondary devices 1020s. The mapped associations can indicate which primary device 1020p provides input signals to which secondary device 1020s. The input signals received from each primary device 1020p may include a primary device identifier.

Each configuration profile can define a set of operational parameters that is different from another configuration profile. As will be described with respect to the mapping module 1042b, the control station 1040 can operate in accordance with different configuration profiles based on different states of the secondary devices 1020s.

For example, for a particular secondary device 1020s, a first configuration profile can include mapped associations in which a left controller at the control station 1040 provides input signals to a left robotic arm at the secondary device 1020s and a right controller at the control station 1040 provides input signals to a right robotic arm at the secondary device 1020s. A second configuration profile can include different mapped associations, such as the left controller and the second controller both providing input signals to the left robotic arm. The input signals may include multiple different input signals directed at different aspects of the operation of the secondary device 1020s. For example, the input signals can include a first input signal defining a first aspect of the operation of the secondary device 1020s (e.g., a displacement) and a second input signal defining a second aspect of the operation of the secondary device 1020s (e.g., an orientation). Another example configuration profile can include mapped associations in which one controller provides input signals to multiple secondary devices 1020s. The secondary devices 1020s can then move in synchronization with each other.

The processing module 1046 can operate in a similar manner as the processing module 46. For example, the processing module 1046 can determine how the control station 1040 may operate based on the information available via the other components in the robotic system 1000, such as the mapping module 1042b, the interface module 1048, the storage module 1044 and the control modification modules 1042a.

The processing module 1046 can generate control commands based on various different information, such as the received input signals and the configuration profile for example. The control commands are indicative of an operation to be conducted by the respective secondary device 1020s or multiple secondary devices 1020s.

In some embodiments, for each input signal received by the control station 1040, the processing module 1046 can identify, from the configuration profile, which secondary device(s) 1020s are in mapped association with the primary device 1020p that provided the input signal. The processing module 1046 can then associate that input signal with the identified secondary device(s) 1020s.

Depending on the configuration profile, a secondary device 1020s can operate based on input signals provided from one or more primary devices 1020p. When the processing module 1046 determines that the secondary device 1020s is associated with two or more input signals, the processing module 1046 can then combine those input signals together to generate the control command for that secondary device 1020s.

As described with respect to the robotic system 10, the controller module 42 can include various applications and programs for implementing some of the methods described herein. Example controller modules 42 include the control modification modules 1042a and the mapping module 1042b.

The control modification modules 1042a may manage the operation of the robotic system 1000. The robotic system 1000 can include a different control modification module 1042a for each secondary device 1020s. The control modification module 1042a can be provided as a software component, a hardware component or a combination of a software and hardware component. For example, the control modification module 1042a can include one or more server computers located at the control sub-station 1041 or remotely from the control sub-station 1041.

Each control modification module 1042a can manage the operation of a respective secondary device 1020s by determining whether an operation of that secondary device 1020s will cause non-compliance with the operational parameters defined by the configuration profile. For example, in some embodiments, the control modification module 1042a can detect that an operation of the secondary device 1020s based on the control commands provided by the processing module 1046 will fail to comply with the operational parameters. Based on the detection of the failure to comply, the processing module 1046 can then identify the non-compliant control command, that is, the control command that will cause the operation of the secondary device 1020s to be non-compliant with the configuration profile. Example of non-compliance will be described with reference to FIGS. 8A to 11B.

After identifying the non-compliant control command, the control modification module 1042a can generate a modifier to adjust the non-compliant control command in order for the secondary devices 1020s to operate in compliance with the configuration profile. The modifier can include various different signals, such as a signal for removing a component of the control command, a signal to vary a degree of the control command (e.g., in a gradual manner or in a steep manner), and other signals for modifying the control command accordingly.

With the various control modification modules 1042a, the described control station 1040 can accommodate multiple control objectives prior to providing the output signal to the respective secondary devices 1020s. The various control objectives can be provided in the configuration profile or from the operator via the user interface 106, for example. The output signals correspond to the control commands modified by the various modifiers to facilitate the various control objectives required for the tasks or operations to be conducted by the secondary devices 1020s. For example, the modifiers can be incorporated into the control commands to generate the output signals. As will be described, the modifiers can apply different adjustments to the one or more of the control commands, such as removal of a component of at least one control command. The adjustment resulting from the application of the modifiers can be gradual, in some embodiments. As a result, the secondary device 1020s will unlikely be subjected to any spurious motion commands or conflicting control signals.

As shown in FIG. 1B, the processing module 1046 can provide the generated control commands to the respective secondary devices 1020s via the network 1016. The control modification modules 1042a can provide the modifiers to the respective secondary devices 102a directly via the network 1016 or indirectly via the control sub-station 1041. The control commands and modifiers are received at an output module. The output module operates to combine the control commands and modifiers to provide an output signal that corresponds to the operation of the secondary device 1020s.

In some embodiments, the output module is located at the respective secondary device 1020s. In some other embodiments, the output module is located at the control station 1040 so that the secondary device 1020s receive the output signal and not separate control commands and modifiers The mapping module 1042b can facilitate a response, by the robotic system 1000, to changes at the primary device 1020p and secondary devices 1020s, or the association between the devices 1020s, 1020p. For example, when the control station 1040 receives the state change indicator, the mapping module 1042b can update the configuration profile based on that state change indicator. As described, the state change indicator may indicate that an adjustment took place at the relevant primary device(s) 1020p and secondary device(s) 1020s. In some embodiments, in response to the state change indicator, the mapping module 1042b may select another configuration profile to accommodate the change identified by the state change indicator.

Example adjustments can include a change to a mapped association between a primary device 1020p and a respective secondary device 1020s. In response to the adjustment in the mapping association, the mapping module 1042b can identify the configuration profile corresponding to the new mapped association. For example, when a sensing arm at the secondary device 1020s is moved to face an opposite direction from an initial direction, a corresponding state change indicator can be received by the control station 1040. The mapping module 1042b can adjust the configuration profile or select a different configuration profile accordingly. That is, the mapping module 1042b can adjust the configuration profile so that the robotic arms at the secondary device 1020s operate based on input signals provided by the opposite controllers (e.g., the right robotic arm would operate based on input signals provided by the left controller, and the left robotic arm would operate based on input signals provided by the right controller).

Another example adjustment can be an occurrence of a closed kinematic loop at the secondary device 1020s. In response to the closed kinematic loop, the mapping module 1042b can identify the configuration profile that can adapt the secondary device 1020s to the closed kinematic loop. For example, the mapping module 1042b can adjust the configuration profile so that one controller at the control station 1040 provides input signals to the robotic arms involved in the closed kinematic loop for synchronized motion control.

Figure 3A:
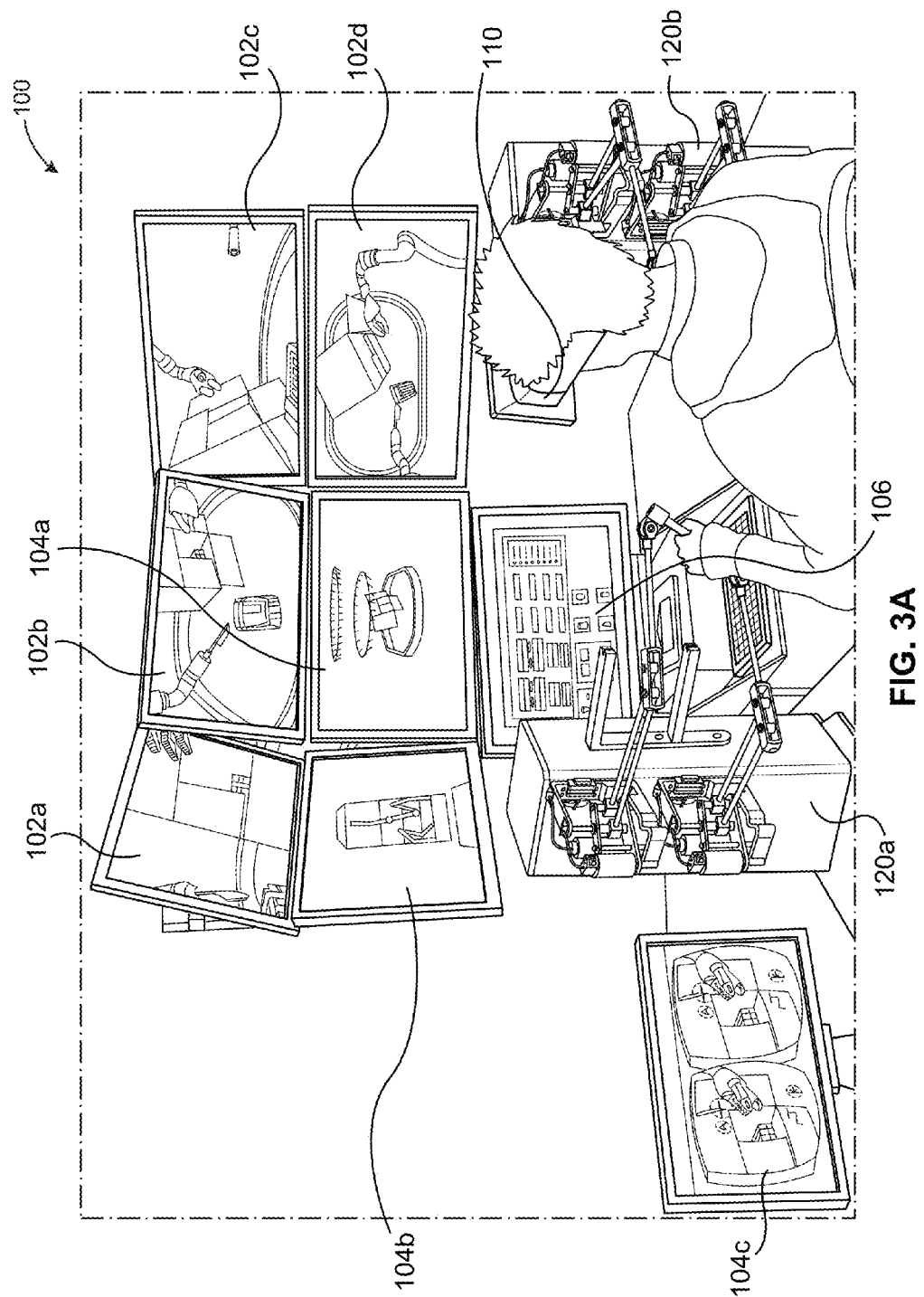
FIG. 3A illustrates an example control station in accordance with an example embodiment.

An example embodiment of the control station 40, 1040 will now be described with reference to FIG. 3A. FIG. 3A illustrates an example control station 100. The control station 100 may act as a main control interface for the user's interaction with the robotic device 20. As shown in FIG. 3A, the control station 100 can include various displays and input devices.

As shown in the example of FIG. 3A, the displays can include one or more views from different directions in respect of the target. For example, in FIG. 3A, the control station 100 includes displays for a left view 102a, a front view 102b, a right view 102c and a top view 102d.

Other displays directed to three-dimensional view of the target and the control area can also be provided. The various 3D displays 104a to 104c may be provided in real-time.

Figure 3B:
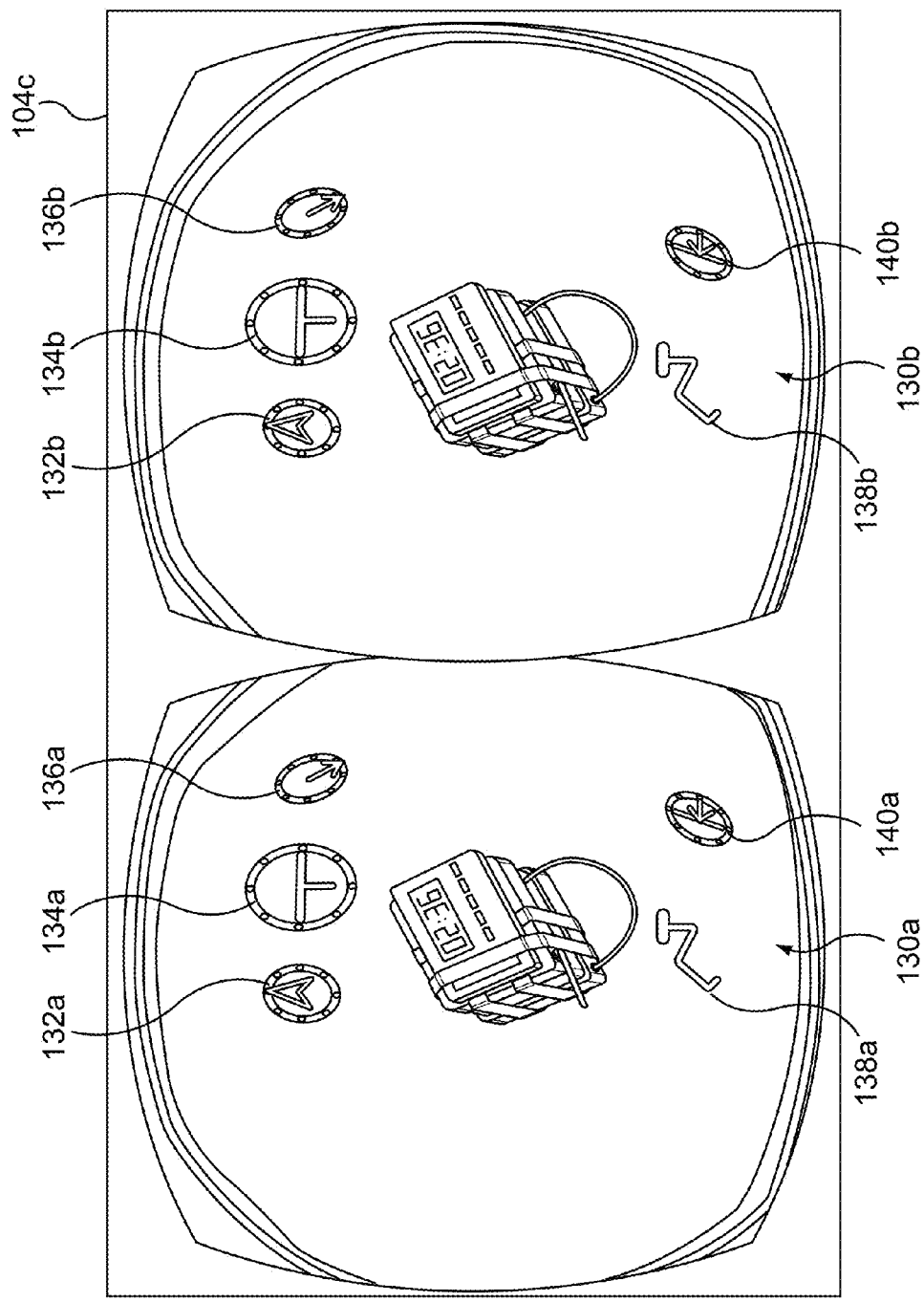
FIG. 3B is an example stereo vision view provided by the control station of FIG. 3A.

As shown in FIG. 3A, the control station 40, 1040 can show a 3D model 104a of the target (e.g., a 3DRM viewer) and a 3D visualization 104b of the environment of the target and the robotic device 20. A stereo vision view 104c of the target can also be provided (also shown in FIG. 3B). The stereo vision view 104c, as shown in FIG. 3B, includes a first vantage view 130a from a first vantage point and a second vantage view 130b from a second vantage point. For example, the first vantage view 130a can be the view for the user's left eye while the second vantage view 130b can be the view for the user's right eye. Based on the first and second vantage views 130a and 130b, a 3D view can be generated.

The stereo vision view 104c can also be provided with various different visual cues 132a, 132b, 134a, 134b, 136a, 136b, 138a, 138b, 14a and 140b. Examples of the visual cues will be described with reference to FIGS. 4A to 6C.

The visual cues 132 to 140b may facilitate operation of the remote robotic device 20 by providing relative spatial data or information between an imaging reference frame, which is a frame of reference of an imaging sensor at the robotic device 20, and an operator reference frame, which is a frame of reference of the operator.

For example, during operation of the robotic device 20, an imaging arm may not be visible to the remote operator. The imaging sensor at the imaging arm can also be rotatable in one or more different directions and/or translated in one or more different directions. Also, the target can be associated with a target reference frame, and the target reference frame can be different from one or both of the imaging reference frame and the operator reference frame. The view of the target generated by the imaging sensor can provide the relative spatial information between the target reference frame and the imaging reference frame. However, a spatial relationship between the imaging reference frame and the operator reference frame may be unknown, and in some instances, the imaging reference frame and the operator reference frame may not be aligned with each other. This can be particularly problematic when control of the movement of the imaging sensor depends on a movement of the operator (e.g., the imaging sensor is moved based on movement of a head-mounted display worn by the operator).

In embodiments when the imaging reference frame is not aligned with the operator reference frame, the processing module 1046 can determine a reference frame translation for converting spatial data in the imaging reference frame to the operator reference frame based on a comparison of the imaging reference frame and the operator reference frame. The processing module 1046 can then define the spatial relationship between the imaging reference frame and the operator reference frame according to the determined reference frame translation.

Figure 4B:
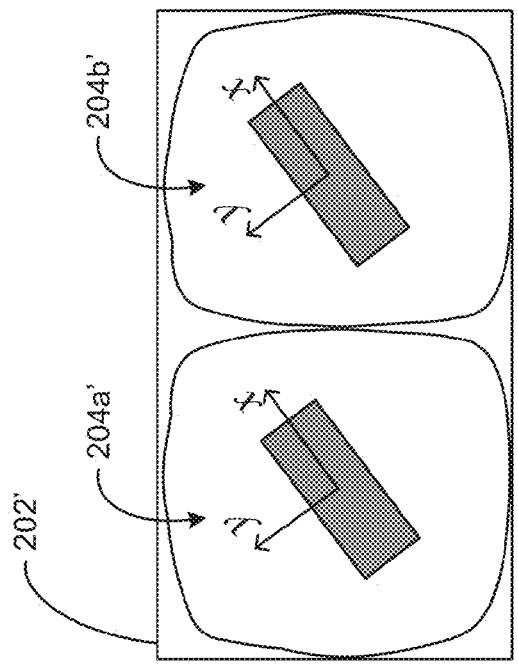
FIG. 4B is a version of the stereo vision view of FIG. 4A provided by a rotated imaging sensor.
Figure 4A:
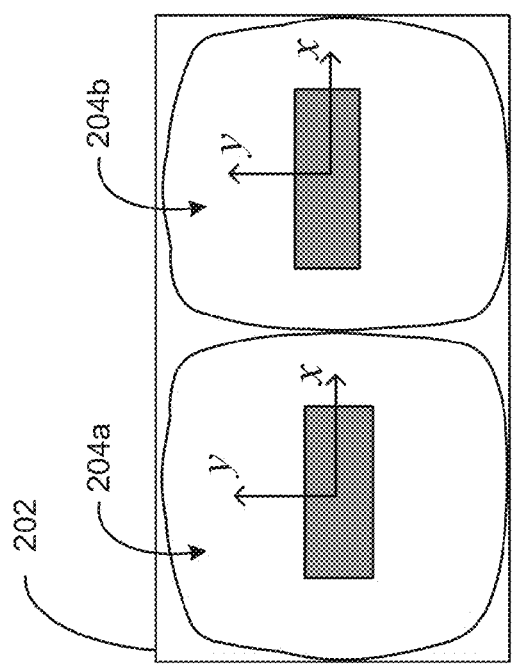
FIG. 4A is a stereo vision view of an object provided by an imaging sensor.

Referring now to FIGS. 4A and 4B. FIGS. 4A and 4B each illustrate a different stereo vision view 202 and 202', respectively, of an object. The stereo vision view 202 of FIG. 4A illustrates the instance in which the imaging reference frame is aligned with the target reference frame and the operator reference frame so that the imaging reference frame is in an aligned relationship with each of the target reference frame and the operator reference frame. The stereo vision view 202' of FIG. 4B, on the other hand, illustrates the instance when the imaging reference frame is rotated 45 degrees clockwise relative to the target reference frame so that the imaging reference frame is no longer aligned with the target reference frame and the operator reference frame.

If the operator begins operating the robotic device 20 when the imaging sensor is at the position corresponding to the stereo vision view 202' shown in FIG. 4B, or the current imaging orientation of the imaging sensor, the operator would not appreciate how the imaging sensor is positioned relative to the object, a reference frame of the robotic device 20 and the operator. That is, no known absolute reference is available to the operator to facilitate alignment between the imaging sensor, the operator and the object so that the operator can easily and accurately initiate the desired teleoperation task.

FIGS. 5A and 5B illustrate modified stereo vision views 212 and 212', respectively, corresponding to the stereo vision views illustrated in FIGS. 4A and 4B. In comparison with the stereo vision views 202 and 202', the stereo vision views 212 and 212' include example visual cues, 216a and 216b and 216a' and 216b', respectively.

The visual cues 216a and 216b and 216a' and 216b' indicate a relative spatial orientation between the imaging sensor and the operator, that is, the current imaging orientation relative to the operator reference frame.

In particular, assuming that the object is aligned with the imaging sensor, the visual cues 216a and 216b of FIG. 5A indicate that the imaging sensor is not rotated with respect to the operator (e.g., there is zero rotation at the x-axis shown in FIG. 4A, or the roll angle is zero). The visual cues 216a' and 216b' of FIG. 5B, on the other hand, indicate that the imaging sensor is rotated 45 degrees clockwise with respect to the operator. The operator, therefore, can understand from the visual cues 216a' and 216b' that the operator needs to rotate his/her frame of reference 45 degrees clockwise to be in alignment with the imaging sensor or the imaging sensor needs to be rotated 45 degrees counter clockwise to be in alignment with the object.

To determine the current imaging orientation relative to the operator reference frame, the processing module 1046 can determine an imaging position of the imaging sensor within the imaging reference frame. When the imaging reference frame is in an aligned relationship with the operator reference frame, the processing module 1046 can translate the imaging position to the operator reference frame with minimal further actions. When the imaging reference frame is not in an aligned relationship with the operator reference frame, the processing module 1046 can translate the imaging position to the operator reference frame based on, at least, the reference frame translation determined for the imaging reference frame and the operator reference frame.

Figure 6A:
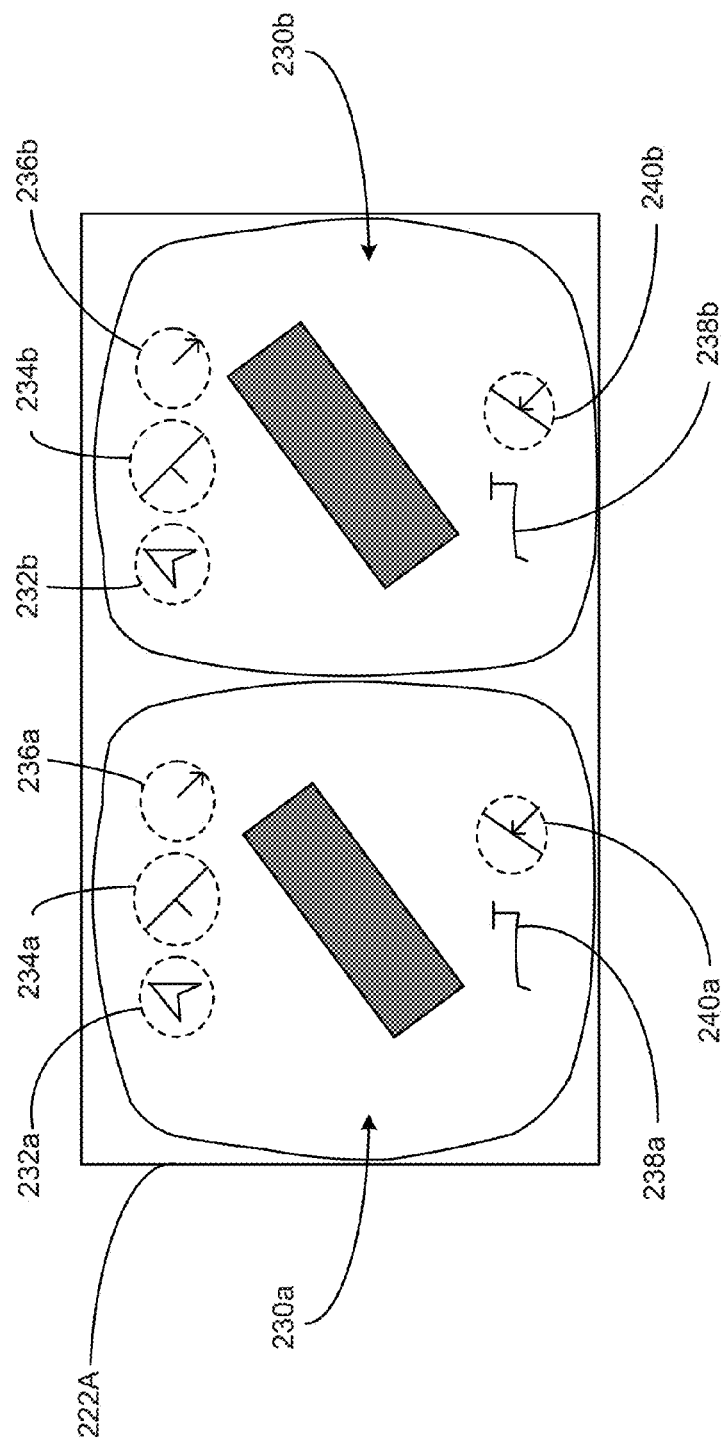
FIGS. 6A to 6C are stereo vision views with different example visual cues in accordance with an example embodiment.

As shown in FIGS. 3B and 6A, other visual cues may similarly be provided by the control station 40, 1040. FIG. 6A illustrates another modified stereo vision view 222A corresponding to FIG. 4B with example visual cues.

The modified stereo vision view 222A illustrates visual cues 232a, 234a, 236a, 238a and 24a in a first vantage view 23a and visual cues 232b, 234b, 236b, 238b and 240b in a second vantage view 230b. The visual cues 234a and 234b correspond to the roll indicator described with reference to FIGS. 5A and 5B. Similarly, visual cues 232a, 232b and 236a, 236b represent different relative angles, namely the yaw angle (rotation about a $Z_0$-axis of FIG. 12A) and the pitch angle (rotation about the $Y_0$-axis of FIG. 12A), respectively.

The yaw indicator (or heading indicator) 232a, 232b can show the direction in which the imaging sensor is pointed from a top view perspective. For example, when the yaw indicator 232a points to the right, the imaging sensor is pointing to the right side with respect to an operator reference frame.

Similarly, the pitch indicator (or tilt indicator) 236a, 236b represents the direction in which the imaging sensor is pointing from a side view perspective. For example, when the pitch indicator 236a is pointing down, the imaging sensor is pointing down with respect to the operator reference frame.

Based on the roll indicator 234a, the yaw indicator 232a and the pitch indicator 236a shown in FIG. 6A, an operator can easily understand that in order to align the head-mounted display with the imaging sensor, the operator needs to adjust the head-mounted display by approximately 45 degrees about the roll axis in a clockwise (or positive) direction, approximately 45 degrees about the pitch axis in a clockwise (or positive) direction and approximately 45 degrees about the yaw axis in a clockwise (or negative) direction.

Visual cue 238a, 238b correspond to a side view of the robotic device 20 viewed from the direction provided in 24a and 240b. For example, the visual cue 238a, which may also be referred to as an extension visual cue, correspond to how extended a robotic arm is at the robotic device 20. In the example shown in FIG. 6A, the extension visual cues 238a, 238b represent a current degree of extension of the imaging arm (robotic arm on which the imaging sensor is mounted). It will be understood that the extension visual cues 238a, 238b may similarly be used to represent an extension of other robotic arms at the robotic device 20.

As shown in FIG. 3B, the visual cues 138a, 138b indicate that the corresponding robotic arm is less extended than the robotic arm corresponding to the visual cue 238a, 238b of FIG. 6A. That is, the visual cue 238a, 238b can indicate that the robotic arm is close to a singular position and may not be able to reach any further.

Figure 7A:
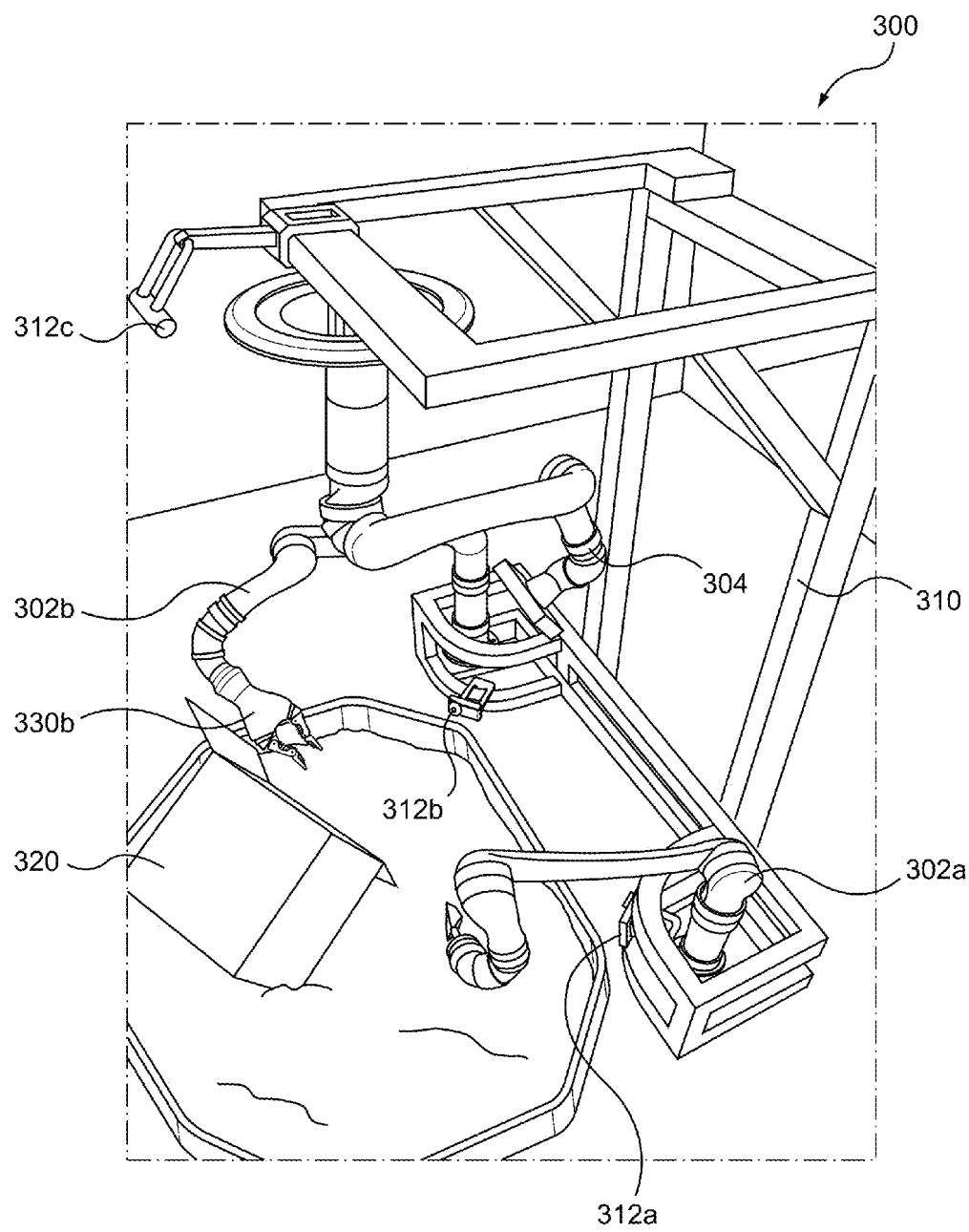
FIG. 7A illustrates an example robotic device in accordance with an example embodiment.
Figure 7B:
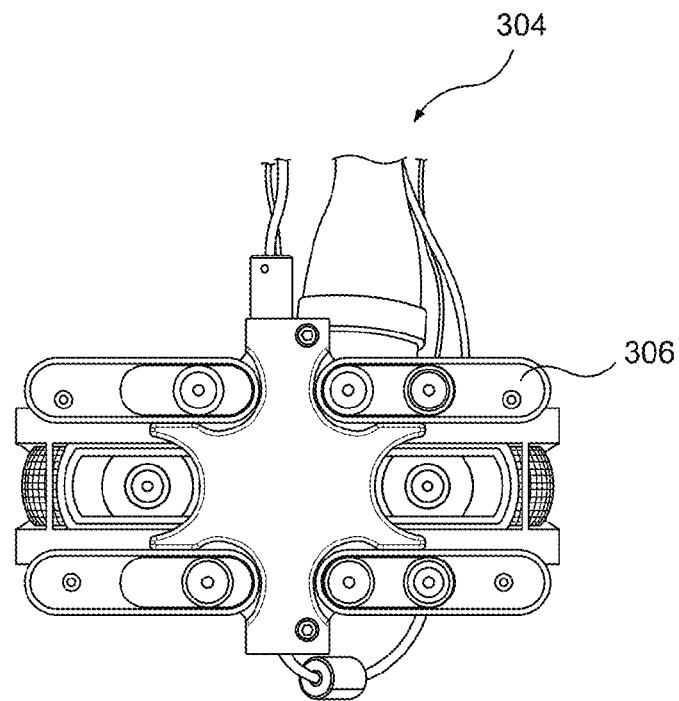
FIG. 7B illustrates an example imaging sensors at the robotic device of FIG. 7A.

Visual cue 24a, 240b correspond to a relative position of the arms of the robotic device 20 relative to a base of the robotic device 20, from a top view perspective of the robotic device 20 (e.g. the sensing arm 304 in FIG. 7A).

The visual cues 238a and 24a, together, represent a pose of the robotic arm in the operator's reference frame. In the embodiments that visual cues 238a, 238b represent a side view of the robotic arm, the visual cues 24a, 240b, which may also be referred to as direction visual cues, can represent a direction from which that side view is shown relative to the base of the robotic device 20.

Figure 6B:
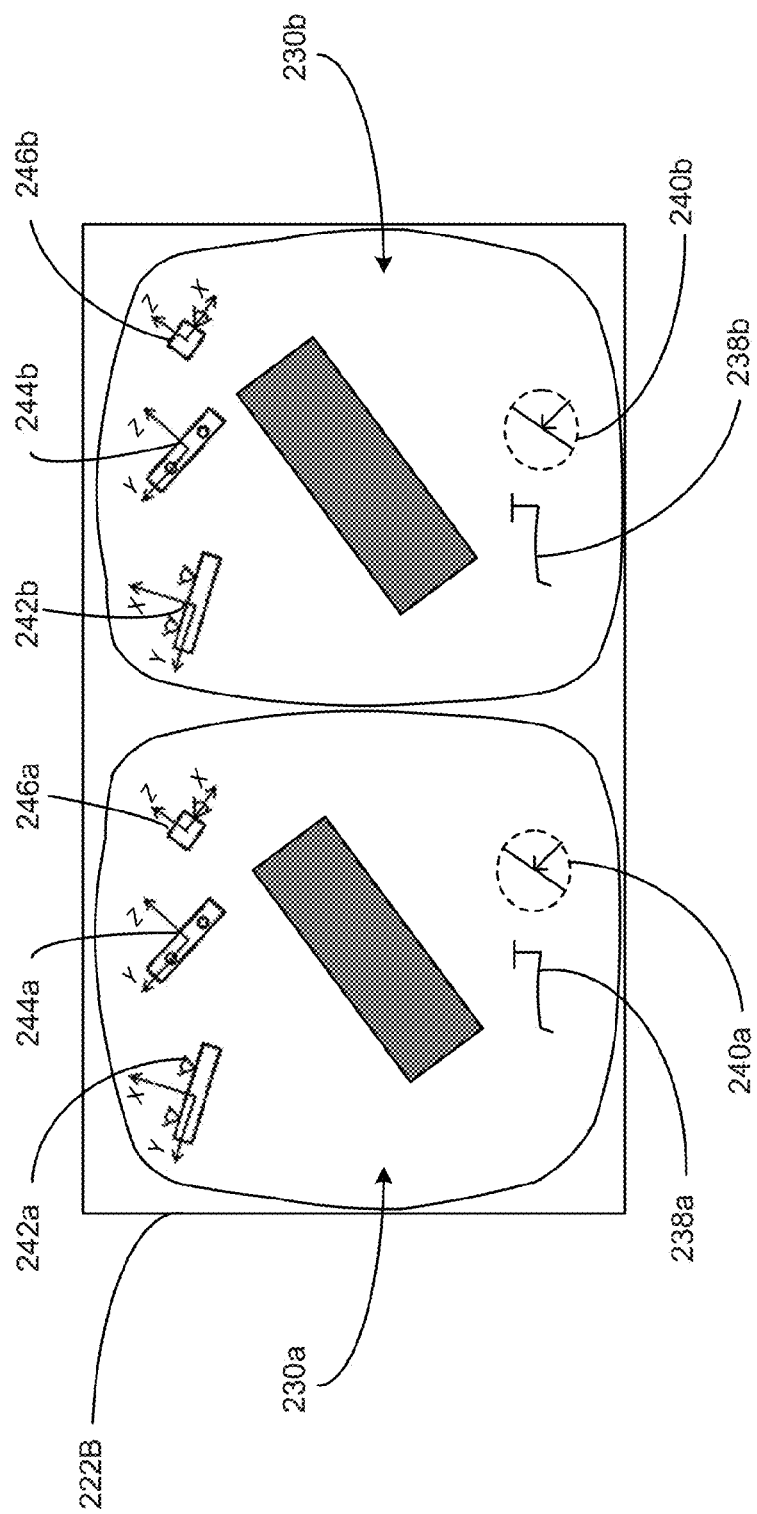
Figure 6C:
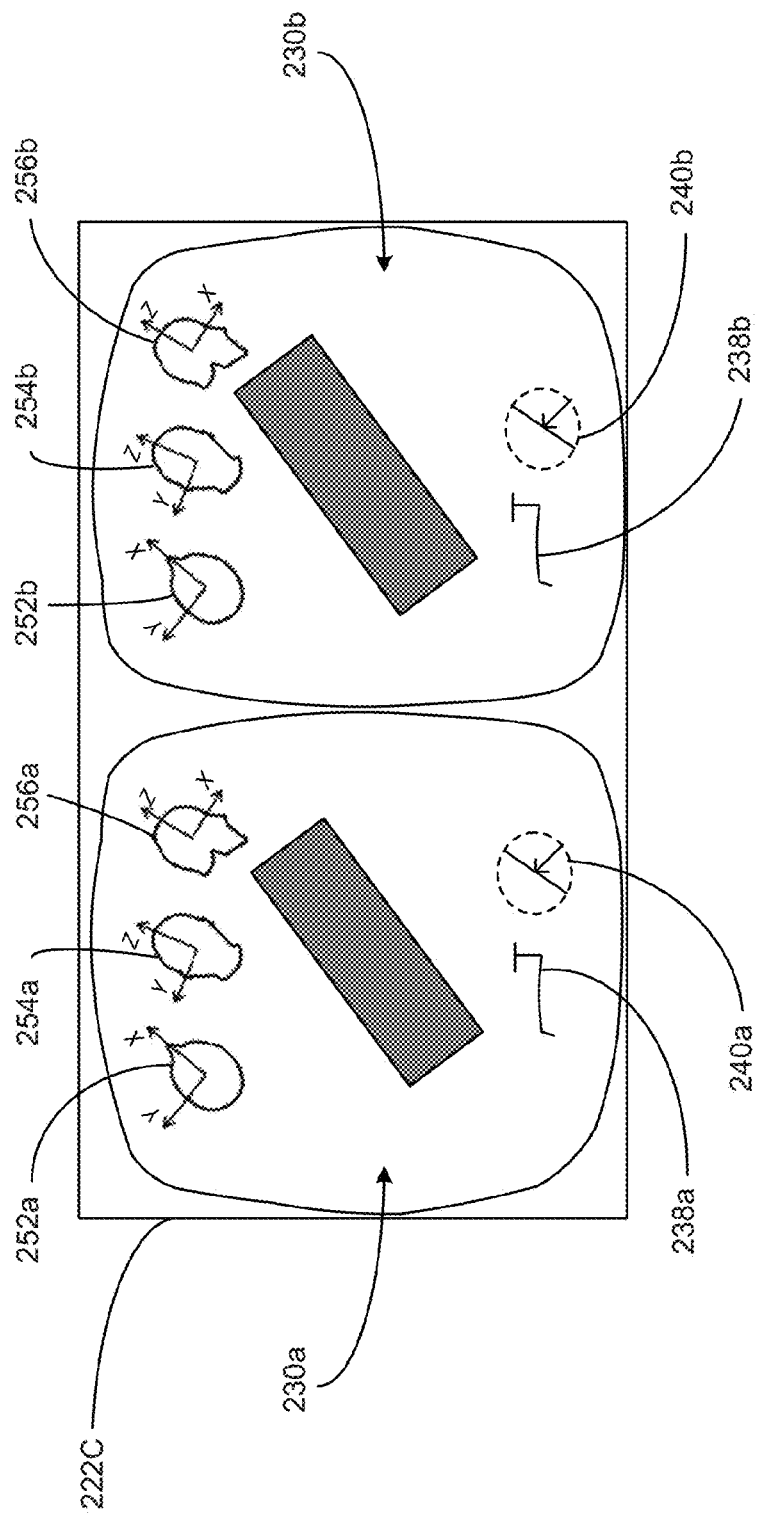

FIGS. 6B and 6C illustrate different versions of the modified stereo vision view 222A. As briefly described, the visual cues may be directed at facilitating operation of the robotic system 10, 1000 by providing a more user-friendly and intuitive display and as a result, minimizing operator cognitive load and fatigue. Therefore, the yaw, roll and pitch graphical indicators 232, 234 and 236 of FIG. 6A can be replaced with more intuitive icons, such as those shown in FIG. 6B (i.e., a representation of the imaging sensor) and FIG. 6C (i.e., a representation of an operator head). Providing the visual cues as representations of the operator head can be particularly helpful since the operator head representations can further facilitate a feeling of immersion by the operator.

In some embodiments, the control station 1040 can generate 3D visual cues based on the roll, pitch and yaw information.

In some embodiments, other information may also be provided on the display. For example, the other information can include a speed of the robotic device 20, a distance between different objects or segments, a type or size of the target objects, proximity to singularities, proximity to joint limits, relative spatial reference to nearby robotic devices 20, and a distance to a ground plane.

In some embodiments, the visual cues described can be replaced or supplemented with feedback information, such as tactile or haptic feedback, auditory feedback and vestibular feedback. The supplementary feedback may be especially useful when visual information is not available (e.g., no imaging sensor is provided at the robotic device 20, imaging data from the imaging sensor is unclear or the operator is blind).

For example, the control station 40 can generate tactile feedback to the corresponding controller to indicate that there is a misalignment between the operator reference frame and the robotic device reference frame. Different tactile feedback (e.g., different frequencies, harmonics and amplitudes) can indicate different movements. The various tactile feedback and the corresponding movements can be defined and stored at the control station 40 or the remote storage module 12, for example. If, for example, the control station 40 wants to indicate that the operator should turn his/her head slightly in a certain way, the control station 40 can provide that indicator by applying a low amplitude, low frequency tactile feedback (e.g., pulse train).

Figure 3C:
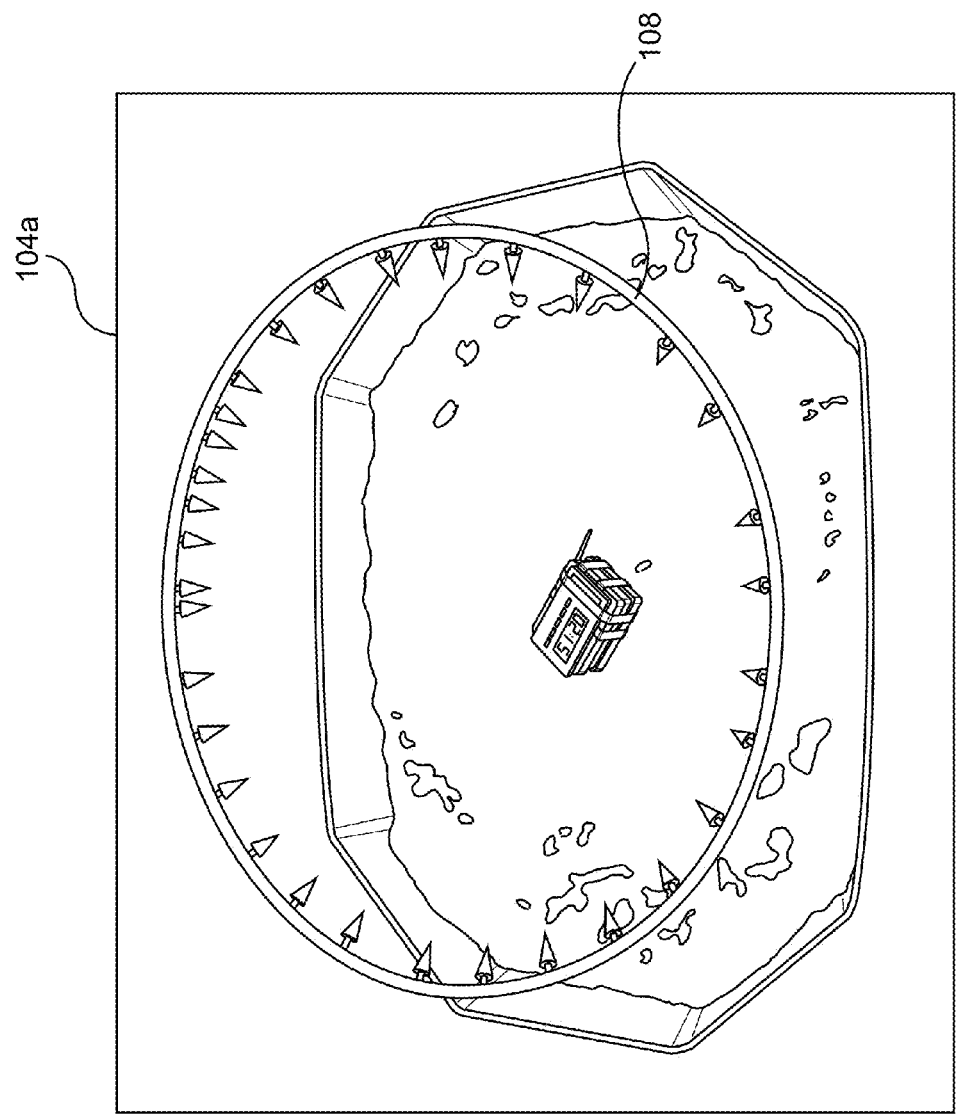
FIG. 3C is a screenshot of an example three-dimensional model provided by the control station of FIG. 3A.

Referring now to FIG. 3C, which illustrates another example 3D model 104d provided by the control station 40. The 3D model 104d can be rendered by the controller module 42 and the processing module 46 at the control station 40, for example. The 3D model 104d includes a trajectory of the imaging sensors, such as imaging sensors 306 shown in FIG. 7B, at the robotic device 20 while the imaging sensors are moved during the collection of the image data.

Figure 3D:
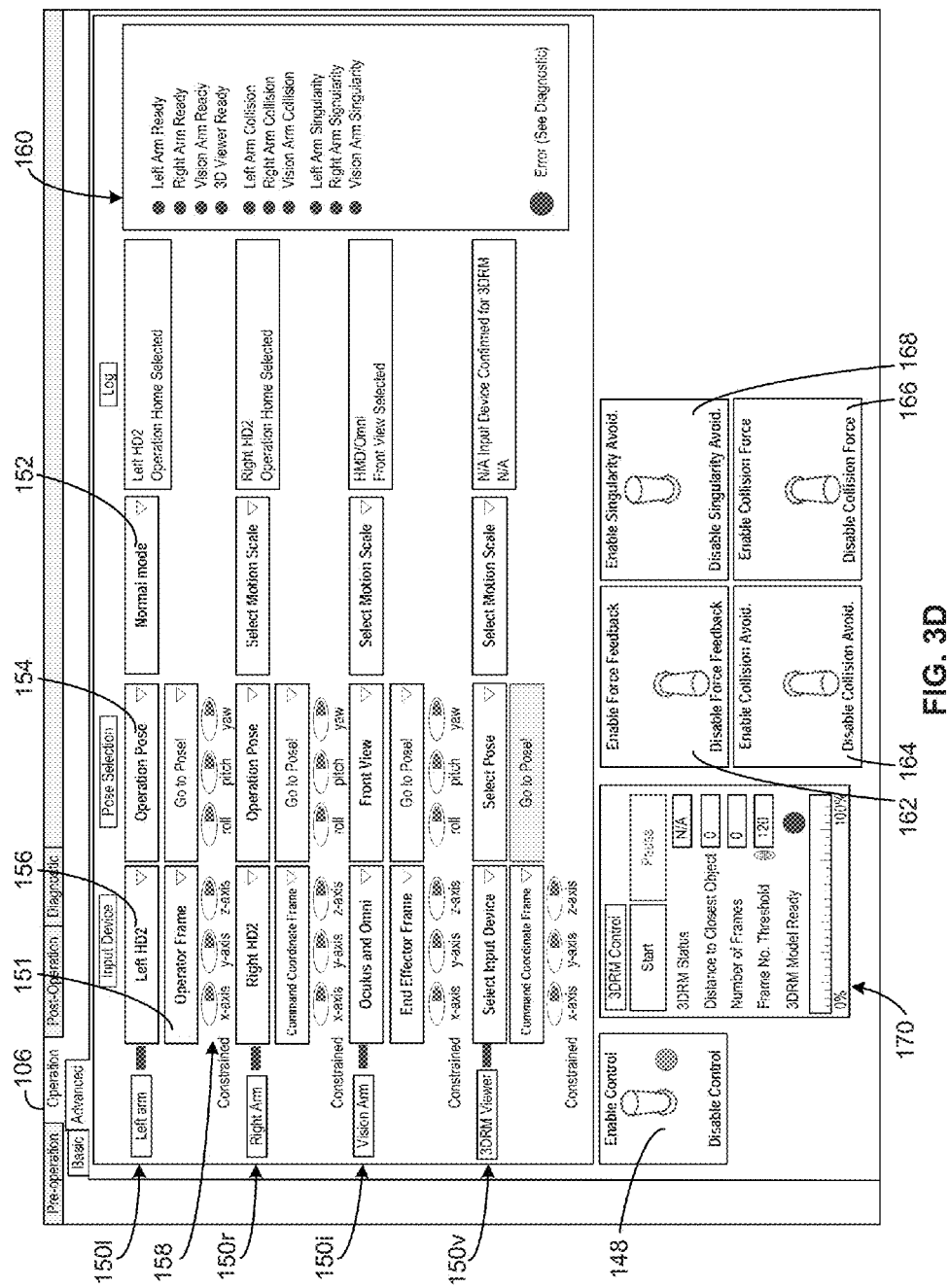
FIG. 3D is a screenshot of an example user interface for the control station of FIG. 3A.

A user interface 106 can also be provided in the control station 100 for receiving inputs from the user. A screenshot of the example user interface 106 is shown in FIG. 3D. The user interface 106 may be provided using LabVIEW™.

The control station 40, 1040 can receive configuration profiles as defined by the user via the user interface 106. As shown in the user interface 106, the various different components at the robotic device 20 may be configured. The user interface 106 in this example is provided for the robotic device 300 (shown in FIG. 7A). It will be understood that the user interface may be configured differently than shown and that additional or fewer controls may be provided.

Control of the robotic system 10, 1000 via the user interface 106 may be enabled and disabled, also, via the toggle switch 148.

In the user interface 106 of FIG. 3D, each of the arms 302a, 302b and 304 can be configured in a similar manner as shown generally at 150l, 150r and 150i, respectively. The 3DRM viewer 104a shown in FIG. 3C can similarly be configured based on controls shown generally at 150v. Additional controls for the 3DRM viewer may also be provided via the user interface 106, as shown generally at 170.

For ease of exposition, only the controls associated with the manipulator 302a ("left arm") is described. In respect of the manipulator 302a, the user interface 106 includes a reference frame control 151, an operation pose control 154, a mode control 152, a controller (or primary device) selector 156, and a constraint control 158.

The reference frame control 151 can receive a selection of a reference frame with which the input signals are to be mapped. For example, the reference frames can be selected from an operator reference frame, a command reference frame, and an end-effector reference frame.

The operation pose control 154 can receive a selection indicating how the manipulator 302a, is to be positioned, such as an operation pose. In respect of the imaging arm 304, different pose selections may be provided, such as an indication of a direction in which the imaging sensor is to be directed (e.g., front view, left side view, right side view or rear view, etc.).

The mode control 152 can receive a selection indicating how the manipulator 302a should operate based on the received input signals. That is, the manipulator 302a can operate in strict accordance to the input signals or can operate based on a variation of the input signals (e.g., the input signals can be scaled, etc.).

The controller selector 156 can receive a selection identifying the one or more corresponding controllers that is to control the manipulator 302a. This selection is used to provide the mapped associations described herein.

The constraint control 158 can receive a selection identifying one or more movements are restricted. That is, the constraint control 158 can receive inputs indicating that the manipulator 302a should not move along the x-axis and the z-axis—that is, the manipulator 302a can only move along the y-axis.

In the example user interface 106 of FIG. 3D, a status of the various configured components may also be provided at 160.

The user interface 106 also includes different toggle switches for enabling and disabling at least some of the control methods described herein. Example toggle switches include compliance switch 162, collision avoidance switch 164, collision force feedback switch 166 and singularity avoidance switch 168. When any one of the switches 162 to 168 is enabled, the control station 40, 1040 can operate to apply the respective control methods. It will be understood that controls other than the toggle switches may similarly be used.

The control station 100 can include one or more different controllers (or primary devices 1020p) for providing input and/or receiving feedback from the robotic device 20. The controllers may include various different input devices. FIG. 3A illustrates a first controller 110, a second controller 12a and a third controller 120b.

The first controller 110 may control motion at the robotic device 20. For example, the first controller 110 can control at least a linear and angular motion control of an imaging arm provided at the robotic device 20. The first controller 110 may include a combination of different technologies, such as PHANTOM Omni™ and an Oculus Rift™ head-mounted display (HMD). The Oculus Rift HMD is equipped with an integrated 3-axis gyroscope, accelerometers and magnetometers that allow for absolute head orientation tracking with minimum drifts. It will generally be understood that other controllers that can operate according to motion tracking data (e.g., motion at the head or other body parts) can similarly be used.

In some embodiments, one or more imaging filters may be provided at the controller module 42 to enable operation with the first controller 110. For example, to integrate the Oculus Rift HMD with the robotic system 10, a barrel distortion filter is included at the controller module 42 with OpenGL using shaders in order to render 3D video from HD data feeds.

The second and third controllers 12a, 120b can be haptic devices. In the example of FIG. 3A, the second and third controllers 12a, 120b are two respective haptic input devices (e.g., Quanser HD$^2$™(that can control two respective 7-degree-of-freedom (DOF) manipulators at the robotic device 20. Providing haptic feedback to the user at the control station 40 can enhance that user's perception of the operation of the robotic device 20. It will be understood that other types of haptic input devices (e.g., PHANTOM Omni and a haptic joystick) may similarly be used depending on the manipulators at the robotic device 20.

Other controllers may also be provided at the control station 100. For example, the control station 100 may include controllers for receiving auditory command inputs.

Auditory data may also be collected from sensors provided at the robotic device 20 and received at the control station 100 for processing.

Operation of any of these controllers may be varied. For example, one or more controllers can be disabled and/or enabled via the user interface 106.

Referring again to FIG. 1A, the auxiliary station 14 may be provided as a computing device. The auxiliary station 14 may be used by an observing user to provide additional assistance and support to the user at the control station 40.

For example, the auxiliary station 14 can include a display for showing a 3D model of the environment of the target, such as display 104a at the control station 40. The display at the auxiliary station 14 can be synchronized with the display 104a at the control station 40 or independently controlled based on inputs received from the observing user at the auxiliary station 14.

In some embodiments, these computing devices may be a laptop or a smartphone device equipped with a network adapter for connecting to the Internet.

The computing device may be any networked device operable to connect to the network 16. A networked device is a device capable of communicating with other devices through the network 16. A network device may couple to the network 16 through a wired or wireless connection.

As noted, these computing devices may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

The network 16 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between the various components shown in FIG. 1A, in particular the robotic device 20 and the control station 40.

The network 16 can support a video compression and transmission framework that can provide multiple video streams with minimum apparent delay. The video streams can be of different quality levels.

In some embodiments, the network 16 can include at least two virtual network connections between the robotic device 20 and the control station 40. One of the virtual network connections can be for transmitting low-bandwidth control data that can be time sensitive. The other of the virtual network connections can be for transmitting high-bandwidth data, such as image data.

The remote storage module 12 can include one or more databases (not shown) for storing information relating to, for example, the robotic device 20, the control station 40 and/or the auxiliary station 14. It will be understood that the remote storage module 12 can be a backup storage component and include a copy of the data available at the storage module 44 and the device storage module 24, for example.

Reference is now made to FIG. 7A, which illustrates a robotic device 300 in accordance with an example embodiment.

The robotic device 300 is a remotely-controlled device with three articulated arms 302a, 302b and 304 mounted on a frame 310. The frame 310 may be mobile or provided on a mobile platform. The frame 310 can be adjustable to different dimensions. It will be understood that other types and other numbers of arms may similarly be provided at the robotic device 300.

The three articulated arms include two manipulators 302a, 302b and one sensing arm 304. The two manipulators 302a, 302b in this example are two Kinova™ JACO™ 6-DOF articulated arms. It will be understood that other types of arms may similarly be used. It is also possible that different types of manipulators 302 may be provided at the robotic device 300.

One or more sensors may be mounted to the sensing arm 304 for collecting various different information from the environment and/or in respect of the robotic device 300, as will be described. Referring still to FIG. 7A, the sensing arm 304, like the two manipulators 302a, 302b, may also be provided using a fully-articulated arm, such as a JACO 6-DOF articulated arm. As will be described with respect to FIG. 7C, providing the sensing arm 304 as a full-articulated arm can enhance the quality of sensing data that can be obtained by the sensing arm 304. The full articulation of the sensing arm 304 can, in some embodiments, facilitate collection of information from environments that would otherwise be occluded, such as inside a container, underneath objects, or behind objects.

Figure 7C:
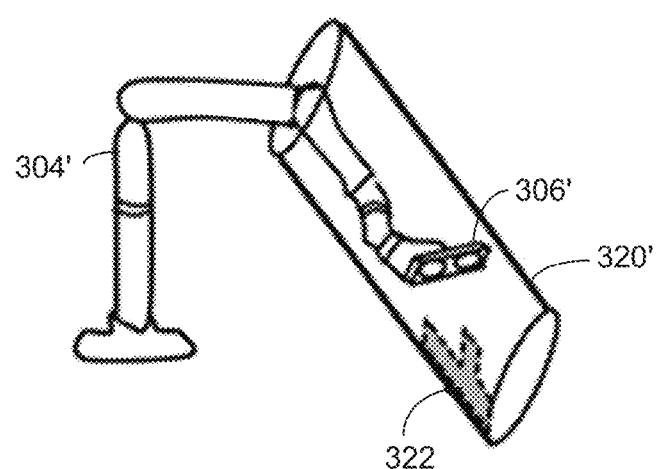
FIG. 7C illustrates an example sensing arm for the robotic device of FIG. 7A.

For example, as shown in FIG. 7C, another embodiment of a sensing arm 304' is provided. For ease of exposition, the sensing arm 304' of FIG. 7C is shown separately from the frame 310. It will be understood that the sensing arm 304' can be mounted to the frame 310 in a similar manner as the sensing arm 304 shown in FIGS. 7A and 7B.

The sensing arm 304' in the example of FIG. 7C is being operated with respect to a target 320' in order to identify the contents of the target 320'. For ease of exposition, the target 320' is transparent but it will be understood that the target 320' may not be transparent so that the contents cannot be seen from outside. The target 320' in this example is a narrow tubular structure containing an object 322. As can be seen from FIG. 7C, since the sensing arm 304' is provided as a fully articulated arm, the sensing arm 304' can maneuver with respect to the target 320' in order to obtain information with respect to the contents of the target 320', such as the object 322.

Other example types of manipulators that may provide full articulation can include, but are not limited to, Cartesian manipulators, serial manipulators (e.g., Selective Compliance Assembly Robot ARM (SCARA) and/or redundant manipulators), parallel manipulators, cylindrical manipulators, and/or spherical manipulators.

Referring still to FIG. 7A, the sensing arm 304 in this example operates as an imaging arm for receiving imaging data from the environment. As shown more clearly in FIG. 7B, the imaging arm 304 can include a set 306 of imaging sensors mounted to an end-effector of the imaging arm 304. The imaging sensor set 306 can include various different imaging sensors and camera devices, such as high-definition (HD) video sensors for providing one or more HD video feeds, red-green-blue-depth (RGB-D) imaging sensors (e.g., a PrimeSense™ camera or Kinect™), infrared (IR) imaging sensors, X-ray imaging sensors, ultrasonic sensors (e.g., ultrasonic transducers that operate based on time-of-flight), and/or laser sensors. The imaging sensor set 306 can be controlled by control inputs provided by the user at the control station 40 to obtain visual information of a target 320, such as the box shown in FIG. 7A.

The visual information obtained at the imaging arm 304 can include HD stereo imaging data and RGB-D data from the respective sensors. The HD stereo imaging data can be generated based on the data provided in the HD video feeds. The HD video feeds may be provided in real-time. When the RGB-D data is received from the robotic device 20, the control station 40 can provide a 3D model of the target 320 accordingly. For example, the controller module 42 at the control station 40 can render the 3D model shown in the display 104a using colour and depth information measured from the RGB-D data.

As described, various different sensors 306' can be coupled to the end-effector of the sensing arm 304'. Example sensors in addition to the various described imaging sensors can include radar sensors, sonar sensors, Light Detection and Ranging (LIDAR) sensors, and/or noise or sound sensors (e.g., microphones). The types of sensors that may be provided at the sensing arm 304' can vary depending on the intended use of the robotic device 300. For example, and not of limitation, sonar sensors may be coupled to the sensing arm 304' to obtain depth information for generating the 3D model of the target 320. The sonar sensors may be used when the robotic device 300 will likely be operated in low light environments.

Referring again to FIG. 7A, various other imaging devices 312, such as cameras 312a, 312b and 312c, can be mounted at various positions of the frame 310 to provide further information on an environment of the target 320 and a workspace of the robotic device 20. The additional imaging data can further improve the user's awareness of the situation and surrounding of the robotic device 20 and the target 320.

As noted, haptic feedback provided by the various controllers (such as the second and third controllers 12a, 120b) can enhance the user's perception of the remote environment even though that user is operating the robotic device 20 from the control station 40. By providing the imaging arm 304 equipped with the imaging sensor set 306, a further enhanced experience can be provided to the user at the control station 40.

For some of the described embodiments, the robotic system 10 can operate based on at least a combination of real-time stereo imaging, appropriate visual indicators and head-motion tracking. The combination of the various sensing data and tracking data can help to improve the effectiveness of performing at least some tasks by the robotic device 20, especially those requiring distance and depth information.

Various operations of an example embodiment of the robotic system 10 will now be described.

At start-up, the robotic system 10 may undergo a test sequence. The test sequence may include one or more different procedures, and may be predefined. For example, the test sequence can include a self-diagnosis procedure and a calibration procedure. The self-diagnosis and calibration procedures can include a test of the various sensors (e.g., the force and/or torque sensors) and manipulators (e.g., the grippers) at the robotic device 20 independent of the initial system state or initial poses of the robotic device 20. The self-diagnosis and calibration procedures may also calibrate the various sensors and manipulators.

The initial state of the robotic device 20 (that is, before system start-up) can include configuring the arms 302, 304 of the robotic device 20 in positions that are safe for subsequent movement of the robotic device 20. The position of the arms 302, 304 can take into consideration the surrounding environment of the robotic device 20. Accordingly, homing may not be required at the calibration stage.

The robotic system 10 can notify the user at the control station 40 of any problems and/or malfunction determined from the test sequence. For example, the diagnostic information, including system warnings and hardware and software malfunctions, can be presented to the user via the user interface 106.

The start-up process can typically be completed relatively quickly since the robotic system 10 is intended to operate in time-sensitive situations, such as for disposing IEDs.

After a successful start-up, the robotic system 10 can be deployed for investigating the target 320. The robotic device 20 can be driven, remotely, by the control station 40 to the location of the target 320. During the operation of the robotic system 10, various data is collected by the robotic device 20 and provided to the control station 40. The robotic device 20 may, in some embodiments, process the collected data prior to providing data to the control station 40.

As noted, the various data can include imaging data received from the imaging sensor set 306 and the other imaging devices 312 at the robotic device 20, and drive telemetry information (e.g., device speed, heading, location, etc.). Haptic feedback can also be provided to the second and third controllers 12a, 120b to further provide the user with an immersive experience.

Once the robotic device 20 is navigated to the location of the target 320, the control station 40 can orient the robotic device 20 with respect to the target 320. For example, the control station 40 can orient the robotic device 20 such that the target 320 is within a workspace defined by the arms 302, 304 of the robotic device 20. In some embodiments, the control station 40 can orient the robotic device 20 to provide a symmetric workspace for the two manipulators 302a, 302b. The symmetric workspace is generally when the target 320 is located approximately halfway between the two manipulators 302a, 302b. The symmetric workspace can facilitate easier operation of the two manipulators 302a, 302b.

In some embodiments, the control station 40 can deploy the sensing arm 304 into an operating position while maintaining the two manipulators 302a, 302b in the initial positions. As a result, the control station 40 can navigate the sensing arm 304 to collect different sensing data of the target 320 without running into potential collisions with the two manipulators 302a, 302b.

The robotic device 20 can perform an initial inspection of the target 320 and its surrounding to determine the tasks to be conducted. The initial inspection can involve collaboration between the control station 40 and the auxiliary station 14.

Various components can be operational during the initial inspection. For example, the device processing module 26 can initiate operation of a minimum jerk trajectory application component at the applications module 32 for controlling any sudden changes in the movement of the sensing arm 304 while sensing data is being captured. The quality of the 3D models to be generated by the robotic device 20 can be affected by the movement of the sensing arm 304 during data collection.

The device processing module 26 can also initiate operation of a 3D real-time modeling (3DRM) application component at the applications module 32 for generating a 3D model of the target 320. The 3D real-time modeling application can include a machine-vision 3D reconstruction and mapping software based on the collected RGB-D data. In some embodiments, the 3D model of the target 320 can include a photo-realistic 3D model of the target 320.

At the control station 40, the processing module 46 can initiate 3D real-time modeling viewer software for displaying and receiving control inputs for manipulating the 3D model generated by the 3D real-time modeling application. The control station 40 can also initiate operation of the first controller 110 to provide a real-time stereo vision with visual cues (such as the display shown in FIG. 3B) based on head motion tracking.

The initial inspection may involve a predefined series of steps by the sensing arm 304. For example, the sensing arm 304 can perform multiple predefined trajectories, such as circular or spiral trajectories. The trajectory 108 shown in FIG. 3C is an example. In some embodiments, the trajectory of the sensing arm 304 can be circular so that symmetric data can be collected 360° around the target 320. The robotic device 20 can generate an initial 3D model of the target 320 based on the data collected by the sensing arm 304.

The robotic device 20 can then transmit the initial 3D model to the control station 40 and/or the auxiliary station 14 for display. The model data can be transferred incrementally to the control station 40 via various data transfer protocols over the network 16, such as file-transfer-protocol (FTP). The initial 3D model can be available at the control station 40 with minimum delay (for example, possibly within five minutes from the start of the initial inspection). The robotic device 20 can continue to transmit updated 3D model data over time. In some embodiments, the robotic system 10 can continue to update the 3D model of the target 320 with new data obtained from subsequent manual or pre-programmed automatic inspection procedures.

By sharing the initial 3D model between the different users at the control station 40 and the auxiliary station 14 in real-time, discussion can be facilitated to resolve the situation while minimizing risk. As a result, other experts and observers can contribute to the situational analysis and assessment in parallel with the user at the control station 40. The observing users at the auxiliary station 14 can leverage additional resources and reference materials including data associated with previously inspected targets (e.g., similar IEDs, etc.) to increase the effectiveness of the inspection.

The control station 40 can receive control inputs from the user for interacting with the initial 3D model of the target 320. For example, the control station 40 may display the initial 3D model on a touch screen display and can then receive the control inputs via the touch screen display. The control inputs can include various manipulations of the view angle and zoom level of the initial 3D model. Additionally, the operator can extract distance and size measurements of the object under inspection from the 3D model by specifying points of interest in the 3D model viewer.

The initial 3D model can provide a high resolution, all-around view of the target 320. The initial 3D model can facilitate in-depth inspection and analysis. At least some details, including color, shape and dimension information, can be critical for identifying the target 320 and assessing any associated risk.

In some embodiments, the control station 40 can receive control inputs for navigating the sensing arm 304 to collect additional data in order to better characterize the target 320 and determine the tasks required. As described, the sensing arm 304 may be provided as a fully articulated arm in order to enhance the extent of relative motion with respect to the target 320 and accordingly, the quality of sensing data obtainable via the sensors mounted at the sensing arm 304. As noted, the sensing arm 304 can include, at least, a live HD feed at the imaging sensor set 306. The movement of the sensing arm 304 can also be controlled by the first controller 110 and include a head motion tracking capability. The user at the control station 40 can benefit from an increased sense of depth in the surrounding of the target 320 and allow for a more intuitive control of the sensing arm 304.

It will be understood that the movement of any of the arms 302, 304 can be navigated via one or more other controllers, such as a joystick.

In some embodiments, the control station 40 can synchronize the viewpoint of the initial 3D model with a live image of the target 320 provided by the imaging sensor set 306. The live image can be generated based on data provided from the live HD data feeds. This can facilitate side-by-side comparison between the initial 3D model and the live image of the target 320.

In some embodiments, data associated with the 3D models can be stored in the remote storage module 12, the storage module 44 and/or the device storage module 24 for reference. For example, the initial 3D model generated from the described initial inspect can be analyzed for identifying trends in the various 3D models.

Based on the initial inspection, the user at the control station 40 can determine a sequence of tasks to be conducted by the robotic device 20. Example tasks will be described with reference to FIGS. 13A to 16D.

As noted, the robotic system 10 described herein may be used in situations associated with unknown and potentially high risks, such as for the disposal of IEDs. Accordingly, the tasks described with reference to FIGS. 13A to 16D are generally directed to actions that may be required for inspecting targets that may be or may contain IEDs (e.g., operating the robotic device 20 to open a bag to inspect its interior, or operating the robotic device 20 to lift or move a target suspected as being an IED), and actions that may be required for disposing targets that may be IEDs. It will be understood that the described robotic system 10 can be applied in different environments and conduct other analogous tasks in those environments.

The tasks illustrated in each of FIGS. 13A to 16D can involve different control methods directed at different control objectives, such as providing stable and scaled motion, singularity avoidance, cross-coupled hybrid control of the arms at the robotic device 20, collision detection and avoidance, compliance control and constrained motion. The tasks illustrated in each of FIGS. 13A to 16D can also include different configurations, such as one manipulator operations, tool-handling operations and coordinated multiple-manipulator operations. Other configurations may similarly be used.

The various different control methods are now described with reference to FIGS. 8A to 11B. The various control methods described herein may involve a decomposition of the relevant control commands into various command components and a modulation of one or more of those command components. The modulation can involve a variation of amplitude of the command component or a removal of that command component, depending on the purpose of the application of the control method.

Methods for providing stable and scaled motion can involve operations by the control station 40, 1040 for varying the speed at which the arms 302, 304 at the robotic device 20 moves. For example, the speed at which the arms 302, 304 moves may not be directly proportional to the speed in which the corresponding controllers 12a, 120b are moved by the user. Instead, the described methods for providing scaled motion can involve varying the speed at each of the arms 302, 304 and the controllers 12a, 120b for providing refined control.

Methods for providing singularity avoidance can involve operations by the control station 40, 1040 to allow only some control inputs to be transmitted to the robotic device 20. With the described methods herein, unintended motion can be avoided by restricting transmission of control inputs between the control station 40, 1040 and the robotic device 20 to only control inputs that are explicitly provided by the user at the control station 40, 1040.

Figure 8B:
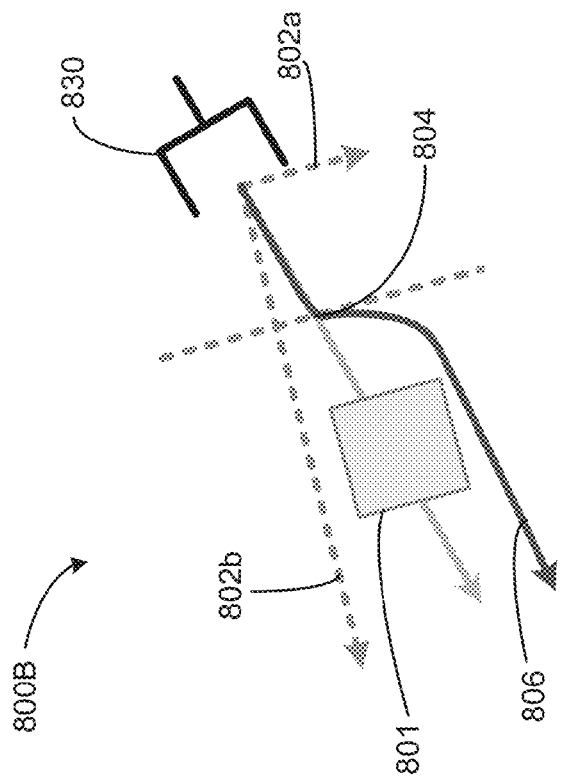
FIGS. 8A and 8B illustrate an example embodiment of an application of a method of providing singularity avoidance as described herein.
Figure 8A:
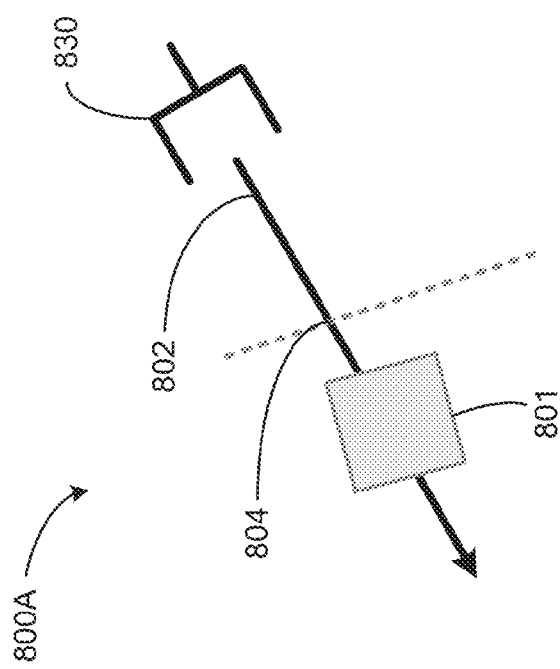

FIGS. 8A and 8B illustrate an example application of the described methods of providing singularity avoidance. FIG. 8A generally show, at 800A, a path 802 of a manipulator 830 based on the input signals provided. FIG. 8B show, at 800B, a modulated path 806 for the manipulator 830 after application of the described method for providing avoidance singularity, as represented by the representation 801.

The singularity avoidance control method involves determining whether a position of the manipulator 830 exceeds a measure of manipulability threshold. The measure of manipulability is described generally by G. Marani et al. in "A Real-Time Approach for Singularity Avoidance in Resolved Motion Rate Control of Robotic Manipulators", ICRA 2002, 1973-1978, and can be used to detect proximity to singularities for a manipulator 830 during operation of the secondary device 1020s. The measure of manipulability threshold can define a maximum proximity to a singularity for a particular manipulator 830. For example, the measure of manipulability threshold 804 is shown in FIG. 8A and can trigger application of the singularity avoidance control method. The measure of manipulability threshold may be provided in the configuration profile, for example.

During operation, the control modification module 1042a for managing singularity avoidance for the manipulator 830 can manage the operation of the manipulator 830 based on the corresponding input signals. When the manipulator 830 nears the measure of manipulability threshold 804, the control modification module 1042a can identify the command components of the control commands that cause the manipulator 830 to approach singularity. The direction towards the singularity can be determined by the control modification module 1042a using a gradient of the measure of manipulability.

As shown in FIG. 8B, the command components are 802a and 802b. The command component 802b causes the manipulator 830 to approach singularity, and therefore, the control modification module 1042a can generate the modifier for removing the command component 802b. The modifier can involve a gradual removal of the command component 802b.

The gradual removal of the command component 802b can increase as the manipulator 830 approaches singularity. For example, the closer the manipulator 830 is to the singularity, the control modification module 1042a can generate the modifier that increases the amount of the command component 802b that is removed. In some embodiments, the control modification module 1042a can generate the modifier to remove the command component 802b completely when the manipulator 830 reaches a predefined distance away from the singularity.

During the operation of the manipulator 830 in which the command component 802b is gradually removed, the command component 802a is unchanged and therefore, the manipulator 830 can automatically avoid the singularity (as shown in FIG. 8B).

In some embodiments, the control station 40, 1040 can generate force feedback corresponding to the modifiers to enhance the operator's experience.

Methods for providing collision detection and avoidance can involve identifying, by the control station 40, 1040 potential collisions between the arms 302a, 302b and 304, between the secondary devices 1020s, or as between system-defined walls or obstacles. The described collision detection and avoidance methods can be particularly important during coordinated multiple-manipulator operations in which more than one manipulator, such as manipulators 302a and 302b, can be simultaneously operated. As a result, there is a higher possibility for collision between the manipulators 302a and 302b. The described collision detection and avoidance methods can involve providing visual and haptic feedback to the user at the control station 40 to indicate a potential collision. The described collision detection and avoidance methods can also involve modifying, or even ignoring, one or more control inputs received via the interface module 48 in the case of imminent collisions between the manipulators 302a and 302b. As described with reference to the user interface 106, the collision detection and avoidance method may be selectively turned on or off during operation of the robotic device 20.

FIGS. 9A and 9B illustrate an example application of the described methods of providing collision detection and avoidance. FIG. 9A generally show, at 810A, a path 812 of the manipulator 830 based on the input signals provided. FIG. 9B shows, at 810B, a modulated path 816 for the manipulator 830 after application of the described method for providing collision detection and avoidance to a target object 811.

Similar to the singularity avoidance control method, the collision detection and avoidance method involves determining whether one or more operation of the manipulator 830 will cause a collision (such as at 814 in FIG. 9A) with another secondary device 1020s or another segment component.

In some embodiments, the control modification module 1042a for managing collision avoidance for the manipulator 830 can generate an operational model based on the relevant control commands for that manipulator 830. As part of the operational model, the control modification module 1042a can divide the various components of the manipulator 830 and the components that could potentially collide with the manipulator 830 into primitive geometric segments. An example method of converting the components into geometric segments is described by P. Bosscher and D. Hedman in "Real-Time Collision Avoidance Algorithm for Robotics Manipulators", TePRA, 2009, 113-122. Based on the operation of the manipulator 830 according to the control commands, the control modification module 1042a can determine a proximity for the pairs of these segments to identify the potential collision location and direction.

The configuration profile can include a collision distance threshold 817 (shown in FIG. 9B) defining a maximum distance allowable between two segments.

As shown in FIG. 9B, when the manipulator 830 nears the collision distance threshold 817, the control modification module 1042a can identify the command components of the control commands that cause the manipulator 830 to approach the collision distance threshold 817. In the example of FIG. 9B, the command components are 812a and 812b. The command components 812a and 812b can include a vector and magnitude of the control command.

The command component 812a causes the manipulator 830 to approach collision distance threshold 817, and therefore, the control modification module 1042a can generate the modifier for removing the command component 812a. The modifier may involve a gradual removal of the command component 812a.

The gradual removal of the command component 812a can increase as the manipulator 830 approaches the collision distance threshold 817. For example, the closer the manipulator 830 is to the collision distance threshold 817, the control modification module 1042a can generate the modifier that increases the amount of the command component 812a that is removed. In some embodiments, the control modification module 1042a can generate the modifier to remove the command component 802b completely when the manipulator 830 reaches the collision distance threshold 817.

Methods for providing compliance control can involve receiving and processing, by the control station 40, 1040, sensor measurements from the secondary device 1020s. The sensor measurements may be provided from a sensor located at the end-effector of the arms 302, 304 or torque sensors at joints of the arms 302, 304. The end-effector may include force/torque sensors for capturing data associated with an amount of force being exerted by the end-effector on the target 320, for example. The described methods for providing compliance control can help to ensure stable operation at the robotic device 20 based on the sensor measurements.

FIGS. 10A and 10B illustrate an example application of the described methods of providing compliance control. FIG. 10A generally show, at 820A, a force path 822 exerted by the manipulator 830 on the object 832 based on the input signals provided. FIG. 10B show, at 820B, a modulated force path 826 exerted by the manipulator 830 on the object 832 after application of the described method for providing compliance control.

The compliance control method involves determining whether an amount of forced exerted by the manipulator 830 exceeds a compliance threshold.

The compliance threshold may be provided in the configuration profile in some embodiments. The compliance threshold may be determined based on a maximum allowed motor torque for each joint of the manipulator 830, for example. An example equation for determining the compliance threshold is provided below as Equation (1):

$$F_{max} = J^{-1} T_{max} \tag{1}$$

where $F_{max}$ represents the compliance threshold vector, $J^{-1}$ represents a pseudo inverse of a Jacobian matrix corresponding to the kinematics of the system and $T_{max}$ represents a vector of the maximum allowed torque for the joints of the manipulator 830. The compliance threshold may be selected as a value that is close to the maximum values.

Compliance may be provided by comparing the measured force and torque amount with the compliance threshold, and then modulating the corresponding control command components accordingly. For example, the control command can be decomposed into components along the measured force and torque direction and modulated by scaling down the control command or completely removing the control command according to how close the measured values are to the compliance threshold.

For example, during operation, the control modification module 1042a for managing compliance control for the manipulator 830 can manage the operation of the manipulator 830 based on the corresponding input signals. When the manipulator 830 nears the force threshold, the control modification module 1042a can identify the command components of the control commands that cause the manipulator 830 to approach the force threshold. For example, as shown in FIG. 10B, the force path 822 can be decomposed along the direction of the force and torque measurements into the components, 822a and 822b.

As shown in FIG. 10B, the command components are 822a and 822b. The command component 822b causes the manipulator 830 to exert an amount of force that approaches the compliance threshold, and therefore, the control modification module 1042a can generate the modifier for removing the command component 822b or gradual removal of the command component 822b.

In some embodiments, the control modification module 1042a can apply a linear modulation for reducing the command component 822b. The linear modulation can reduce the command component 822b in proportion to how close the force component magnitude is to the compliance threshold. When the force component magnitude is equal to the compliance threshold, the command component 822b is completely removed. This can be useful in at least some applications, such as coupled coordinated tasks (e.g., holding a box with two robotic arms) to be carried out by multiple arms 302a, 302b, for example. An example linear modulation equation is provided below as Equation (2):

$$V_{AMC} = V_{command} - \gamma \frac{F}{F_{thr}}, \text{ for } \langle V_{command}, F \rangle < 0 \qquad (2)$$

where $V_{command}$ corresponds to a motion speed command generated based on the input signals and $V_{MAC}$ corresponds to a modulated speed command based on the compliance control methods described herein, $\gamma$ corresponds to a command removal factor, F corresponds to a measured amount of force, $F_{thr}$ is the compliance threshold and $\langle V_{command}, F \rangle$ represents a dot product of the two vectors $v_{command}$ and F.

Some tasks, however, may require a higher initial force and therefore, may involve non-linear modulation. An example task is cutting wire, which requires a higher initial force to be provided at the fingers of the manipulator 830. The compliance threshold, $F_{thr}$, therefore, can initially be associated with a higher threshold value to ensure that the initial force can be accommodated (e.g., the sharp motion required for cutting) and can be gradually decreased to a lower threshold value thereafter.

In some embodiments, the control modification module 1042a may not be able to measure a force being exerted by the manipulator 830. The control modification module 1042a may then estimate the force based on current measurements detected at the manipulator 830. In one example, the current can be measured with a current sense resistor provided at the manipulator 830. The force being exerted by the manipulator 830 may be proportional to the detected current.

When the measured amount of force reaches the compliance threshold, the command component in that direction is removed.

In some embodiments, force and torque measurements may not be available. The control modification module 1042a may instead use other information, such as motor current, to facilitate compliance control. For example, a gripper attachment without a force sensor can overheat due to excessive contact force with the object 832. Although no force measurement is available to the control modification module 1042a, the control modification module 1042a can base on the modulation of the relevant control command components based on a comparison of the measured motor current and a motor current threshold provided as part of the configuration profile. If the control modification module 1042a determines that the motor current has reached the motor current threshold, the control command associated with the motion of the gripper attachment can be removed to prevent any further increase in the contact.

In some embodiments, the control station 40, 1040 can generate force feedback corresponding to the modifiers provided during the application of the compliance control method to enhance the operator's experience. For example, in the case of the manipulator 830 pushing down on a surface, while the control modification module 1042a generates the modifier to gradually remove the control command in that direction, the control station 40, 1040 can also provide a force feedback signal to the primary device 1020p providing the corresponding input signals. The force feedback signal can correspond to the amount of force that is still applied to the surface despite the modifier to provide the contact force to the operator that mimics the effect of virtual contact.

Methods for providing constrained motion can involve selectively imposing constraints on an axis or two or more axes in the movement of the arms 302, 304. For example, the control station 40, 1040 can restrict movement of a manipulator 302 to be along or about any combination of Cartesian axes for linear and angular motion respectively. The Cartesian reference frame can also be specified as either the inertial or end-effector frame. As a result, the described methods for providing constrained motion can facilitate movement of a particular manipulator 302 to be along an arbitrary line, surface in space, or arbitrary point (e.g., for orientation motion).

The described methods for providing constrained motion may facilitate tasks that require high precision and specific movement by the arms 302, 304 at the robotic device 20. Example movements include maneuvering the gripper attachment 330 through a narrow or small opening of a target 320.

Figure 11B:
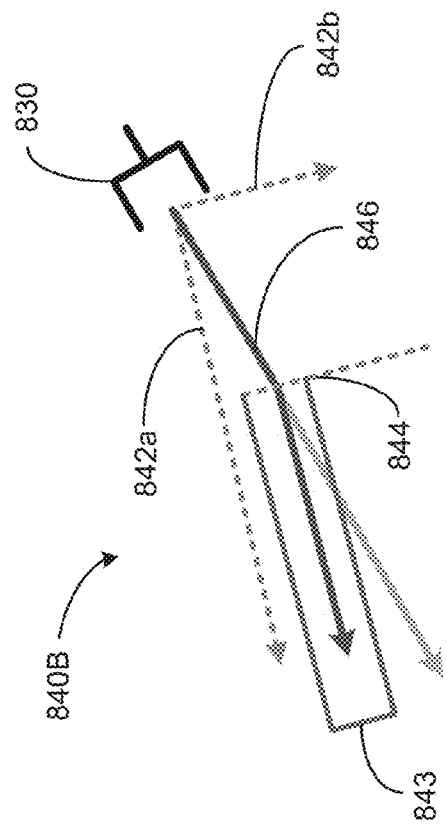
FIGS. 11A and 11B illustrate an example embodiment of an application of a method of providing constrained motion as described herein.
Figure 11A:
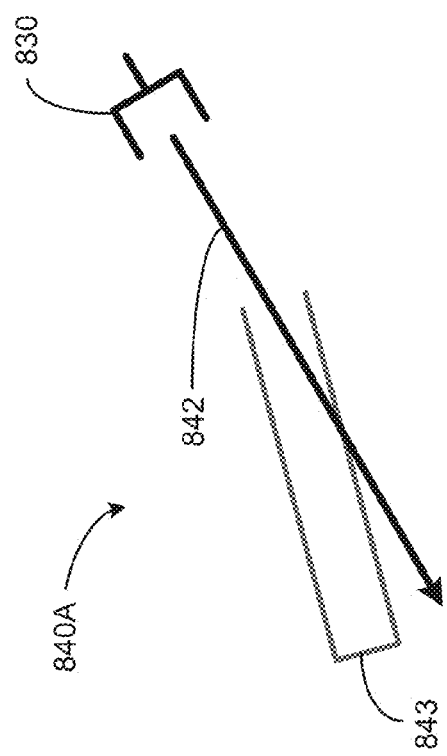

FIGS. 11A and 11B illustrate an example application of the described methods of providing constrained motion. FIG. 11A generally show, at 840A, a path 842 of the manipulator 830 based on the input signals provided. FIG. 11B show, at 840B, a modulated path 846 for the manipulator 830 after application of the described method for providing constrained motion.

As shown in FIG. 11A, based on the input signals, the resulting path 842 of the manipulator 830 would fail to conduct an insertion operation into the area 843. To provide the insertion operation, the control modification module 1042a for managing compliance control for the manipulator 830 can manage the operation of the manipulator 830 based on the corresponding input signals and the relevant control criterion for this case.

For example, as shown in FIG. 11B, the control modification module 1042a can receive an indication of the insertion operation request from the operator. The insertion operation request involves a request to operate the manipulator 830 along a defined axis. To provide the insertion operation, the control modification module 1042a can decompose the control commands into the command components 842a and 842b (shown in FIG. 11B). The control modification module 1042a can then remove all command components except the command components for operating the manipulator 830 along the defined axis of interest, or modulate the various command components 842a and 842b to provide a modulate command component for operating the manipulator 830 along the defined axis.

Figure 12A:
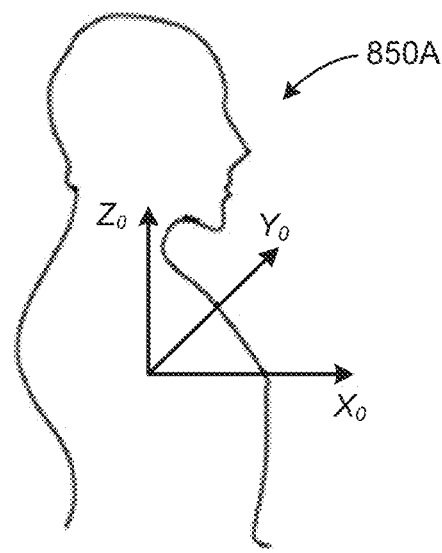
FIG. 12A illustrates an example operator reference frame.
Figure 12B:
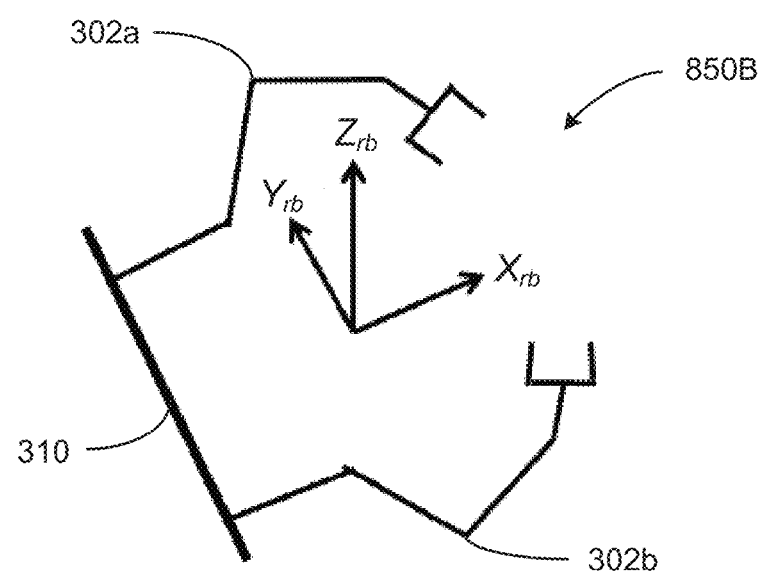
FIG. 12B illustrates an example robotic device reference frame.
Figure 12C:
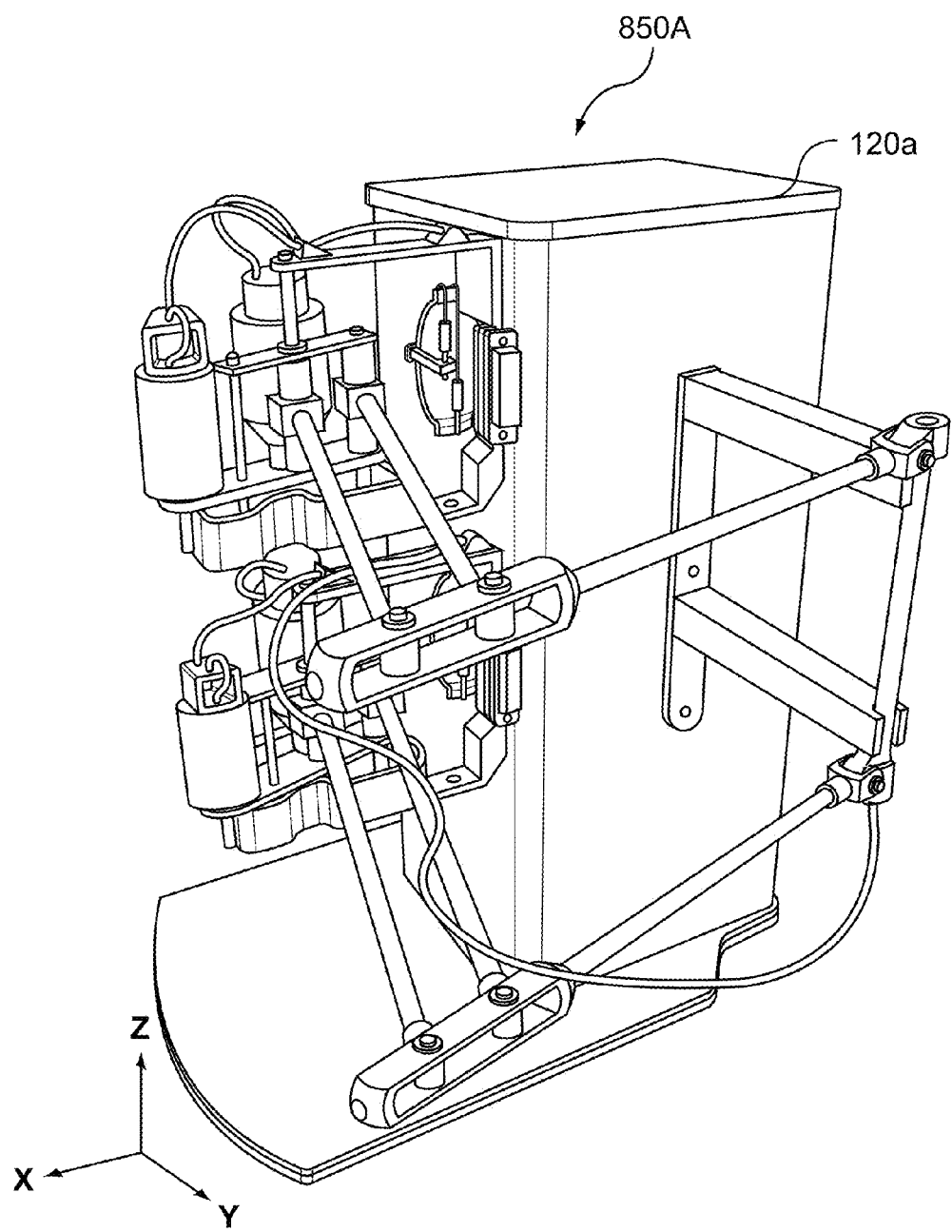
FIG. 12C illustrates an example controller reference frame.

Methods for providing mapping of control inputs received at the control station 40, 1040 from the user (e.g., an operator) to different reference frames. As illustrated in FIGS. 12A to 12C, different reference frames are available. FIG. 12A illustrates an example operator reference frame 850A, FIG. 12B illustrates an example device reference frame 850B, and FIG. 12C illustrates an example controller reference frame 850C.

The availability of different reference frames, or combinations of different reference frames, can be particularly useful for enhancing the user's experience. For example, when the user operates any one of the arms of the robotic device 20 from the control station 40, 1040, it can be more intuitive for the user to adjust the imaging arm 304 with respect to an imaging reference frame (e.g., a frame of reference at the imaging sensors 306) instead of an inertial reference frame, especially when the imaging sensors 306 at the imaging arm 304 are in an arbitrary position. With the described methods of providing hybrid control of the arms 302, 304, the control station 40 can provide control inputs that are more naturally expressed with respect to the reference frame of the end-effector of the respective arms 302, 304 than the inertial reference frame.

Also, the described methods of providing hybrid control of the arms 302, 304 can enable dynamic cross-coupling between the control station 40, 1040 and the robotic device 20 to facilitate effective use of the controllers 110, 120 by the user. For example, a task that involves operating multiple arms of the robotic device 20 typically involves a separate controller for each of the arms or one controller can provide control inputs to the arms through some form of switching. With the described methods of providing cross-coupled hybrid control, the control station 40, 1040 can receive control inputs via a controller and map those control inputs to one or more robotic devices 20 generate a synchronized motion by those robotic devices 20.

For example, the control station 40, 1040 can receive control inputs from different controllers 110, 120 for operating the robotic device 20 to conduct a task that involves lifting a potential IED with two manipulators 302a, 302b (such as in the example shown in FIG. 16D) while also operating the robotic device 20 to navigate different imaging angles with the imaging arm 304. With the described methods of providing hybrid control, the control station 40, 1040 can map those control inputs to provide a synchronized between the manipulators 302a and 302b, and coordinated motion between the manipulators 302a, 302b and the sensing arm 304.

To accommodate the different reference frames within the robotic system 10, 1000, the control station 40, 1040 may apply a common reference frame for mapping signals between the primary devices 1020p, the control station 40, 1040 and the secondary devices 1020s. As a result, the control station 40, 1040 can provide consistent control commands to the various components within the robotic system 10, 1000.

The common reference frame may be any reference frames, such as an arbitrary reference frame or any one of the reference frames 850A, 850B and 850C described with respect to FIGS. 12A to 12C.

As described with respect to the mapping module 1042b, the control station 40, 1040 can receive a mapped association between each primary device 1020p and one or more of the secondary devices 1020s. The mapped association may be provided in the configuration profile. The mapped associations can be varied based on user inputs provided by the operator and/or automatically by the control station 40, 1040 in response to changes at the primary devices 1020p and secondary devices 1020s, as described with reference to the mapping module 1042b.

The configuration profile can also include information regarding the reference frame of each of the components. For example, as shown in FIG. 3D, a reference frame control 151 is provided for one or more components at the robotic device 20. The reference frame control 151 can receive a selection of the reference frame that is to be used to operate that component. Based on the information within the configuration profile, the mapping module 1042b can transform the data signals accordingly.

In some embodiments, the mapping module 1042b can transform all data signals received with reference to a native reference frame (e.g., each of the reference frames 850A, 850B and 850C shown in FIGS. 12A to 12C, respectively) to the common reference frame defined for the robotic system 10, 1000. For example, the mapping module 1042b can transform the data signals using a rotation matrix. An example rotation matrix ($R_s$) is provided below:

$$R_s = \begin{bmatrix} \cos(\psi) & -\sin(\psi) & 0 \\ \sin(\psi) & \cos(\psi) & 0 \\ 0 & 0 & 1 \end{bmatrix} \quad (3)$$

The example rotation matrix $R_z$ is a 3×3 rotation matrix that can map coordinates of a vector expressed in a first reference frame ($v_1$) to coordinates for a vector expressed in a second reference frame ($v_2$) based on the below relationship shown as Equation (4):

$$v_1 = R_z v_2 \quad (4)$$

It will be understood that a transformation can include a number of successive rotations about various unit vector axes, such as using Euler angle representations (i.e., roll, pitch and yaw angles). The various rotations can be provided by applying corresponding rotation matrices in the respective rotation sequence.

Referring now to FIG. 12C, a native coordinate reference frame, namely the controller reference frame 850C, is shown for the controller 12a (which in this case is a haptic device).

In the example controller reference frame 850C, the x-axis is along a base of the controller 12a, the z-axis is along a vertical of the controller 12a and the y-axis is orthogonal to the x-axis and the z-axis. Any handle motion conducted by the operator on the controller 12a is received as input signals according to the controller reference frame 850C. The haptic device shown in FIG. 12C receives data associated with the handle motion as joint encoder data. To translate the input signals received from the controller 12a into control commands, the control station 40, 1040 may conduct kinematic calculations to determine the various command components, such as linear and angular velocities, with reference to the controller reference frame 850C.

Similarly, as shown in FIG. 12A, a native coordinate reference frame, namely the operator reference frame 850A, is defined for the operator. The operator reference frame 850A is centered at the operator with the x-axis orthogonal to a body of the operator, the z-axis along a vertical of the operator's body and the y-axis orthogonal to the x-axis and the z-axis (e.g., along a width of the body of the operator).

When the operator shown in FIG. 12A is operating the controller 12a of FIG. 12C, the control station 40, 1040 may apply a rotation matrix to input signals received at the controller 12a to transform those input signals to be relative to the operator reference frame 850A.

In embodiments when the controller 12a is oriented such that the controller reference frame 850C is aligned with the operator reference frame 850A, the rotation matrix can be an identity matrix since no transformation needs to be applied to the input signals.

In embodiments when the controller 12a is oriented such that the controller reference frame 850C is not aligned with the operator reference frame 850A, a rotation matrix similar to the rotation matrix $R_z$ is applied to transform the input signals. For example, if the controller 12a is oriented such that the x-axis of the controller reference frame 850C is 90 degrees (or Tr/2 rad) about the vertical axis relative to the operator, the below matrix may be applied for transforming the input signals received at the controller 12a;

$$R = \begin{bmatrix} \cos(\psi) & -\sin(\psi) & 0 \\ \sin(\psi) & \cos(\psi) & 0 \\ 0 & 0 & 1 \end{bmatrix} \xRightarrow{\psi=\frac{\pi}{2}} \begin{bmatrix} 0 & -1 & 0 \\ 1 & 0 & 0 \\ 0 & 0 & 1 \end{bmatrix} \quad (5)$$

Continuing with this example, when the operator moves the controller 12a in a forward motion (e.g., forward relative to the controller reference frame 850C) at approximately 1 m/s, the corresponding input signal generated by the controller 12a is a motion in the negative y-axis direction of the operator reference frame 850A. The control station 40, 1040 can transform the received input signals using the rotation matrix in Equation (5), as follows:

$$v = \underbrace{\begin{bmatrix} 0 & -1 & 0 \\ 1 & 0 & 0 \\ 0 & 0 & 1 \end{bmatrix}}_{R} \underbrace{\begin{bmatrix} 0 \\ -1 \\ 0 \end{bmatrix}}_{v \text{ in controller reference frame}} = \underbrace{\begin{bmatrix} 1 \\ 0 \\ 0 \end{bmatrix}}_{v \text{ in operator reference frame}} \quad (6)$$

According to Equation (6), the input signals received at the controller 12a should instead be towards the positive x-axis of the operator reference frame 850A and not the negative y-axis direction of the operator reference frame 850A.

With the mapping methods described herein, the various components, such as the controllers, can be arbitrarily oriented relative to the operator and the commands provided by the operator can still be transformed to be relative to the operator reference frame 850A.

Similar to the transformation of the signals between the operator and the controller, various transformations can also be applied to signals between the controller and the secondary devices 1020s.

The device reference frame 850B may be provided to mimic the operator. For example, in respect of the robotic device 300 shown in FIG. 7A, the corresponding device reference frame 850B aligns the operator with the frame 310 of the robotic device 300. As a result, as shown in FIG. 7A, the x-axis of the device reference frame 850B is orthogonal to the frame 310, the z-axis is along a vertical of the robotic device 300 and the y-axis is orthogonal to the x-axis and the z-axis (e.g., towards the direction of the manipulator 302a). By providing the device reference frame 850B so that it corresponds with the operator reference frame 850A, the operation of the robotic device 300 will correspond to the motion of the operator. For example, when the operator indicates a forward movement to the control station 40, 1040, the robotic device 300 can operate to perform the corresponding forward movement.

The described mapping methods can facilitate the inclusion of primary devices 1020p and secondary devices 1020s into the robotic system 10, 1000.

Also, the mapping methods described herein can also facilitate mapping between the primary devices 1020p and the secondary devices 1020s by updating the configuration profile accordingly.

In a typical configuration, a primary device 1020p located on the left side of the control station 40, 1040 is mapped to a left manipulator 302a at the secondary device 1020s, and a primary device 1020p located on the right side of the control station 40, 1040 is mapped to a right manipulator 302b at the secondary device 1020s. The typical configuration may be altered depending on the task or operation to be performed by the secondary device 1020s.

For example, the mapping between the primary devices 1020p and the manipulators 302a, 302b at the secondary devices 1020s can be switched so that when the operator moves the right primary device 1020p, the corresponding input signal is associated with the left manipulator 302a at the secondary device 1020s instead. This may be helpful during a task in which the secondary device 1020s is required to perform multiple simultaneous actions. For example, during an operation, the right manipulator 302b at the secondary device 1020s may be holding onto an object (e.g., lifting a box upwards) and the left manipulator 302a at the secondary device 1020s may need to conduct another action. When the operator is right-handed, it may be more convenient if the operator can use the right primary device 1020p to control the left manipulator 302a.

In some embodiments, the mapping module 1042b can automatically reverse the manipulators 302a, 302b in response to changes at the viewpoint of the operator. When multiple operator viewpoints are available, the control station 40, 1040 may automatically adjust the configuration profiles for the robotic system 10, 1000 based on the operator viewpoint currently being used. For instance, if a forward viewpoint and a reverse viewpoint are available to the operator, the mapping module 1042b can automatically switch the mapping of the manipulators 302a, 302b based on the viewpoint currently being used. For example, the imaging sensor may be directed backwards towards the frame 310. In that case, the manipulators 302a, 302b can be reversed (i.e., the left manipulator 302a can act as the right manipulator and the right manipulator 302b can act as the left manipulator during the reverse mode).

In some embodiments, the mapping module 1042b can map the same input signals to multiple manipulators 302 at the secondary device 1020s to provide synchronized motion. Synchronized motion can be useful for coordinated tasks, such as lifting of an object with two manipulators 302a, 302b while maintaining an orientation of the object. The mapping module 1042b may automatically provide the synchronized motion control in response to detecting a closed kinematic loop at the secondary device 1020s (e.g., as between the two manipulators 302a, 302b and the target object).

As described, multiple primary devices 1020p can be mapped to a secondary device 1020s. Based on the configuration profile, the control station 40, 1040 can transform those input signals as necessary to the common reference frame and combine the transformed input signals into a control command for the associated secondary device 1020s.

For example, the operator can use a primary device 1020p (e.g., a PHANTOM Omni™) to control a linear motion of a secondary device 1020s and another primary device 1020p (e.g., an Oculus Rift™) to control an angular motion of that secondary device 1020s. The control station 40, 1040 can transform the input signals received from the PHANTOM Omni and Oculus Rift to the common reference frame, and combine accordingly.

In some embodiments, the input signals can be combined based on a weighted sum or a gain adjustment. For example, two different primary devices 1020p can be configured to provide a respective coarse and fine control over the same secondary device 1020s. The input signals provided by those two different primary devices 1020p can be weighted differently prior to being combined.

The device reference frame 850B may also be defined relative to other components at the secondary device 1020s. In some embodiments, the device reference frame 850B can be defined relative to an end-effector reference frame, such as a reference frame of the imaging sensor at the imaging arm 304. This may provide a more intuitive control for the operator. For example, the operator can direct the imaging sensor to zoom in or out by providing a respective forward or backward command with respect to the operator reference frame 850A to the controller, regardless of the orientation of the imaging sensor. The control station 40, 1040 can then transform the provided input signals to the reference frame of the imaging sensor using the methods described herein.

FIGS. 13A to 13F illustrate example tasks by one manipulator 302 of the robotic device 20 in accordance with various embodiments.

The tasks illustrated in FIGS. 13A to 13F may involve at least application of the control methods for providing singularity avoidance, stable and scaled motion and hybrid control of the arms at the robotic device 20. Other control methods, such as providing compliance control and constrained motion, may also be enabled for conducting some of the tasks shown in FIGS. 13A to 13F. Although the tasks shown in FIGS. 13A to 13F will now be described with reference to one or more control methods, it should be understood that it is possible that fewer or additional control methods can be enabled for conducting any of the tasks shown in FIGS. 13A to 13F.

The manipulator 302 shown in each of FIGS. 13A to 13F is coupled with a three-finger gripper attachment 330. It will be understood that other types of attachments may similarly be used depending on the task intended.

Figure 13B:
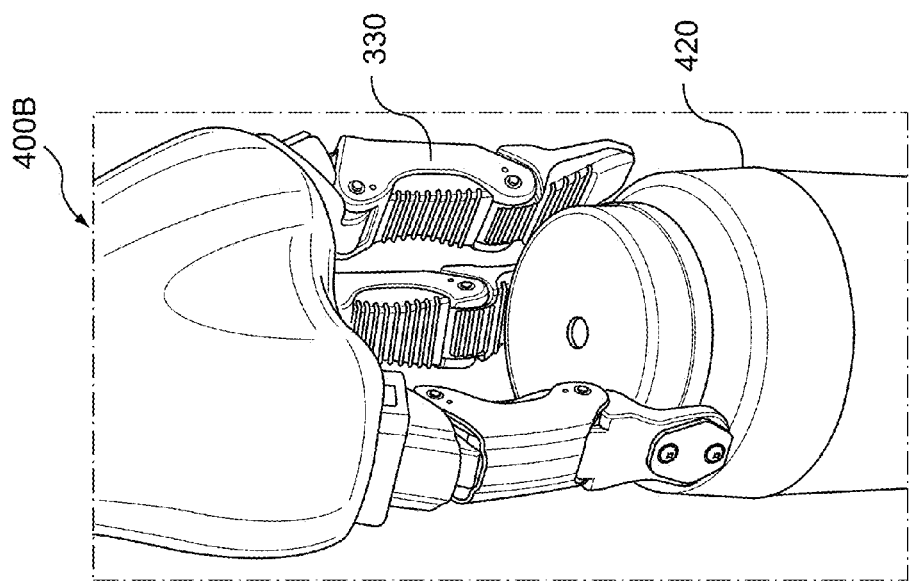
Figure 13A:
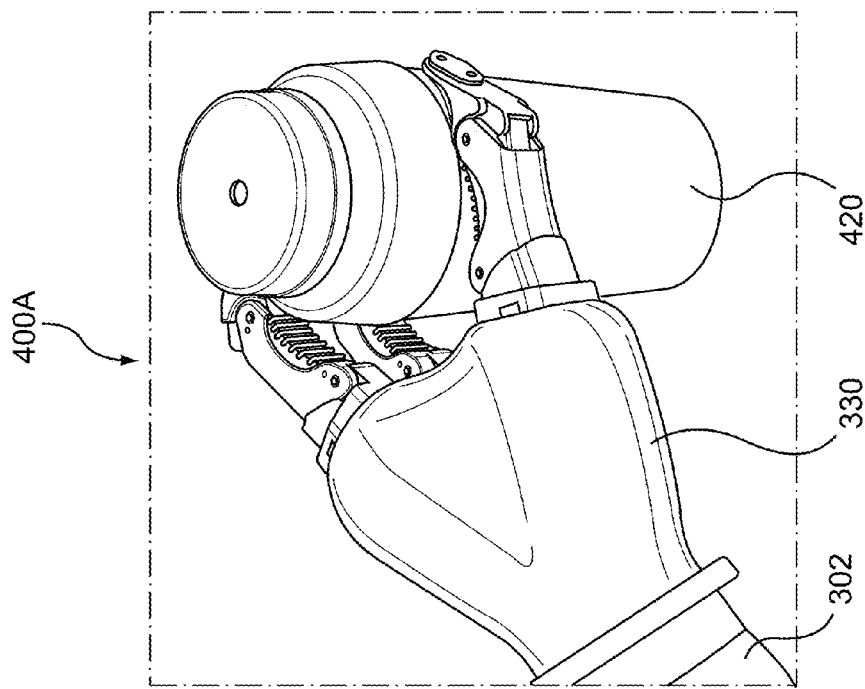

FIG. 13A shows an example task 400A involving the manipulator 302 handling the target 420. The manipulator 302 can hold the target 420 and move the target 420 to a particular position. The various control methods for conducting the task 400A shown in FIG. 13A can involve providing singularity avoidance, stable and scaled motion, hybrid control of the arms at the robotic device 20 and compliance control.

FIG. 13B shows an example task 400B also involving the manipulator 302 handling the target 420. In this case, the control station 40 has provided control inputs associated with unscrewing a lid of the target 420. Similar to the task 400A shown in FIG. 13A, the control station 40 may enable some of the control methods described herein for conducting the task 400B shown in FIG. 13B, such as providing singularity avoidance, stable and scaled motion and hybrid control of the arms at the robotic device 20.

Figure 13D:
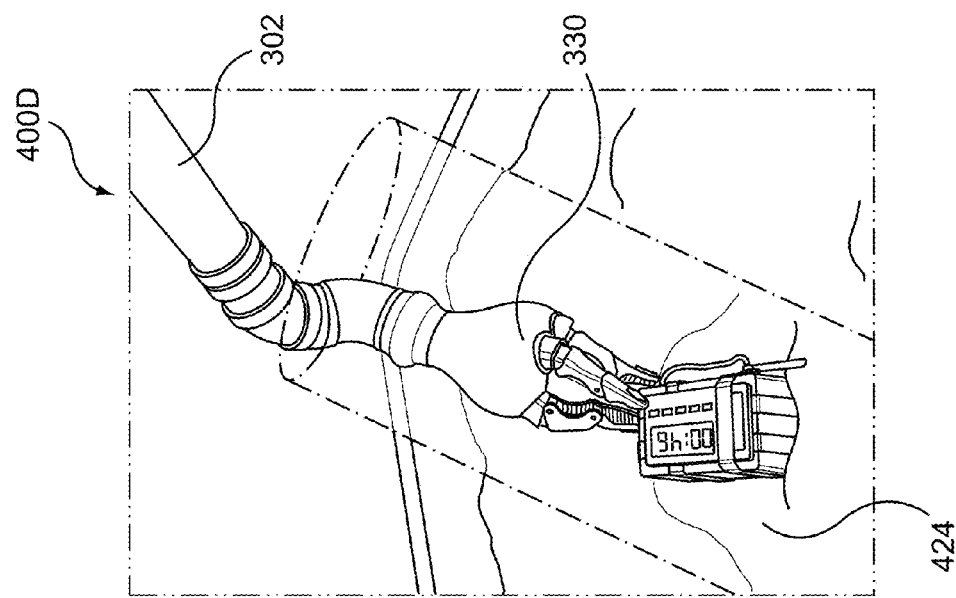
Figure 13C:
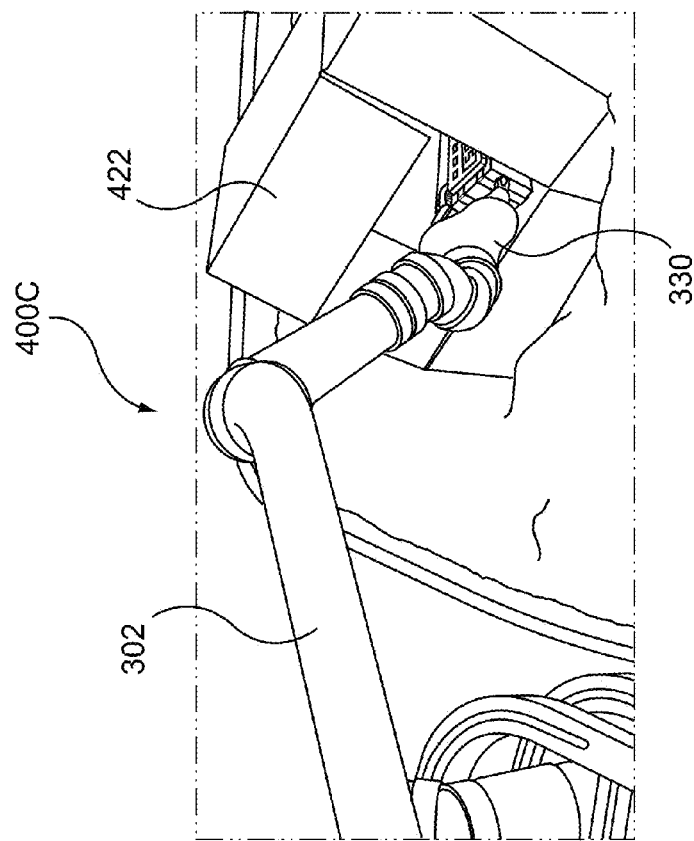

FIG. 13C shows an example task 400C involving the manipulator 302 reaching into an opening of a target 422. In this case, the target 422 is a box. It will be understood that other types of targets, such as a bag or tube, with an opening may similarly be handled by the manipulator 302. For example, FIG. 13D shows an example task 400D involving the manipulator 302 reaching into a target 424 that is a tube.

To initiate the tasks 400C and 400D shown in the respective FIGS. 13C and 13D, the control station 40 can involve applications of at least some of the control methods described herein, such as providing singularity avoidance, stable and scaled motion, hybrid control of the arms at the robotic device 20, and constrained motion. For example, the control station 40 can initiate the control method of providing stable and scaled motion to facilitate the alignment of the gripper attachment 330 with the opening of the target 422. This can be important especially if the opening is relatively narrow or small. The control station 40 can also initiate the control method of providing constrained motion to further enable precise movement of the gripper attachment 330 through the opening.

FIG. 13E shows an example task 400E involving the manipulator 302 interacting with the target 420. The manipulator 302 can pull a straw 426 from the target 420. This example task 400E may involve control methods that are analogous to control methods likely involved in other tasks, such as removing a pin from a metal casing. The various control methods for conducting the task 400E shown in FIG. 13E can involve providing singularity avoidance, stable and scaled motion, hybrid control of the arms at the robotic device 20 and compliance control.

FIG. 13F shows an example task 400F involving the manipulator 302 interacting with a target 428. In the example task 400F, the manipulator 302 can work to pry the target 428 with a tool 427, such as a screwdriver. Similar to the tasks 400A and 400E, this example task 400F may involve control methods for providing singularity avoidance, stable and scaled motion, hybrid control of the arms at the robotic device 20 and compliance control.

Continuing now with reference to FIGS. 14A to 15A, example tasks involved with tool-handling operations are now described. Similar to the tasks shown in FIGS. 13A to 13F, even though the tasks shown in FIGS. 14A to 15A will now be described with reference to at least some of the control methods described herein, it should be understood that it is possible that fewer or additional control methods can be enabled for conducting any of the tasks shown in FIGS. 14A to 15A.

The tool-handling operations described herein can involve use of different types of tools. The example tasks described with reference to FIGS. 14A to 14E involve operating the manipulator 302 coupled with the gripper attachment 330 for handling certain tools. The tools may be off-the-shelf tools, such as a screwdriver, hex key, brush and others. When conducting these tasks, overheating may result due to possible excessive force or torque being exerted by the gripper attachment 330 on the tool. To reduce the possibility of overheating at the gripper attachment 330, the control station 40 may initiate the control method for providing compliance control at the gripper attachment 330.

Figure 14B:
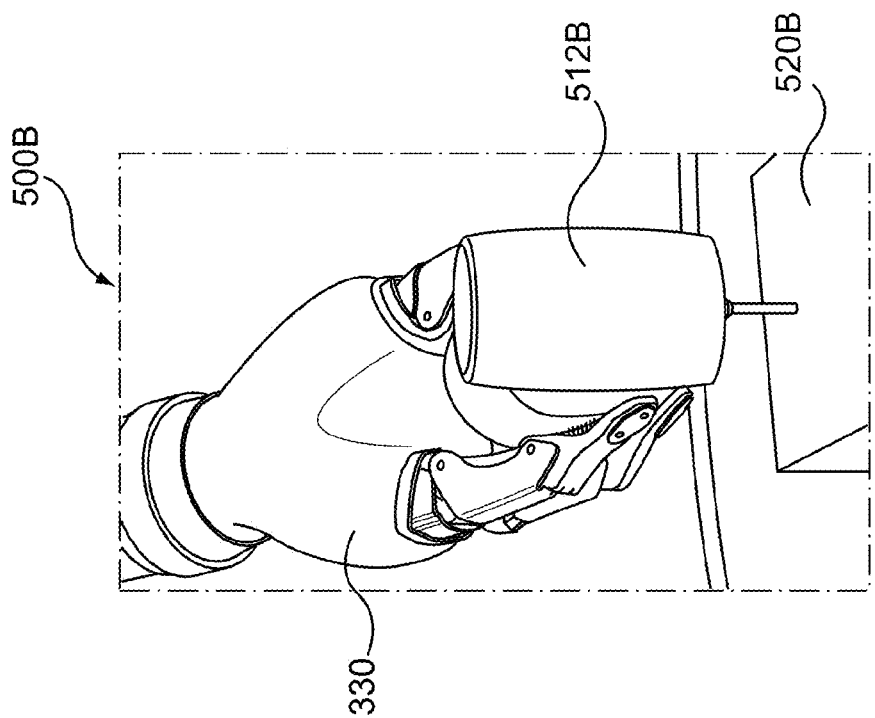
FIGS. 14A to 14F illustrate other example tasks by one manipulator of a robotic device in accordance with various other embodiments.
Figure 14A:
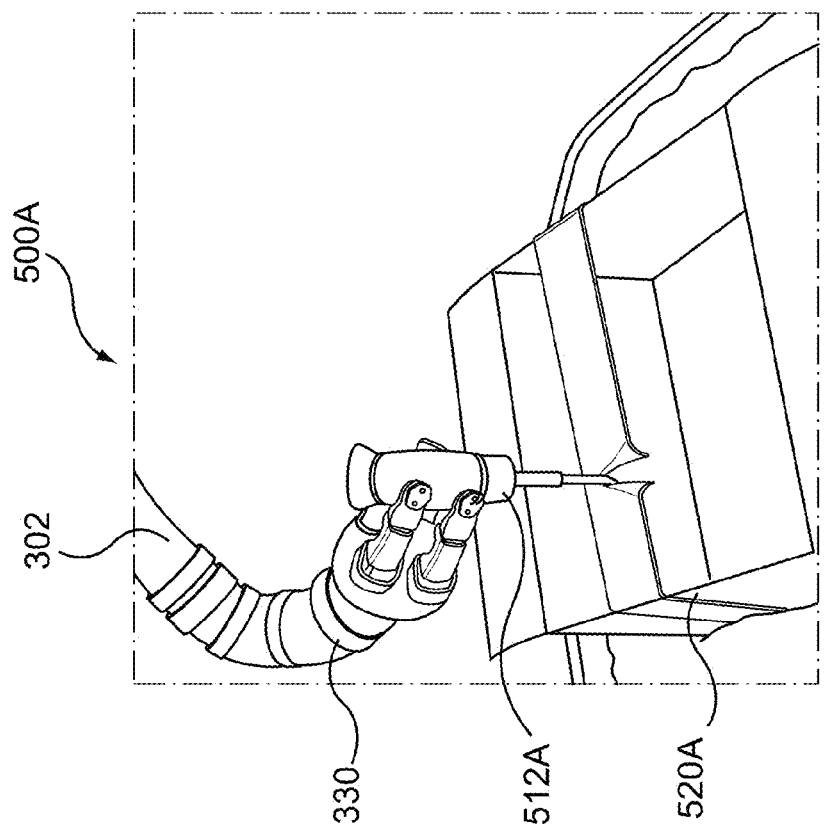

FIG. 14A shows an example task 500A involving the manipulator 302 interacting with a target 520A while holding a tool 512A, such as a cutter. This task 500A can involve various control methods, such as providing singularity avoidance, stable and scaled motion, hybrid control of the arms at the robotic device 20, compliance control and constrained motion.

The application of the control method for providing constrained motion in task 500A can be particularly important for helping to ensure that the tool 512A moves along a line. Other constrained motions can involve moving a tool along a particular plane (such as when the tool is a brush 512F, as shown in FIG. 14F, for example).

FIG. 14B shows an example task 500B involving the manipulator 302 interacting with a target 520B while holding a tool 512B, such as a hammer. This example task 500B can involve various control methods, such as providing singularity avoidance, stable and scaled motion and hybrid control of the arms at the robotic device 20.

Figure 14C:
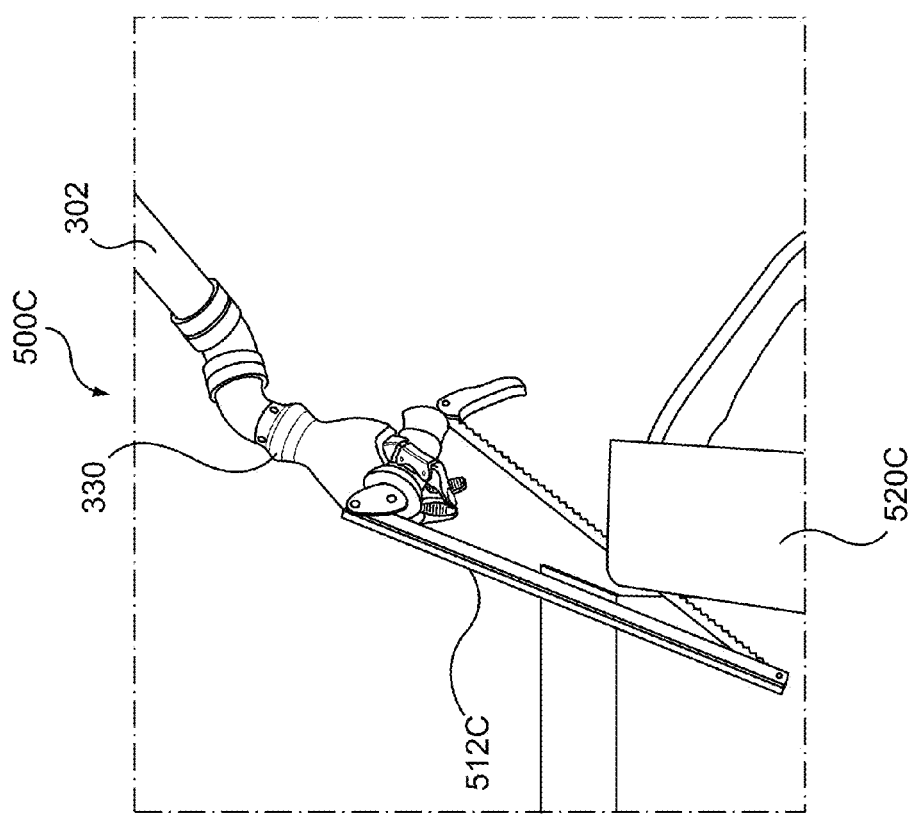

FIG. 14C shows an example task 500C involving the manipulator 302 interacting with a target 520C while holding a tool 512C, such as a saw. This example task 500C, like task 500A, can involve various control methods, such as providing singularity avoidance, stable and scaled motion, hybrid control of the arms at the robotic device 20, compliance control and constrained motion.

Figure 14E:
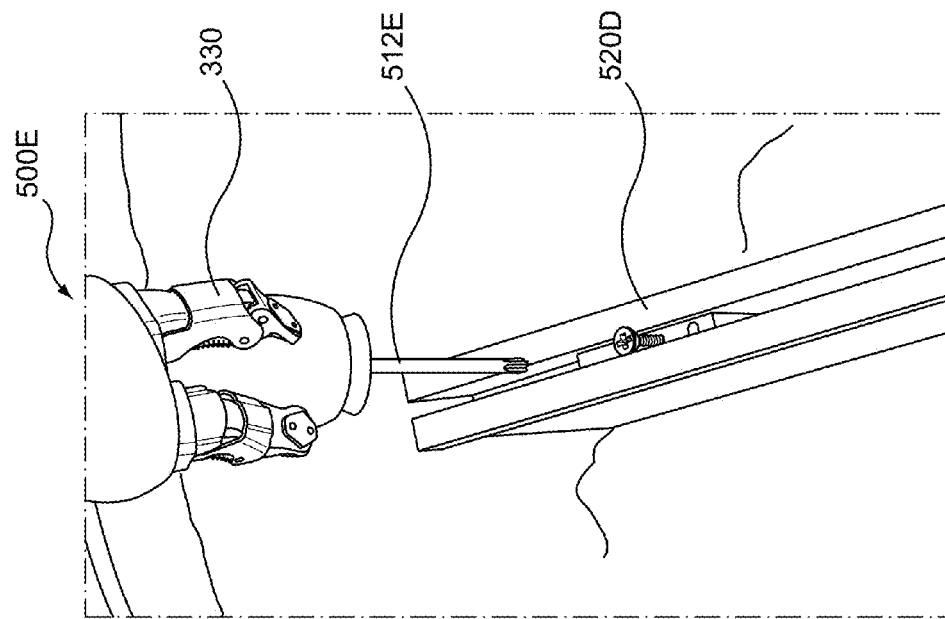
Figure 14D:
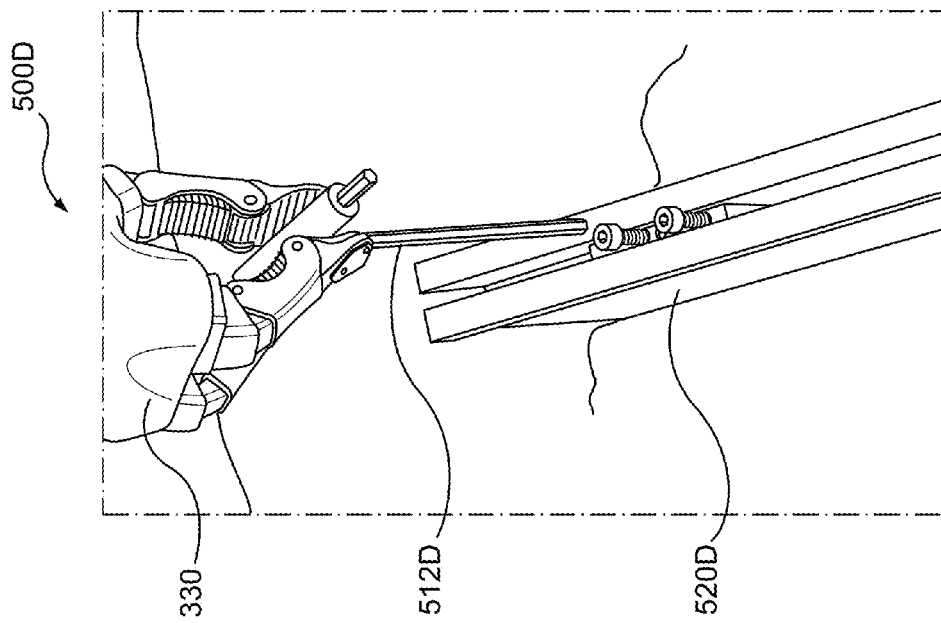
Figure 14F:
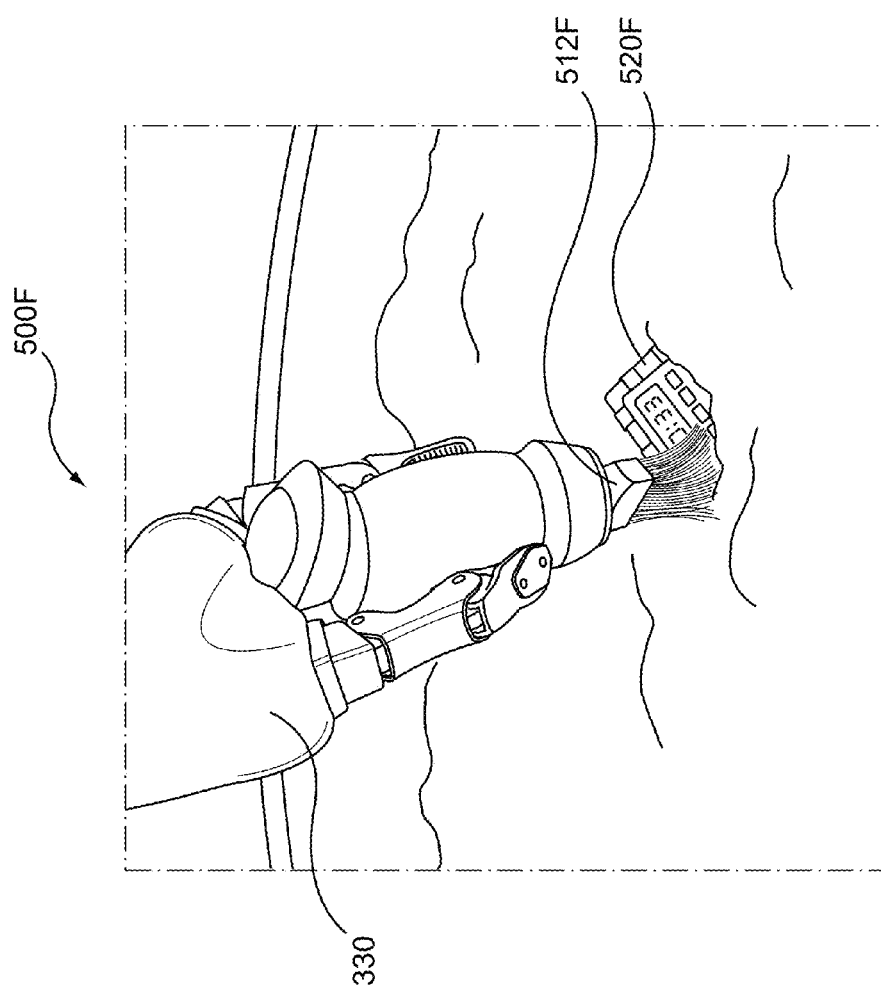

FIG. 14D shows an example task 500D involving the manipulator 302 interacting with a target 520D while holding a tool 512D, such as a hex key. FIG. 14E shows an example task 500E involving the manipulator 302 interacting with the target 520D while holding another tool 512E (a screwdriver). The example tasks 500D and 500E, like tasks 500A and 500C, can involve various control methods, such as providing singularity avoidance, stable and scaled motion, hybrid control of the arms at the robotic device 20, compliance control and constrained motion.

Unlike task 500A in which the manipulator 302 is moved along a particular plane, the tasks 500D and 500E involve a combination of movements requiring different control methods. That is, the tightening or loosening of a screw in task 500E can involve alignment of the tool 512E with the target 520D (which may involve the control station 40 providing hybrid control of the arms at the robotic device 20), providing scaled motion and providing constrained motion during tightening or loosening of the screw.

The tool-handling operations can involve coupling different attachments to the manipulators 302. The attachments may be mounted to the manipulators 302 via a tool mount. The tool mount may be common for the attachments to facilitate switching between the different tools for different tasks.

Figure 15B:
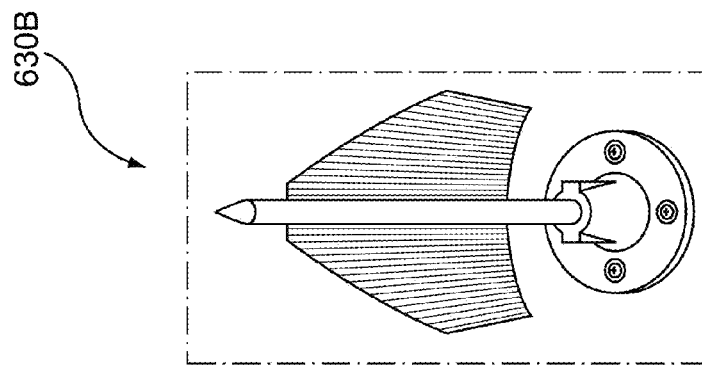
FIG. 15B illustrates an example attachment for a manipulator of a robotic device in accordance with an example embodiment.
Figure 15A:
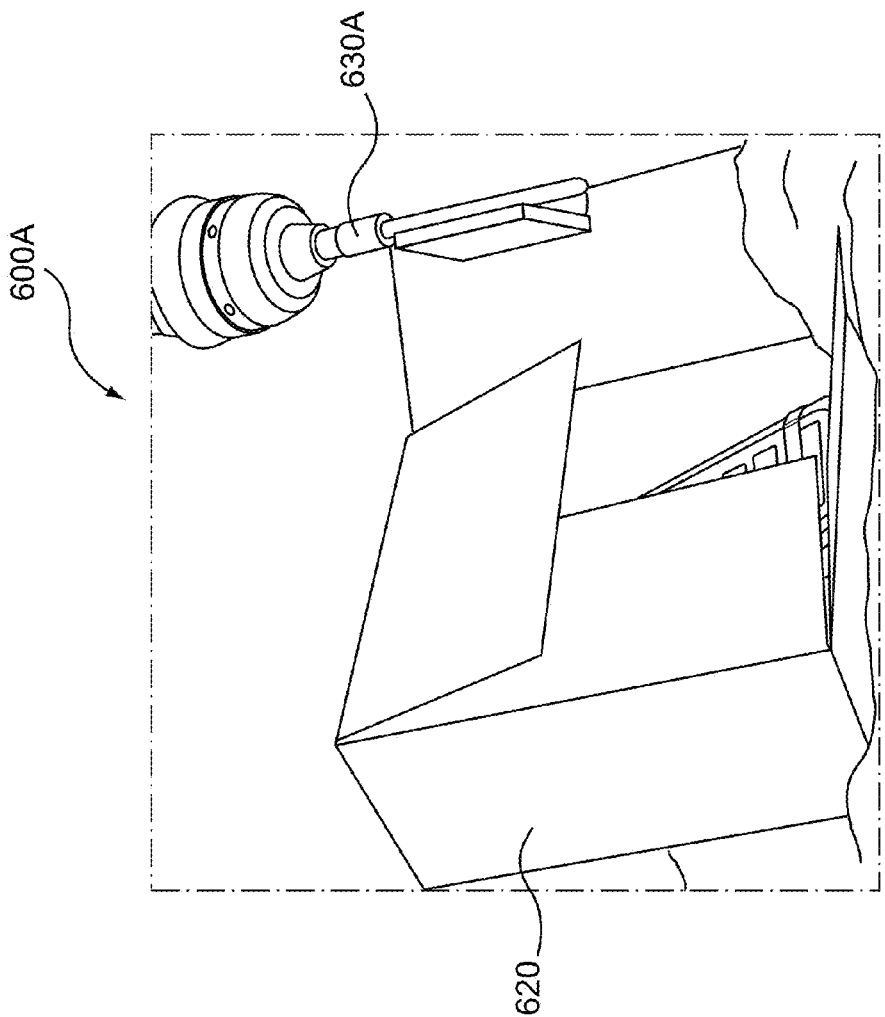
FIG. 15A illustrates an example task by one manipulator of a robotic device in accordance with another example embodiment.

FIG. 15A, for example, shows an example task 600A involving the manipulator 302 coupled with a mirror attachment 630A in accordance with another example embodiment. As shown in FIG. 15A, the control station 40 can operate the manipulator 302 to use the mirror attachment 630A for inspecting the target 620. The example task 600A can involve various control methods, such as providing singularity avoidance, stable and scaled motion and hybrid control of the arms at the robotic device 20.

FIG. 15B shows an example tool attachment 630B that can be coupled to the manipulator 302 for conducting various tasks, such as digging, prodding and flipping objects. The tool attachment 630B shown in FIG. 15B is a combination of a spade and prodder. When the control station 40 operates the manipulator 302 coupled with the tool attachment 630B, various control methods, such as providing singularity avoidance, stable and scaled motion, hybrid control of the arms at the robotic device 20 and compliance control may be initiated.

The control station 40 may initiate the control method for providing compliance control to help prevent excessive force from being exerted between the tool attachment 630B and the target 620. This can be important for avoiding potential damages to the robotic device 20 and the target 620. Providing compliance control can help to increase stability in the movement despite time delays between transmission of data between the control station 40 and the robotic device 20.

In some embodiments, the tool attachment 630B may include a mirror. The control station 40 may provide control inputs to the manipulator 302 via the second and third controllers 12a and 120b which can provide haptic feedback. As a result, the user at the control station 40 can navigate the mirror at the tool attachment 630B in a natural and intuitive manner—that is, the motion of the mirror at the manipulator 302 can mimic the motion of the user's hand at the second and third controllers 12a and 120b.

Example coordinated multiple-manipulator operations will now be described with reference to FIGS. 16A to 16D.

Providing multiple manipulators 302a, 302b at the robotic device 20 can increase the range of tasks that are available. For example, the control station 40 can operate the multiple manipulators 302a, 302b each coupled with the gripper attachment 330 to mimic a manual operation by a human. Alternatively, each of the multiple manipulators 302a, 302b can be coupled with any different attachments, such as grippers, tools, sensors, or other end-effectors (even weapons) depending on the intended operation of the robotic device 20.

Some tasks may actually require the use of multiple manipulators 302a, 302b. For example, complex tasks that involve different actions that depend on each other, such as a task involving lifting of a box corner to investigate underneath the box, or a task involving holding or securing an object with one manipulator 302a before performing another action with the other manipulator 302b, such as using a measuring tape. For instance, a task involving pulling a wire to defuse an IED can require the multiple manipulators 302a, 302b—that is, the task can involve the control station 40 operating the manipulator 302a to secure the IED first to avoid unintended motion and operating the manipulator 302b to pull the wire from the IED.

Also, for embodiments in which two manipulators 302a and 302b are provided, the operation of the robotic device 20 at the control station 40 can be more intuitive and accessible for the user since the two manipulators 302a and 302b can mimic a human's two arms.

Figure 16A:
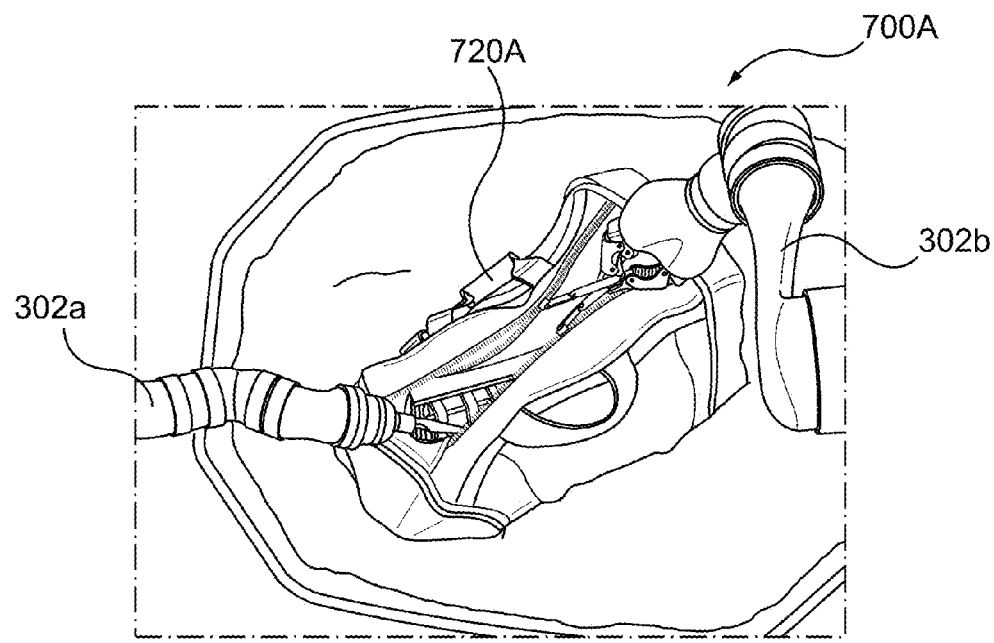
FIGS. 16A to 16D illustrate example tasks by multiple manipulators of a robotic device in accordance with various embodiments.

FIG. 16A, for example, shows an example task 700A involving the manipulators 302a and 302b interacting with the target 720A (which is a bag). The task 700A involves unzipping the bag 720A to investigate the contents inside. The example task 700A can involve various control methods, such as providing singularity avoidance, stable and scaled motion, hybrid control of the arms at the robotic device 20, and collision detection and avoidance.

Figure 16B:
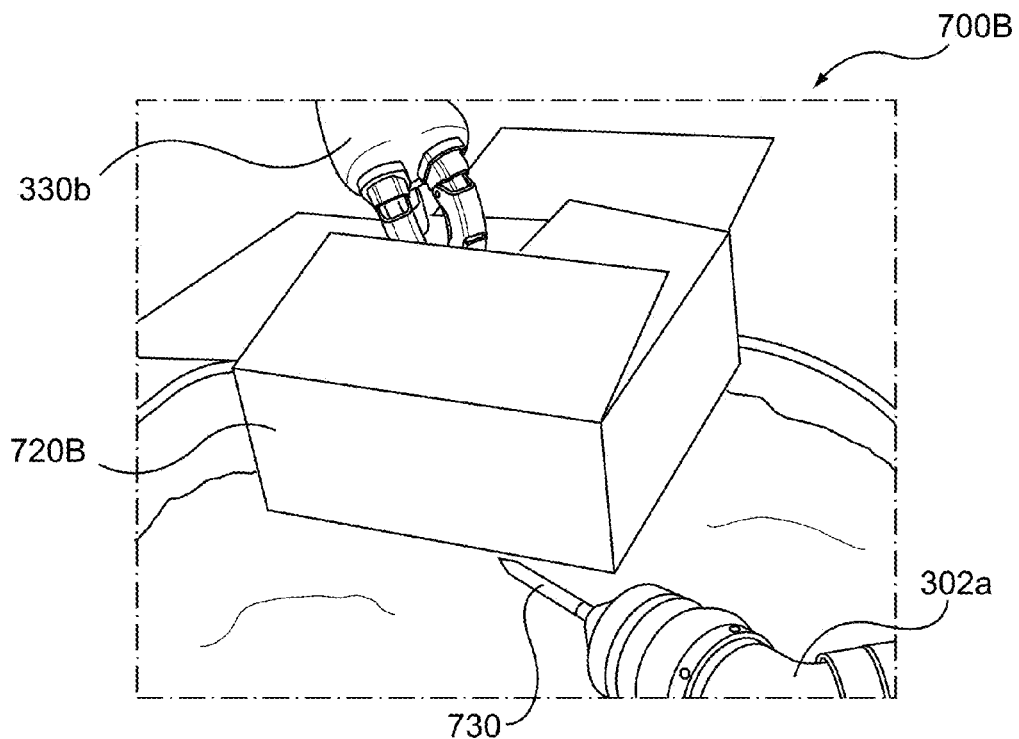

FIG. 16B shows an example task 700B involving the manipulators 302a and 302b interacting with the target 720B (a box in this case). In this example, the manipulator 302a is coupled with a spike attachment 730. The task 700B involves lifting the box 720B to sweep underneath. For example, the task 700B can involve using a sensor at the manipulator 302a for detecting the presence of trip wire. The example task 700B can involve various control methods, such as providing singularity avoidance, stable and scaled motion, hybrid control of the arms at the robotic device 20, collision detection and avoidance, compliance control and constrained motion.

Figure 16C:
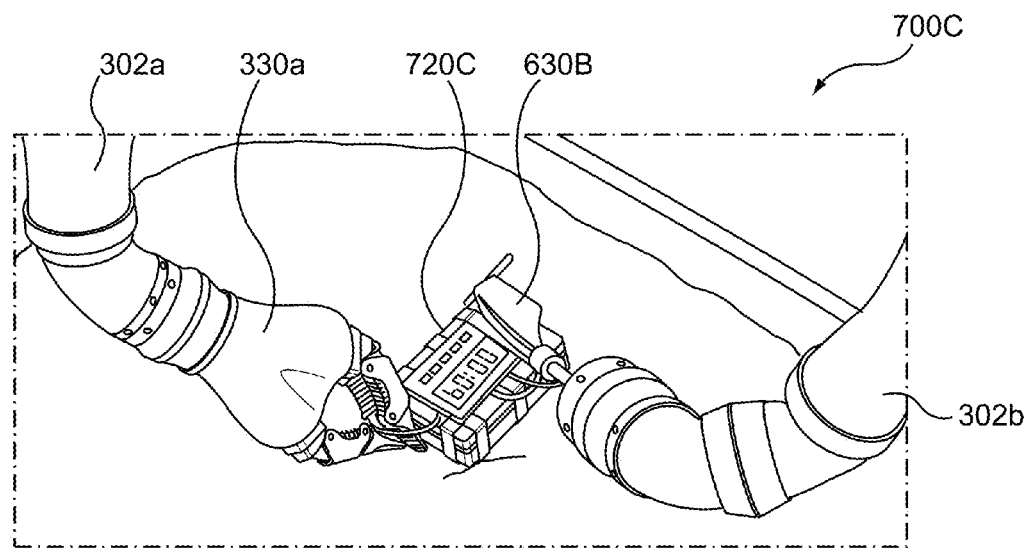

FIG. 16C shows an example task 700C involving the manipulators 302a and 302b interacting with the target 720C (an IED in this case). In this example, the manipulator 302b is coupled with tool attachment 630B shown in FIG. 15B. The task 700C involves pulling a wire from the IED 720C to defuse the IED 720C while maintaining the orientation of the IED 720C. The example task 700C can involve various control methods, such as providing singularity avoidance, stable and scaled motion, hybrid control of the arms at the robotic device 20, and collision detection and avoidance.

Figure 16D:
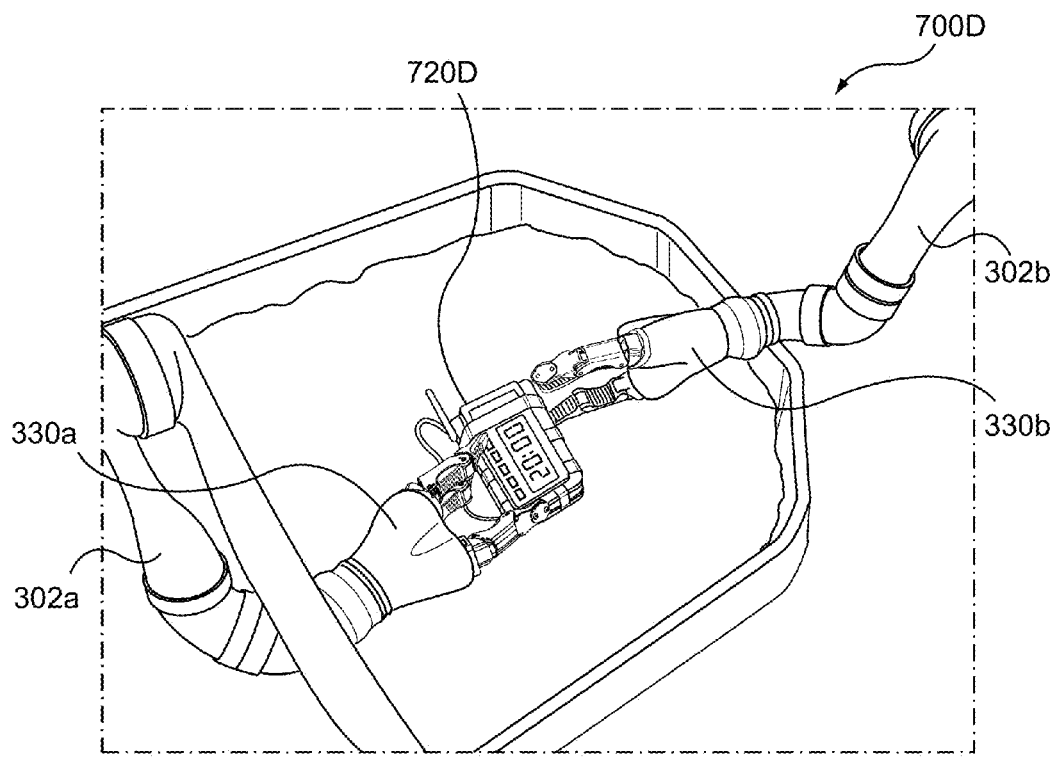

FIG. 16D shows an example task 700D involving the manipulators 302*a* and 302*b* interacting with the target 720D (an IED in this case). The task 700B involves holding and moving the target 720D while maintaining its orientation. The example task 700D can involve various control methods, such as, but not limited to, providing singularity avoidance, stable and scaled motion, hybrid control of the arms at the robotic device 20, synchronized motion, collision detection and avoidance, compliance control and constrained motion.

Figure 17:
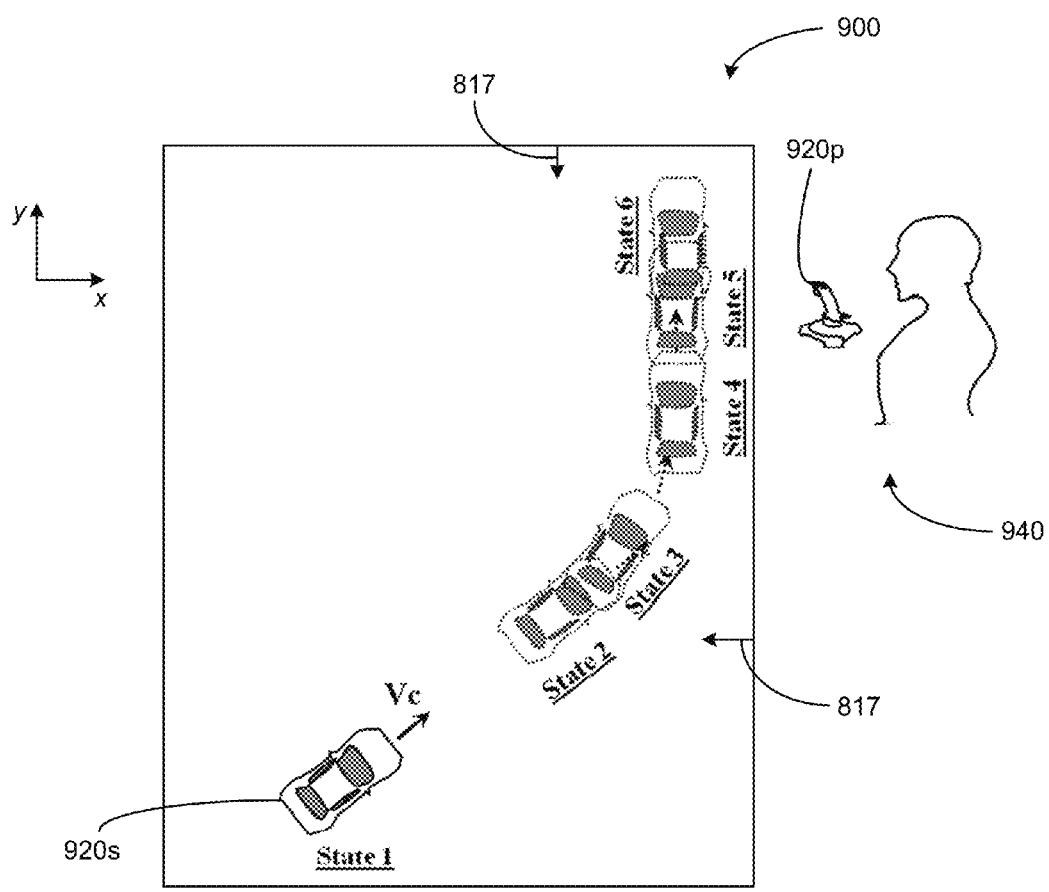
FIG. 17 illustrates an operation of a robotic device in accordance with an example embodiment of some of the methods and systems described herein.

FIG. 17 illustrates, generally at 900, an operation of a secondary device 920*s* in accordance with an example embodiment of some of the methods and systems described herein.

For the example operation 900, the configuration profile indicates that the commands received by the primary device 920*p* are for controlling the secondary device 920*s*. In this example, the primary device 920*p* is a joystick and the secondary device 920*s* is a vehicle.

At State 1, the primary device 920*p* provides an input signal indicating the secondary device 920*s* is to be operated at the velocity $V_c$. The input signal along with other information regarding the secondary device 920*s*, such as a current pose (e.g., a position or orientation) and current speed, are provided to the control station 1040. In this example, the mapping module 1042*b* does not need to apply any transformation or mapping since the reference frame of the primary device 920*p* is aligned with the reference frame of the secondary device 920*s*. The control station 1040 can then generate the control commands based on the received input signals and the configuration profile.

Based on the configuration profile and received data, the relevant control modification modules 1042*a* can also determine whether or not to generate modifiers. For example, a control modification module 1042*a* for managing collision avoidance for the secondary device 920*s* can determine, based on the received data, whether a collision may occur based on the control commands. As shown in FIG. 17, the control modification module 1042*a* will not identify a collision at State 1.

As the secondary device 920*s* proceeds to State 2, however, the control modification module 1042*a* can detect that the secondary device 920*s* is approaching an example collision distance threshold 817 from the right wall as defined in the configuration profile. In response, the control modification module 1042*a* can generate a modifier to gradually reduce a component of the velocity $V_c$ in the x direction until the secondary device 920*s* reaches a critical point as defined in the configuration profile (shown at State 4). As shown in FIG. 17, the secondary device 920*s* begins to change direction at State 3 to avoid collision with the right wall.

At State 4, the control modification module 1042*a* can generate a modifier to remove the component of the velocity $V_c$ towards the x direction. The secondary device 920*s* continues to move towards the y direction since that component of the velocity $V_c$ is retained.

At State 5, the control modification module 1042*a* can detect that the secondary device 920*s* is approaching another collision distance threshold 817 from the top wall. In response, the control modification module 1042*a* can generate a modifier to remove the component of the velocity $V_c$ towards the y direction. At State 6, the secondary device 920*s* is no longer in motion since all the components of the velocity $V_c$ has been removed.

Various embodiments have been described herein by way of example only. Various modification and variations may be made to these example embodiments without departing from the spirit and scope of the invention. Also, in the various user interfaces illustrated in the figures, it will be understood that the illustrated user interface text and controls are provided as examples only and are not meant to be limiting. Other suitable user interface elements may be possible.

We claim:

1. A robotic system comprising:
an input module operable to receive a set of input signals from one or more primary devices, the set of input signals including one or more input signals;
a storage module operable to provide a configuration profile, the configuration profile comprising a set of operational parameters for the robotic system;
a processing module configured to generate one or more control commands based on at least the set of input signals and the configuration profile, the one or more control commands being generated for one or more secondary devices, the processing module being in electronic communication with the input module and the storage module, each control command being indicative of an operation to be conducted by at least one secondary device of the one or more secondary devices; and
a set of control modification modules for managing an operation of the robotic system, each control modification module managing an operation of a respective secondary device, each control modification module being configured to:
detect whether the operation of the respective secondary device fails to comply with the set of operational parameters;
in response to detecting the operation of the respective secondary device fails to comply with the set of operational parameters, identify a non-compliant control command from the one or more control commands, the non-compliant control command being a control command causing the operation of the respective secondary device to be non-compliant with the set of operational parameters; and
generate a modifier to adjust the non-compliant control command to comply with the set of operational parameters;
wherein the robotic system is responsive to the one or more control commands and each modifier generated by the respective control modification modules.

2. The robotic system of claim 1 further comprises:
an output module for combining the one or more control commands and the modifier to provide an output signal, the robotic system being responsive to the output signal.

3. The robotic system of claim 1, wherein:
the configuration profile comprises a mapped association between each primary device and the at least one secondary device;
each input signal is associated with a primary device identifier corresponding to the primary device providing that input signal; and
the processing module is configured to generate the one or more control commands by, for each input signal, identifying, from the configuration profile, the at least one secondary device in mapped association with the primary device corresponding to the respective primary device identifier; and associating that input signal with the identified at least one secondary device.

4. The robotic system of claim 3, wherein the processing module is further configured to, for each secondary device,
determine whether that secondary device is associated with two or more input signals; and
in response to determining that secondary device is associated with two or more input signals, combine the two or more input signals to generate the respective control command for that secondary device.

5. The robotic system of claim 4, wherein the two or more input signals comprise a first input signal defining a first aspect of the operation to be conducted by the respective secondary device and a second input signal defining a second aspect of the operation to be conducted by the respective secondary device, the second aspect being different from the first aspect.

6. The robotic system of claim 1, wherein:
the input module is further operable to receive a state change indicator from the at least one secondary device, the state change indicator representing an adjustment of at least one of the primary device and the secondary device; and
the robotic system further comprises a mapping module for updating the configuration profile in response to the state change indicator.

7. The robotic system of claim 6, wherein:
the storage module stores a plurality of configuration profiles, each configuration profile comprising a different respective set of operational parameters; and
the mapping module is further configured to select one of the plurality of configuration profiles based on the state change indicator.

8. The robotic system of claim 6, wherein the adjustment of the at least one of the primary device and the secondary device comprises a change to a mapped association between a primary device and a respective secondary device.

9. The robotic system of claim 6, wherein the adjustment of the at least one of the primary device and the secondary device comprises an occurrence of a closed kinematic loop at the secondary device.

10. The robotic system of claim 1, wherein each control modification module is further configured to:
generate an operational model based on the one or more control commands;
identify, from the operational model, a collision between at least one of the one or more secondary devices and one or more segments of a secondary device; and
in response to identifying the collision, generate the modifier for preventing the collision, the modifier including a removal of one or more components of the non-compliant control command causing the collision based on the operational model.

11. The robotic system of claim 1, wherein:
the configuration profile comprises a compliance threshold; and
each control modification module is further configured to:
receive a sensed value from the secondary device;
determine whether the sensed value exceeds the compliance threshold; and
in response to determining the sensed value exceeds the compliance threshold, generate the modifier for reducing at least one of a force and a torque exerted by the secondary device, the modifier including a removal of one or more components of the non-compliant control command causing the sensed value to exceed the compliance threshold.

12. The robotic system of claim 1, wherein:
the configuration profile comprises a singularity threshold; and
each control modification module is further configured to:
receive a pose information associated with the secondary device, the pose information comprising a position data and an orientation data;
determine whether the pose information exceeds the singularity threshold; and
in response to determining the pose information exceeds the singularity threshold, generate the modifier for reducing a movement of the secondary device to reduce a change in the pose information, the modifier including a removal of one or more components of the non-compliant control command causing the pose information to exceed the singularity threshold.

13. A method for operating a robotic system, the method comprising:
receiving, at an input module, a set of input signals from one or more primary devices, the set of input signals including one or more input signals;
providing a configuration profile, the configuration profile comprising a set of operational parameters for the robotic system;
generating, by a processing module, one or more control commands based on at least the set of input signals and the configuration profile, the one or more control commands being generated for one or more secondary devices, each control command being indicative of an operation to be conducted by at least one secondary device of the one or more secondary devices; and
managing, by a set of control modification modules, an operation of the robotic system, each control modification module managing an operation of a respective secondary device, the managing comprising:
detecting whether the operation of the respective secondary device fails to comply with the set of operational parameters;
in response to detecting the operation of the respective secondary device fails to comply with the set of operational parameters, identifying a non-compliant control command from the one or more control commands, the non-compliant control command being a control command causing the operation of the respective secondary device to be non-compliant with the set of operational parameters; and
generating a modifier to adjust the non-compliant control command to comply with the set of operational parameters;
wherein the robotic system is responsive to the one or more control commands and each modifier generated by the respective control modification modules.

14. The method of claim 13 further comprises:
combining the one or more control commands and the modifier to provide an output signal, the robotic system being responsive to the output signal.

15. The method of claim 13, wherein:
the configuration profile comprises a mapped association between each primary device and the at least one secondary device;
each input signal is associated with a primary device identifier corresponding to the primary device providing that input signal; and generating the one or more control commands comprises, for each input signal,
identifying, from the configuration profile, the at least one secondary device in mapped association with the primary device corresponding to the respective primary device identifier; and
associating that input signal with the identified at least one secondary device.

16. The method of claim 15, wherein generating the one or more control commands comprises, for each secondary device,
determining whether that secondary device is associated with two or more input signals; and
in response to determining that secondary device is associated with two or more input signals, combining the two or more input signals to generate the respective control command for that secondary device.

17. The method of claim 16, wherein the two or more input signals comprises a first input signal defining a first aspect of the operation to be conducted by the respective secondary device and a second input signal defining a second aspect of the operation to be conducted by the respective secondary device, the second aspect being different from the first aspect.

18. The method of claim 13 further comprises:
receiving, at the input module, a state change indicator from the at least one secondary device, the state change indicator representing an adjustment of at least one of the primary device and the secondary device; and
generating the one or more control commands comprises updating, by a mapping module, the configuration profile in response to the state change indicator.

19. The method of claim 18 further comprises operating the mapping module to select one of a plurality of configuration profiles based on the state change indicator, each configuration profile in the plurality of configuration profiles comprising a different respective set of operational parameters.

20. The method of claim 13, wherein managing the operation of the robotic system comprises operating each control modification module to:
generate an operational model based on the one or more control commands;
identify, from the operational model, a collision between at least one of the one or more secondary devices and one or more segments of a secondary device; and
in response to identifying the collision, generate the modifier for preventing the collision, the modifier including a removal of one or more components of the non-compliant control command causing the collision based on the operational model.

21. The method of claim 13, wherein:
the configuration profile comprises a compliance threshold; and
managing the operation of the robotic system comprises operating each control modification module to:
receive a sensed value from the secondary device;
determine whether the sensed value exceeds the compliance threshold; and
in response to determining the sensed value exceeds the compliance threshold, generate the modifier for reducing at least one of a force and a torque exerted by the secondary device, the modifier including a removal of one or more components of the non-compliant control command causing the sensed value to exceed the compliance threshold.

22. The method of claim 13, wherein:
the configuration profile comprises a singularity threshold; and
managing the operation of the robotic system comprises operating each control modification module to:
receive a pose information associated with the secondary device, the pose information comprising a position data and an orientation data;
determine whether the pose information exceeds the singularity threshold; and
in response to determining the pose information exceeds the singularity threshold, generate the modifier for reducing a movement of the secondary device to reduce a change in the pose information, the modifier including a removal of one or more components of the non-compliant control command causing the pose information to exceed the singularity threshold.

* * * * *